US007031974B1

(12) United States Patent
Subramaniam

(10) Patent No.: US 7,031,974 B1
(45) Date of Patent: Apr. 18, 2006

(54) REPLICATING DDL CHANGES USING STREAMS

(75) Inventor: Mahesh Subramaniam, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 597 days.

(21) Appl. No.: 10/308,851

(22) Filed: Dec. 2, 2002

Related U.S. Application Data

(60) Provisional application No. 60/400,532, filed on Aug. 1, 2002, provisional application No. 60/410,883, filed on Sep. 13, 2002.

(51) Int. Cl.
*G06F 17/30* (2006.01)

(52) U.S. Cl. ..................................................... 707/102

(58) Field of Classification Search ............. 707/1–10, 707/100–104.1, 200–205; 370/389; 713/162
See application file for complete search history.

(56) References Cited

U.S. PATENT DOCUMENTS

| | | | | |
|---|---|---|---|---|
| 4,007,450 | A | 2/1977 | Haibt et al. | |
| 5,473,696 | A * | 12/1995 | van Breemen et al. | 713/162 |
| 5,604,900 | A | 2/1997 | Iwamoto et al. | |
| 5,652,888 | A | 7/1997 | Burgess | |
| 5,680,619 | A | 10/1997 | Gudmundson et al. | |
| 5,715,413 | A | 2/1998 | Ishai et al. | |
| 5,758,083 | A | 5/1998 | Singh et al. | |
| 5,948,062 | A | 9/1999 | Tzelnic et al. | |
| 6,163,813 | A | 12/2000 | Jenney | |
| 6,169,988 | B1 | 1/2001 | Asakura | |
| 6,222,840 | B1 * | 4/2001 | Walker et al. | 370/389 |
| 6,405,209 | B1 | 6/2002 | Obendorf | |
| 6,442,568 | B1 | 8/2002 | Velasco et al. | |
| 6,453,354 | B1 | 9/2002 | Jiang et al. | |
| 6,553,428 | B1 | 4/2003 | Ruehle et al. | |
| 6,691,155 | B1 | 2/2004 | Gottfried | |
| 2001/0047270 | A1 | 11/2001 | Gusick et al. | |
| 2003/0115274 | A1 | 6/2003 | Weber | |
| 2003/0182328 | A1 | 9/2003 | Paquette et al. | |
| 2003/0198214 | A1 | 10/2003 | Tsukakoshi et al. | |
| 2003/0212657 | A1 | 11/2003 | Kaluskar et al. | |
| 2003/0212670 | A1 | 11/2003 | Yalamanchi et al. | |

(Continued)

OTHER PUBLICATIONS

Gunther et al., "MMM: A web-based system for sharing statistical computing modules", May-Jun. 1997, IEEE, vol. 1, issue 3, pp. 59-68.*

(Continued)

*Primary Examiner*—Diane Mizrahi
(74) *Attorney, Agent, or Firm*—Hickman Palermo Truong & Becker LLP

(57) ABSTRACT

Techniques are disclosed for sharing information in a wide variety of contexts. An information sharing system is described that allows both an explicit capture process and an implicit capture process to add information items to a staging area. Further, the information sharing system supports both implicit and explicit consumption of information items that are stored in said staging area. A rules engine is provided to allow users to create and register rules that customize the behavior of the capture processes, the consuming processes, and propagation processes that propagate information from the staging areas to designated destinations. Techniques are also described for achieving exactly-once handling of sequence of items, where the items are maintained in volatile memory. Techniques are also provided for recording DDL operations, and for asynchronously performing operations based on the previously-performed DDL operations.

42 Claims, 24 Drawing Sheets

U.S. PATENT DOCUMENTS

| | | | |
|---|---|---|---|
| 2003/0236823 | A1 | 12/2003 | Patzer et al. |
| 2003/0236834 | A1 | 12/2003 | Gottfried |

OTHER PUBLICATIONS

Kurakawa et al., :Life Cycle Design Support Based on Environmental Information Sharing, Feb. 1999, IEEE, pp. 138-142.*

S.G. Shiva, "Modular description/simulation/synthesis using DDL", 1982, IEEE Press, pp. 321-329.*

Israel Spiegler "Automating database construction", 1983, ACM Press, vol. 14, Issue 3, pp. 21-29.*

International Searching Authority, "Notification of Transmittal of the International Search Report or the Declaration," dated May 25, 2004, 6 pages.

Kei Kurakawa et al., "Life Cycle Design Support Based on Environmental Information Sharing," IEEE, Feb. 1-3, 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

* cited by examiner

REPLICATING DDL CHANGES USING STREAMS

RELATED APPLICATIONS

This application is related to and claims priority from the following applications, the content of each of which is incorporated herein in its entirety, for all purposes:

U.S. Provisional Patent Application No. 60/400,532, filed on Aug. 1, 2002, entitled UTILIZING RULES IN DISTRIBUTED INFORMATION SHARING;

U.S. Provisional Patent Application No. 60/410,883, filed Sep. 13, 2002, entitled ORACLE STREAMS;

This application is related to U.S. patent application Ser. No. 10/308,924, entitled "ASYNCHRONOUS INFORMATION SHARING SYSTEM", by inventors BENNY SOUDER, DETER GAWLICK, JIM STAMOS and ALAN DOWNING, filed on Dec. 2, 2002;

This application is related to U.S. patent application Ser. No. 10/308,879, entitled "IN MEMORY STREAMING WITH DISK BACKUP AND RECOVERY OF MESSAGES CAPTURED FROM A DATABASE REDO STREAM", by inventors NIMAR SINGH ARORA and JIM STAMOS, filed on Dec. 2, 2002.

FIELD OF THE INVENTION

The present invention relates to information sharing systems.

BACKGROUND OF THE INVENTION

The ability to share information easily and in a timely fashion is a crucial requirement for any business environment. Consequently, information sharing has been supported by many mechanisms, such as discussions, mail, books, periodicals, and computer technology. Many computer-based technologies have evolved to promote the goal of information sharing, such as reports/statements, replication and messaging.

Unfortunately, most information sharing is still handled through applications, which represent a relatively expensive solution due to the costs associated with developing, deploying, operating and maintaining the applications that provide the information sharing services. In addition, the services provided by such applications often lack desired functionality, such as support for ad-hoc requests, customization, as well as timely and flexible delivery.

An important feature of any database management system is the ability to share information among multiple databases and applications. Traditionally, this has involved users and applications pulling information from the database using various overlapping technologies. Today, new efficiencies and business models require a more comprehensive and automatic approach. Many information sharing solutions are targeted to specific information sharing problems. While such solutions may solve the specific information sharing problem to which they are directed, they may not be applicable to, and may even be incompatible with, other information sharing problems.

Based on the foregoing, it is desirable to provide a system and techniques for sharing electronic information in a manner that is more flexible than current problem-specific solutions.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
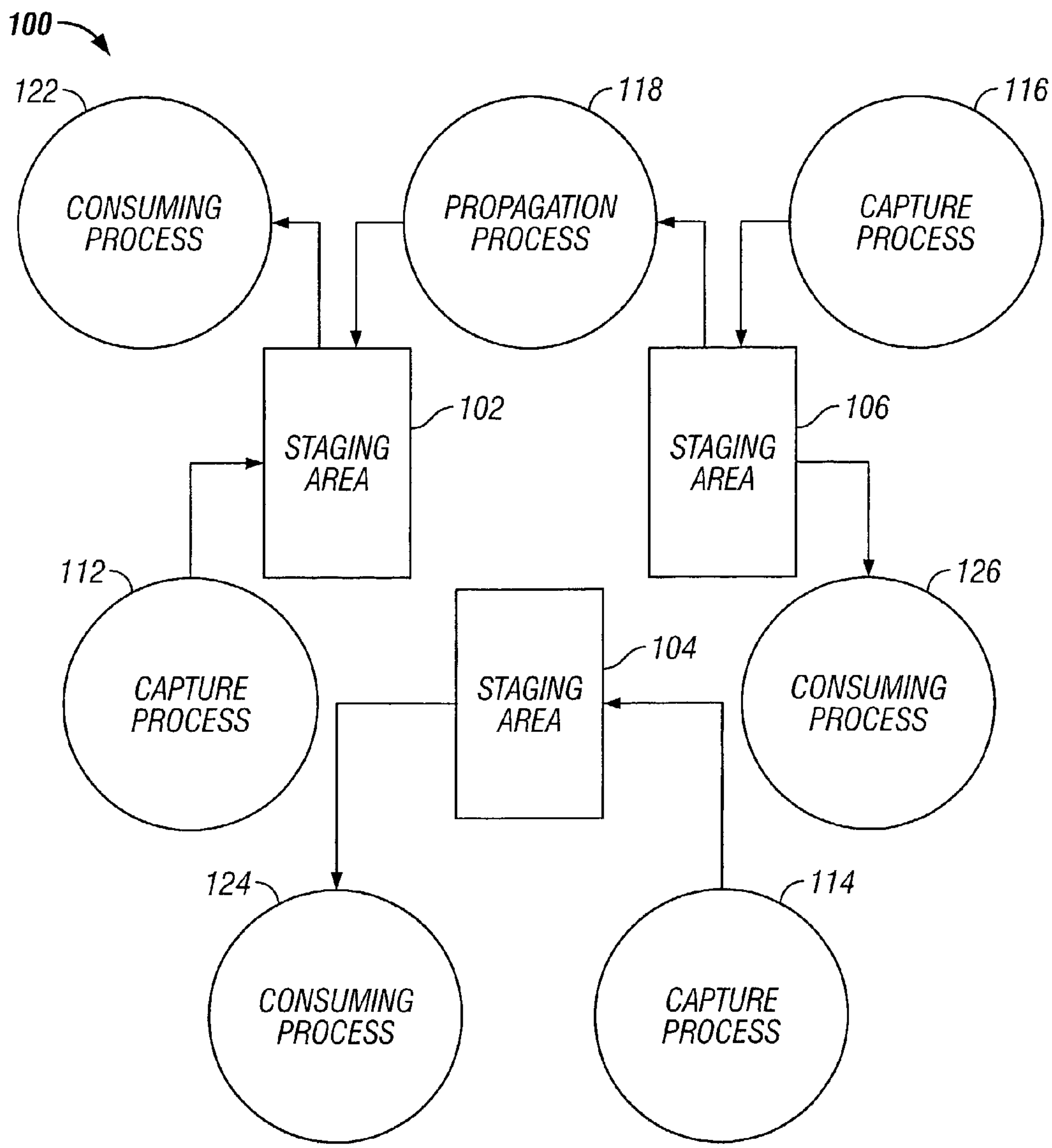
FIG. 1 is a block diagram of an information sharing system configured according to an embodiment of the invention.

A method and system are described for sharing electronic information. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Chains of Triggered Activities

Conventional database system technology frequently treats the manipulation of data as an isolated action. However, in many real-world scenarios, this is not the case. Specifically, the manipulation of data often triggers a series or "chain" of activities. The activities thus triggered my fall into various categories, including but not limited to:

- Information creation, modification, deletion, or the passage of time: activities in this category may constitute a "business event".
- Evaluation of information requirements: determining who needs/likes to be informed about a business event.
- Creation of desired information: the information is created in a mutually agreed format, using applications, views, and/or transformations.
- Transfer of information to the desired location via the desired transport.
- Modification of the data at a target location: absorption of new information in the target environment organized according to the needs of the recipient.
- Notification of new state: provides low latency knowledge for recipients or programs; notification may activate applications.
- Access to information: potentially for a reaction, creating and/or modifying information (thereby causing another "business event").

According to one embodiment, rules may be established for the various activities to automatically carry out the chain of activities that are desired for certain data modification events. Of course, the specific chain of activities that is triggered by any given data manipulation event will vary based on the nature of the event and the rules that have been established.

Functional Overview

A flexible asynchronous information sharing system is described hereafter. The system provides numerous features that can be used alone or in combination to solve wide varieties of information sharing problems. According to one embodiment, the information sharing system includes one or more staging areas for storing information that is to be shared. One set of software processes, referred to herein as "capture processes", place information in the staging areas. Another set of software processes, referred to herein as "consuming processes", consume information from the staging areas.

According to one embodiment, the information sharing performed through the staging areas is asynchronous. Specifically, the processes that generate changes that are captured by capture processes do not pause execution to await the capture of the changes by the capture processes. Conversely, the capture processes need not report back to the processes that generated the changes. Similarly, the capture processes do not pause execution to await the further processing of the information that they add to the staging areas. Similarly, the consuming processes need not report back to the capture processes to prompt the capture processes to continue execution.

According to one aspect, the information sharing system supports a wide variety of capture processes, including implicit capture processes and explicit capture processes. An implicit capture process is a process that adds the information to one or more staging areas based on events that occur in a system associated with said implicit capture process. A log capture process is an example of an implicit capture process. A log capture process reads logs, such as logs generated by a database system in response to events that occur within the database system, and places information into a staging area based on the contents of the logs. An explicit capture process is a process the adds information to a staging area by making an explicit function call, through an API associated with a staging area, to add information to the staging area.

According to another aspect, the information sharing system supports a wide variety of consuming processes, including apply processes, propagation processes and explicit dequeue processes. An apply process is a process that automatically dequeues and acts upon information contained in a staging area. A propagation process automatically dequeues and moves information from one staging area to a specified destination. The specified destination may be, for example, another staging area. An explicit dequeue processes retrieves information from a staging area by making an explicit call, through an API associated with the staging area, to retrieve the information from the staging area.

Consuming processes may be configured to perform a wide variety of operations with the information they consume. For example, a consuming process may be configured to deliver messages that are extracted from the queue to "subscriber processes" that have previously registered an interest in receiving, or being notified about, certain types of information or events. In another context, the extracted information may represent changes that have been made within one database system, and the consuming process may be configured to make corresponding changes in another database system.

SYSTEM OVERVIEW

FIG. 1 is a block diagram of a system 100 for asynchronously sharing information according to an embodiment of the invention. Referring to FIG. 1, it includes a plurality of staging areas 102, 104, 106. Information is added to each of staging areas 102, 104, 106 by capture processes 112, 114 and 116, respectively. Information is consumed from each of staging areas 102, 104, 106 by consuming processes 122, 124 and 126, respectively. Capture processes 112, 114 and 116 may include implicit capture processes and/or explicit capture processes. Consuming processes 122, 124 and 126 may include apply processes and explicit dequeue processes.

System 100 further includes a propagation process 118 configured to extract information from one staging area 106 and add the information to another staging area 102. As shall be described in greater detail hereafter, the source and target of a propagation process 118 need not always be a staging area. For example, a propagation process may be configured to selectively extract information from a staging area and send the extracted information to another process that is interested in the information. The other process may be, for example, a process running in a system that is remote relative to system 100.

According to one embodiment, staging areas 102, 104 and 106 are implemented as queues that are not type-specific. Because the staging areas 102, 104 and 106 are not type-specific, the same staging area can be used to store numerous different types of data. Consequently, various pieces of information may be stored together within a staging area in a sequence or arrangement that reflects a relationship between the pieces of information, even when the pieces of information correspond to different types of data. In alternative embodiments, the staging areas may be type specific, where each staging area is designed to store a particular type of information item.

Information sharing system 100 enables users to share data and events. The information sharing system 100 can propagate this information within a database or from one database to another. The information sharing system 100 routes specified information to specified destinations. The result is a new feature that provides greater functionality and flexibility than traditional solutions for capturing and managing events, and sharing the events with other databases and applications. Information sharing system 100 enables users to break the cycle of trading off one solution for another. Information sharing system 100 provides the capabilities needed to build and operate distributed enterprises and applications, data warehouses, and high availability solutions. Users can use all the capabilities of information sharing system 100 at the same time. If needs change, then users can implement a new capability of information sharing system 100 without sacrificing existing capabilities.

Figure 2:
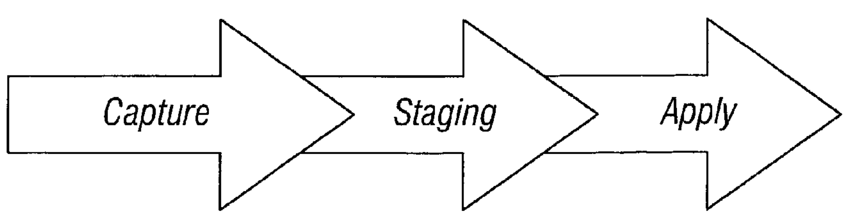
FIG. 2 is a block diagram illustrating three general phases experienced by data items as they flow through an information sharing system, according to an embodiment of the invention.

Using information sharing system 100, users control what information is put into the information sharing system 100, how the information flows or is routed from staging area to staging area or from database to database, what happens to events in the information sharing system 100 as they flow into each database, and how the information sharing system 100 terminates. By configuring specific capabilities of information sharing system 100, users can address specific requirements. Based on user specifications, information sharing system 100 can capture, stage, and manage events in the database automatically, including, but not limited to, data manipulation language (DML) changes and data definition language (DDL) changes. Users can also put user-defined events into the information sharing system 100. Then, information sharing system 100 can propagate the information to other databases or applications automatically. Again, based on user specifications, information sharing system 100 can apply events at a destination database. FIG. 2 shows the phases through which information typically flows when being shared through information sharing system 100.

Information Sharing Options

As mentioned above, the chain of activities that can be carried out by system 100 in response to an event may take many forms. In general, the chain of activities may involve one or more of: Data capture, out-bound staging, propagation, in-bound staging and consumption. According to one embodiment, system 100 provides mechanisms to perform each of these activities in a variety of ways. Table 1 lists various options for some of the characteristics for each of the various activities.

TABLE 1

| COMPONENT | ELEMENT | OPTION | COMMENTS |
|---|---|---|---|
| Data Capture | Mode | E - Explicit<br>I - Implicit | One to choose |
| | Data Type | S - Schema<br>B - Business Object | One to choose |
| | Constraints | N - None<br>S - Sequence<br>CY - Cycle<br>CO - Conflict<br>P - Process<br>D - Data<br>TR - Transactional | Any combination |
| Staging: Out-Bound | | N - None<br>J - Journal<br>B - Basic<br>S - SQL | One to choose |
| Propagation | Delivery | B - Best Effort<br>E - Exactly Once | One to choose |
| | Security | C - Confidential<br>S - Signed | Any combination |
| | Addressing | O - Open<br>C - Closed | One to choose |
| | Constraints | Same options as data capture | |
| Staging: In-Bound | | Same options as Staging Out-bound, except J | |
| Consumption | | Same options as data capture | |

With respect to the data type in which information is captured, the "schema" option refers to a schema-oriented view of the data. Conversely, the "B" option refers to a business document oriented view of the data.

The list of activities, elements, and corresponding options given in Table 1 is not exhaustive. The information sharing framework described herein may be implemented in a manner that provides numerous other activities, elements and options. For example, another option for the delivery element of the propagation activity may be "at least once". Thus, Table 1 is merely intended to illustrate the flexibility of the information sharing system described herein.

Table 2 illustrates how the flexibility of the information system described herein may be exploited to accomplish information sharing tasks in a diversity of contexts. Specifically, Table 2 lists a context in which information sharing is desirable or required, and lists the options that might be used when using system 100 to carry out the information sharing activities in that context.

TABLE 2

| CONTEXT | DATA CAPTURE AND CONSUMPTION OPTIONS | OUT-BOUND STAGING OPTIONS | PROPAGA-TION OPTIONS | INBOUND STAGING OPTIONS |
|---|---|---|---|---|
| Messaging - Local | E, B, TR | B/S | N/A | N/A |
| Messaging - Remote | E, B, TR | B/S | *, *, *, TR | B/S |
| Application to Application | E, B, P, TR | S | E, C, O, TR | S |
| Replication - Standard | I, S, S, CY, CO, TR | S | E, C, C, TR | B |
| Replication - Journal | I, S, S, CY, CO, TR | J | E, C, C, TR | B |
| Replication - Semantic or B2B | I, B, S, CY, CO, TR | S/J | E, C, C, TR | B |
| HA | I, S, TR | J | E, C, C, TR | B |
| HA - Semantic | I, B, TR | J | E, C, C, TR | B |
| B2B Messaging | E, B, TR | S | E, *, O, TR | S |
| B2B Protocols | E, B, P, TR | S | E, *, O, TR | S |

Operational Overview of Information Sharing System 100

According to one embodiment, users can use information sharing system 100 to capture changes at a database, enqueue events into a queue, propagate events from one queue to another, dequeue events, apply events at a database, implement directed networks, perform automatic conflict detection and resolution, perform transformations, and implement heterogeneous information sharing.

With respect to capturing changes, users can configure a background log capture process to capture changes made to tables, schemas, or the entire database. According to one embodiment, a log capture process captures changes from the redo log and formats each captured change into a "logical change record" (LCR). The database where changes are generated in the redo log is called the source database.

With respect to placing events into a queue, at least two types of events may be staged in a queue of information sharing system 100: LCRs and user messages. A capture process enqueues events into a queue that users specify. The queue can then share the events within the same database or with other databases. Users can also enqueue user events explicitly with a user application. These explicitly enqueued events can be LCRs or user messages.

With respect to propagating events from one queue to another, the queues may be in the same database or in different databases.

With respect to dequeueing events, a background apply process can dequeue events. Users can also dequeue events explicitly with a user application.

With respect to applying events at a database, users can configure an apply process to apply all of the events in a queue or only the events that users specify. Users can also configure an apply process to call user-created subprograms (e.g. subprograms written in the PL/SQL language) to process events. The database where events are applied and other types of events are processed is called the destination database. In some configurations, the source database and the destination database may be the same.

Typical Applications of Information Sharing System 100

Information sharing system 100 is flexible enough to achieve a virtually unlimited number of information sharing objectives. Consequently, the number of applications to which information sharing system 100 may be put is equally great. For the purpose of illustrating the utility and versatility of information sharing system 100, details shall be given as to how information sharing system may be applied to implement message queuing and data replication.

With respect to message queuing, information sharing system 100 allows user applications to enqueue messages of different types, propagate the messages to subscribing queues, notify user applications that messages are ready for consumption, and dequeue messages at the destination database. A rule-based message notification consuming process may be used in conjunction with a log capture process. With this combination of components, the capture process may add to a staging area LCRs that reflect events reflected in the log files of a database, and the consuming process may send out notifications to those subscribers that have indicated an interest in particular types of database events. The specific events in which subscribers are interested may be stored as subscription data, which may identify the data in which a subscriber is interested using one or more SQL statements. Significantly, such notifications may be sent directly to subscribers, to subscribers through remote but compatible messaging systems, or to subscribers through message gateways to messaging systems that are otherwise incompatible with the system in which the LCRs were originally generated.

According to one embodiment, information sharing system 100 implements staging areas 102, 104 and 106 using a type of queue that stages messages of SYS.AnyData type. Messages of almost any type can be wrapped in a SYS.AnyData wrapper and staged in SYS.AnyData queues. Information sharing system 100 interoperates with a queuing mechanism that supports all the standard features of message queuing systems, including multiconsumer queues, publishing and subscribing, content-based routing, Internet propagation, transformations, and gateways to other messaging subsystems.

With respect to data replication, information sharing system 100 can efficiently capture both Data Manipulation Language (DML) and Data Definition Language (DDL) changes made to database objects and replicate those changes to one or more other databases. A capture process (e.g. capture process 116) captures changes made to source database objects and formats them into LCRs, which can be propagated to destination databases (e.g. via propagation process 118) and then applied by an apply processes (e.g. consuming process 122).

The destination databases can allow DML and DDL changes to the same database objects, and these changes may or may not be propagated to the other databases in the environment. In other words, users can configure information sharing system 100 with one database that propagates changes, or users can configure an environment where changes are propagated between databases bidirectionally. Also, the tables for which data is shared need not be identical copies at all databases. Both the structure and the contents of these tables can differ at different databases, and the information in these tables can be shared between these databases.

Core Services

The components of system 100 provide a set of core services. According to one embodiment, those core services include event capturing, event distribution and event consumption.

Event capturing generally refers to establishing a record of events that occur in a system of interest. For example, the system of interest may be a database system, and the event capturing may be performed by a set of capture processes, as shall be described in greater detail hereafter.

Event distribution generally refers to distributing information about the events to the entities that are interested in the events. Such entities may reside within the system that created the event of interest, or external to the system. For example, event distribution may involve sending information about the changes that are made in one database system to another database system.

Event consumption generally refers to reading the captured event information. Frequently, the consuming process will perform some action, or initiate some chain of activities, based upon the captured events. For example, a process in a target database system that receives change information from a source database system may read the change information from the source database system and initiate changes in the target database system based on corresponding changes made in the source database system.

Implicit Capture Process Example

As mentioned above, system 100 supports both explicit and implicit capture processes. A log capture process is an example of an implicit capture process. According to one embodiment, a log capture process is a process configured to read information stored in the log files of a database server, and to store information into one or more staging areas based on the information in the log files. Such log files may include, for example, the redo log files that are generated by the database system to record changes that are being made by the database system.

A redo log file may, for example, include a redo record that indicates that, at a particular point in time, the database server changed the value in a particular column of a particular row of a particular table from X to Y. The information contained in such redo records is typically used by the database server to ensure that no committed changes are lost when failures occur. However, the use of a log capture process to selectively share the information contained in the redo records with other processes, by placing the information in one or more staging areas accessible to consuming processes, allows the information to be used in a wide variety of ways beyond the recovery purpose for which the logs were originally generated. For example, consuming processes may selectively provide the change information from the staging area to processes that reside external to the database server that produced the logs.

According to one embodiment, the log capture process selectively captures information from a log file. For example, an asynchronous trigger may be defined to fire in response to a particular type of change made to a particular table. Consequently, when a transaction makes the particular type of change to the particular table (1) the database server will generate a redo record in response to the change, and (2) the trigger will fire and a capture process will capture the new redo record. Because the trigger is asynchronous, the execution of the capture process will not be performed as part of the transaction that caused the change. Thus, the transaction may proceed without waiting for the capture process, and the capture process may capture the new redo record some time after the change was made.

Executing the capture process in response to the firing of an asynchronous trigger is merely one example of capture process operation. Alternatively, the log capture process may simply be programmed to check the appropriate logs for new records on a periodic basis. As another alternative, the log capture process may be executed in response to a synchronous trigger. When a synchronous trigger is used, the capturing operation is performed by the capture process as part of the transaction that made the change that caused the trigger to fire. Thus, the capture of the change is "synchronous" relative to the transaction that caused the change. However, any other activities in the chain of activities associated with the chain (e.g. staging, propagation, consumption) may still be performed asynchronous relative to that transaction.

According to one embodiment, the capture process retrieves the change data extracted from the redo log, and formats the change data into an LCR. The capture process places the LCR into a staging area for further processing. In one embodiment, support is provided for both hot mining an online redo log, and mining archived log files. When hot mining is performed, the redo stream may be mined for change data at the same time it is written, thereby reducing the latency of capture.

As mentioned above, changes made to database objects in a typical database are logged in the redo log to guarantee recoverability in the event of user error or media failure. In one embodiment, an implicit capture process is a background process, executing within the database server that is managing a database, that reads the database redo log to capture DML and DDL changes made to database objects. After formatting these changes into LCRs, the implicit capture process enqueues them into a staging area.

Figure 3:
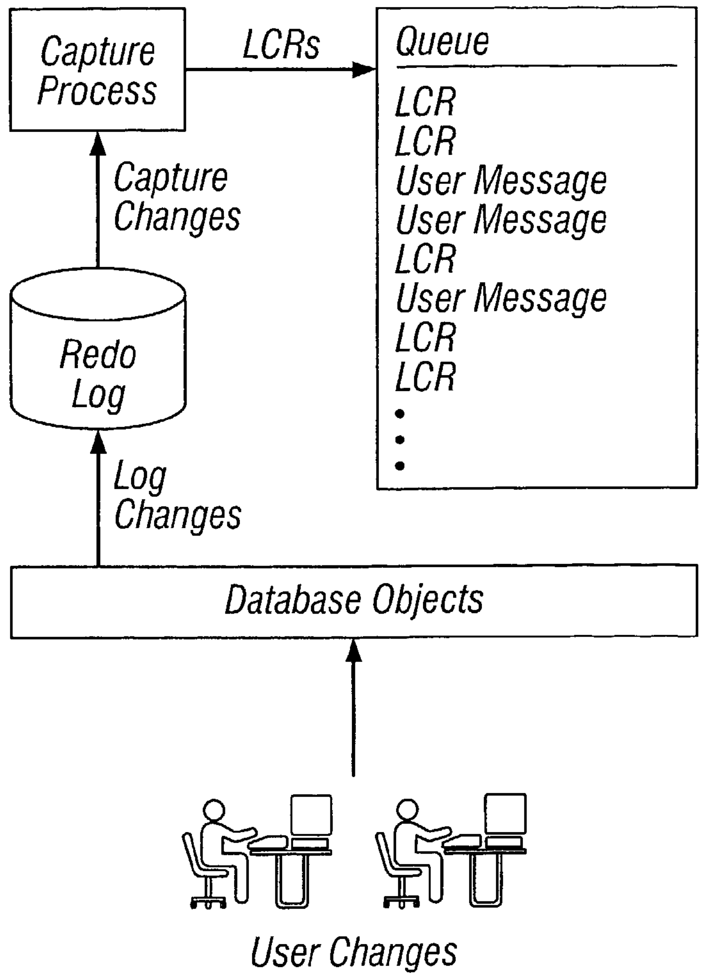
FIG. 3 is a block diagram illustrating the automated capture of changes in a database, according to an embodiment of the invention.

According to one embodiment, there are several types of LCRs, including: row LCRs contain information about a change to a row in table resulting from a DML operation, and DDL LCRs contain information about a DDL change to a database object. Users use rules to specify which changes are captured. FIG. 3 shows an implicit capture process capturing LCRs.

As shall be explained in greater detail hereafter, users can specify "tags" for redo entries generated by a certain session or by an apply process. These tags then become part of the LCRs captured by a capture process. A tag can be used to determine whether a redo entry or an LCR contains a change that originated in the local database or at a different database, so that users can avoid sending LCRs back to the database where they originated. Tags may be used for other LCR tracking purposes as well. Users can also use tags to specify the set of destination databases for each LCR. Depending on the rules that have been established for the various components of information sharing system 100, the tag values associated with an LCR may be set, modified and/or transformed at various points as the LCR flows through the system. For example, for an LCR created for a change identified in a log file, a tag value may be set by the capture process to indicate the database in which the change originated. As another example, a tag value for an LCR may be set by a propagation process to indicate the system from which the propagation process is propagating the LCR.

A capture process that mines logs for changes may reside either locally (in the system whose logs are being mined) or remotely (outside the system whose logs are being mined). Where the capture process is executing remotely, the logs may be exported from the system that generated them to the system in which the capture process is executing. For example, a capture process may be configured to mine the logs of a first database, and to store into a staging area LCRs for the various events represented in the logs. The capture process may actually be executing in a second database system. In this scenario, the log files may be communicated from the first database system to the second database system, for processing by the capture process in the second database system. The staging area into which the capture process stores the LCRs may also reside within the second database system. The ability to "offload" the overhead associated with the capture process in this matter may be useful for the purposes of load and resource balancing.

Staging Areas

As illustrated in FIG. 1, staging areas may be used to temporarily hold information between capture, distribution and consumption of the information. The nature of the staging area that is used to hold the information may vary depending on the nature of the information and the chain of activities triggered by the information. For example, the staging area used to hold information between capture, distribution and consumption of the information may take any of the following forms:

- None: captured information is passed directly to a propagation or consumption process.
- Journal: information in a recovery journal is used to find the captured events.
- Basic: the information is held in a memory area that does not itself provide a recovery mechanism.
- SQL: the information is stored, but not necessarily retained, in a data container that can be queried using a database language, such as SQL.
- Documented: the same as the SQL option, except that the information is retained in the data container.
- Staging areas with the characteristics described above may be implemented in a variety of ways, and the present invention in not limited to any specific implementation. For example, the SQL and Documented options may be implemented using the Advanced Queuing mechanisms in the Oracle 9iR2 database system currently available for Oracle Corporation. Further, the Advanced Queuing functionality may be used in conjunction with Oracle Workflow 2.6, also available for Oracle Corporation, to attain the ability to check events in the context of other events. For example, an explicit event (e.g. a message received from an application in a call made by the application through an API) can be seen in the context of other explicit events (e.g. other messages received from the same application). Similarly, an implicitly captured event (e.g. a change to data managed by a database server) can be seen in the context of other implicitly captured events (e.g. other database changes).

In one embodiment, information sharing system 100 uses queues to stage events for propagation or consumption. Users can use information sharing system 100 to propagate events from one queue to another, and these queues can be in the same database or in different databases. The queue from which the events are propagated is called the source queue, and the queue that receives the events is called the destination queue. There can be a one-to-many, many-to-one, or many-to-many relationship between source and destination queues.

Figure 4:
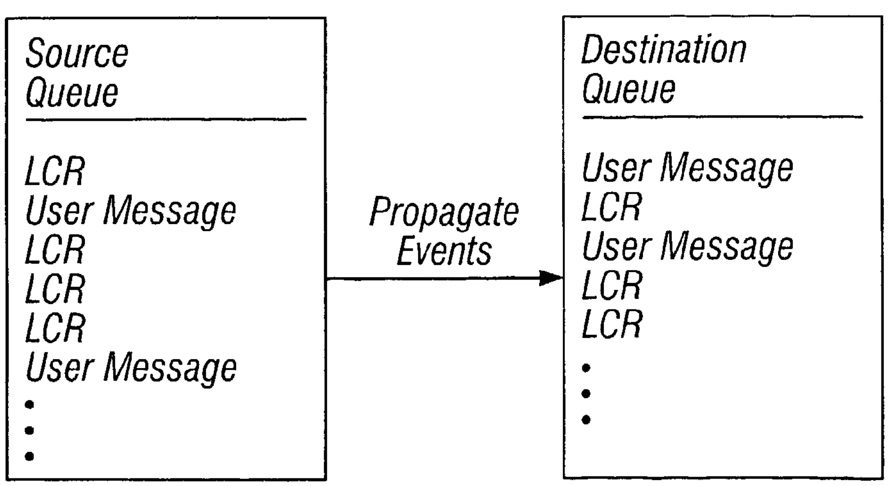
FIG. 4 is a block diagram illustrating events that are propagated from a source queue to a destination queue according to an embodiment of the invention.

Events that are staged in a queue can be consumed by one or more consuming processes, such as an apply processes or a user-defined subprogram. If users configure a propagation process (e.g. propagation process 118) to propagate changes from a source queue to a destination queue, then users can use rules to specify which changes are propagated. FIG. 4 shows propagation from a source queue to a destination queue.

Directed Networks Overview

Information sharing system 100 enables users to configure an environment where changes are shared through directed networks. A directed network is a network in which propagated events may pass through one or more intermediate databases before arriving at a destination database. The events may or may not be processed at an intermediate database. Using information sharing system 100, users can choose which events are propagated to each destination database, and users can specify the route events will traverse on their way to a destination database.

Figure 5:
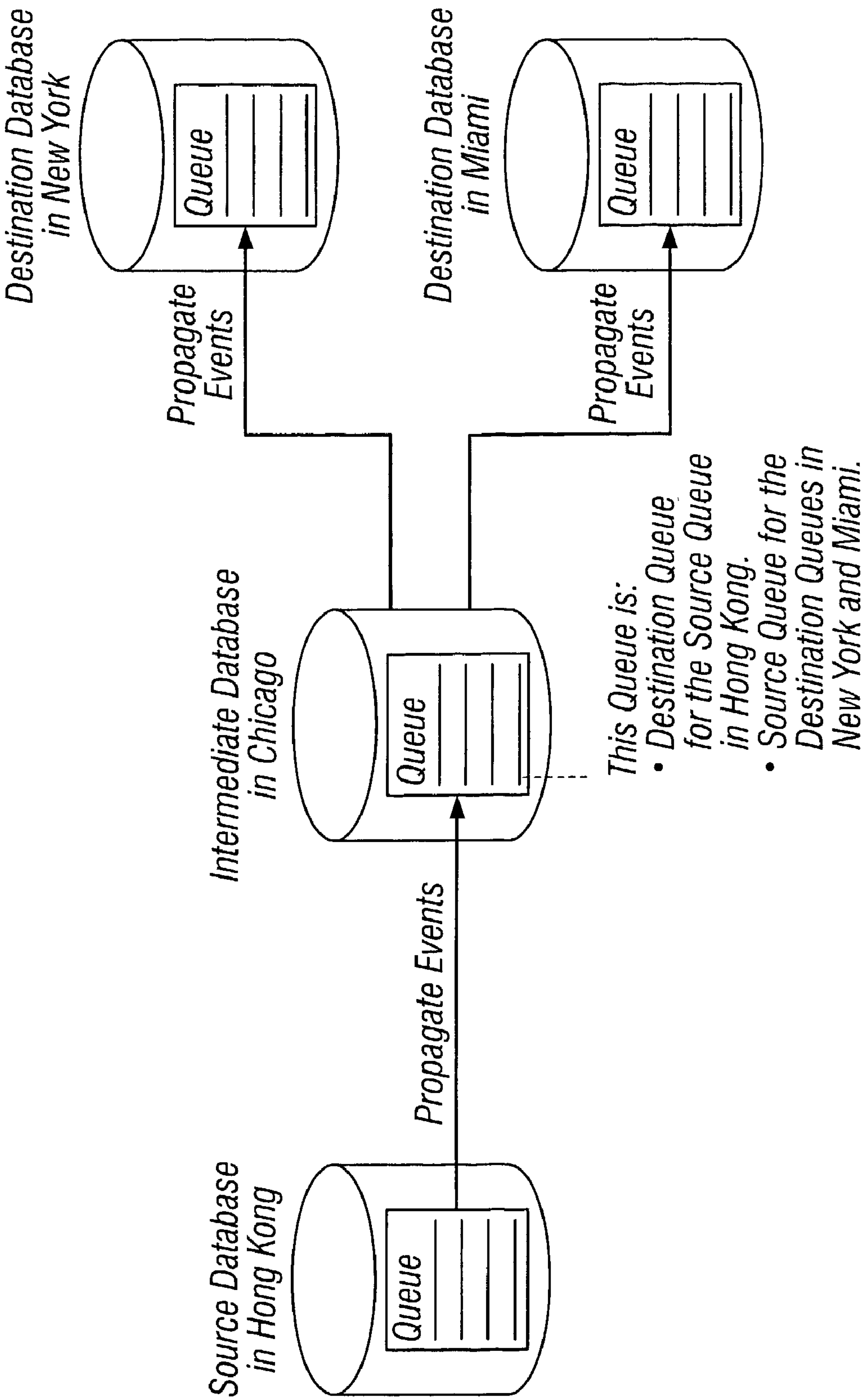
FIG. 5 is a block diagram illustrating a directed networks environment, implemented according to an embodiment of the invention.

FIG. 5 shows an example directed networks environment. In the example shown in FIG. 5, the queue at the intermediate database in Chicago is both a source queue and a destination queue.

Explicit Enqueue and Dequeue of Events

Figure 6:
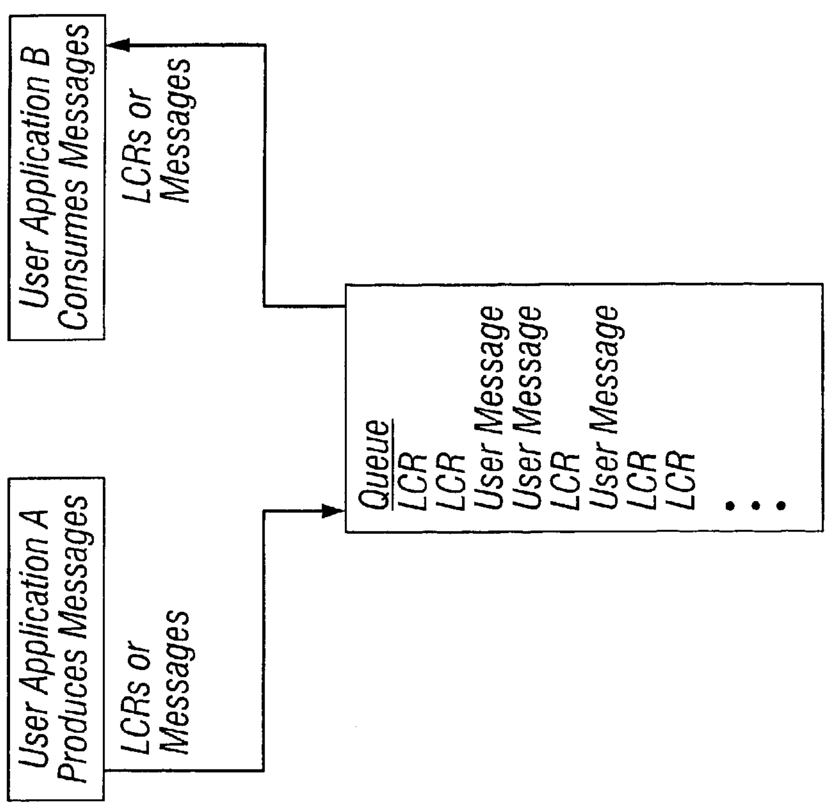
FIG. 6 is a block diagram illustrating the explicit enqueue and dequeue of events in a single queue, according to an embodiment of the invention.

User applications can explicitly enqueue events into a staging area of information sharing system 100. User applications can format these events as LCRs, which allows an apply process to apply them at a destination database. Alternatively, these events can be formatted as user messages for consumption by another user application, which either explicitly dequeues the events or processes the events with callbacks from an apply process. Events that were explicitly enqueued into a queue can be explicitly dequeued from the same queue. FIG. 6 shows explicit enqueue of events into and dequeue of events from the same queue.

Figure 7:
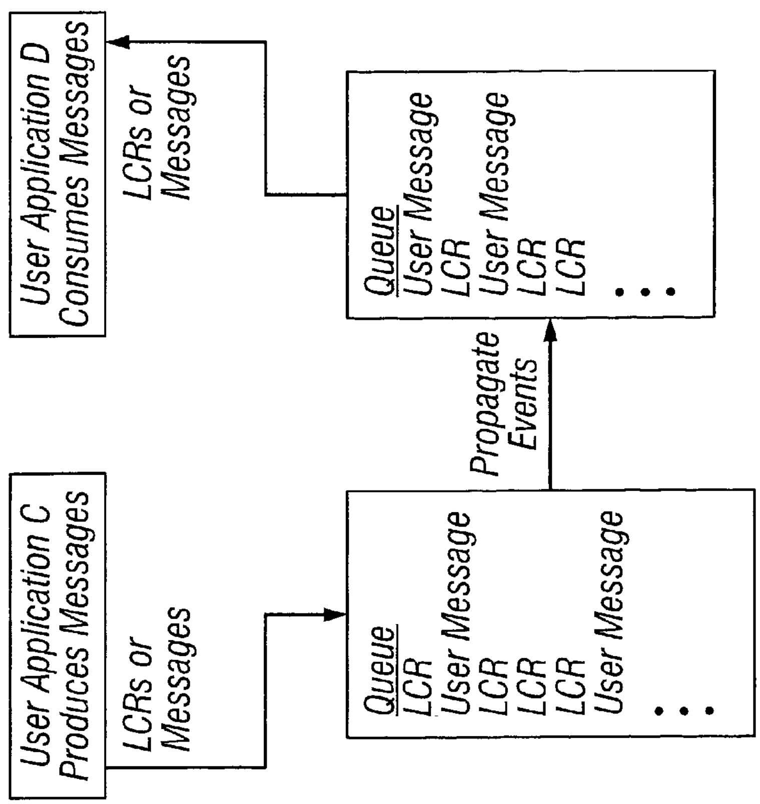
FIG. 7 is a block diagram illustrating an explicit enqueue, propagation and dequeue of events, according to an embodiment of the invention.

When events are propagated between queues, events that were explicitly enqueued into a source queue can be explicitly dequeued from a destination queue by a user application without any intervention from an apply process. FIG. 7 shows explicit enqueue of events into a source queue, propagation to a destination queue, and then explicit dequeue of events from the destination queue.

While many of the examples given herein involve the capture, propagation and application of LCRs, the techniques illustrated in those examples are equally applicable to any form of shared data. Such shared data may, for example, take the form of explicitly enqueued user messages, or even implicitly captured information that is organized in a format that differs from LCRs.

Apply Process Overview

According to one embodiment, an apply process is a background process, running within a database server, that dequeues events from a queue and either applies each event directly to a database object or passes the event as a parameter to a user-defined procedure called an apply handler. These apply handlers can include message handlers, DML handlers, and DDL handlers.

According to one embodiment, an apply process is designed to be aware of transaction boundaries. For example, an apply process is aware of which changes, represented in the LCRs that the apply process is consuming, were initially made as part of the same transaction. The apply process assembles the changes into transactions, and applies the changes in a manner that takes into account the dependencies between the transactions. According to one embodiment, the apply process applies the changes in parallel, to the extent permitted by the dependencies between the transactions.

Figure 8:
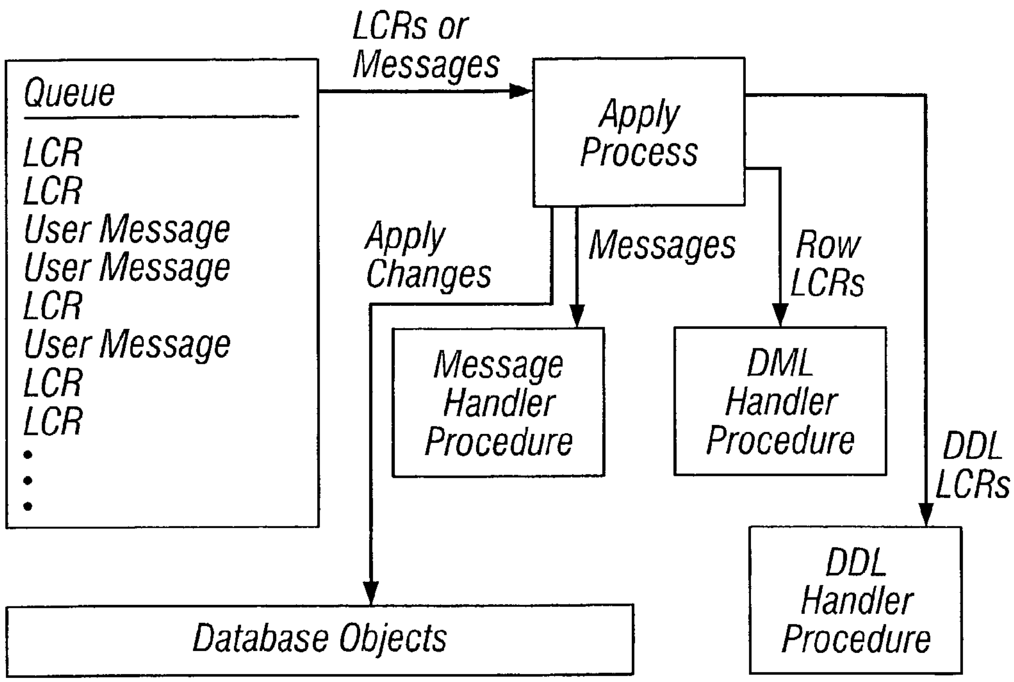
FIG. 8 is a block diagram illustrating an apply process according to an embodiment of the invention.

Typically, an apply process applies events to the local database where it is running, but, in a heterogeneous database environment, it can be configured to apply events at a remote database that is a different type of database than the local database. For example, the local database may be a database created by a database server produced by one company, and the remote database may be a database created by a database server produced by another company. Users use rules to specify which events in the queue are applied. FIG. 8 shows an apply process processing LCRs and user messages.

According to one embodiment, an apply process detects conflicts automatically when directly applying LCRs. Typically, a conflict results when the same row in the source database and destination database is changed at approximately the same time. When conflicts occur, users need a mechanism to ensure that the conflict is resolved in accordance with user-specified business rules. According to one embodiment, information sharing system 100 includes a variety of prebuilt conflict resolution handlers. Using these prebuilt handlers, users can define a conflict resolution system for each of the users' databases that resolves conflicts in accordance with user-specified business rules. If users have a unique situation that the prebuilt conflict resolution handlers cannot resolve, then users can build custom conflict resolution handlers. According to one embodiment, if a conflict is not resolved, or if a handler procedure raises an error, then all events in the transaction that raised the error are saved in an exception queue for later analysis and possible reexecution.

As mentioned above, LCRs are merely one example of the type of shared information that may be handled by an apply process. Apply processes may be configured to "apply" any form of shared information, including explicitly enqueued user messages and automatically captured data that is not organized as an LCR.

Rules-Driven Information Sharing

As explained above, each of the activities in a chain of activities may be performed in a variety of ways. For example, propagation may be performed with "Best Effort" and "Open" characteristics, or "Exactly Once" and "Closed" characteristics. According to one embodiment of the invention, a rule registration mechanism is provided to allow users to register rules that specify:

- a chain of activities to perform in response to a particular event, and
- how each activity in the chain of activities is to be performed.

According to one embodiment, the registration mechanism is implemented within a database system. When an information sharing rule is registered with the database system, the database system generates and stores metadata (referred to herein as "rules metadata") that reflects the rule. In addition, the database system generates any mechanisms required to execute the rule. For example, assume that a user wants to use system 100 to replicate at a target database a table that exists in a source database. To program system 100 to carry out the replication, the user could register a set of rules that:

- identify the database table that is to be replicated
- identify the target database, and
- specify the data capture, staging, propagation and consumption options for performing the replication In response to receipt of this set of rules, the database system would generate metadata to record the rules, and generate any supporting mechanisms to implement the rules. Such supporting mechanisms may include, for example, an asynchronous trigger for triggering execution of a capture process in response to modifications performed on the database table. The metadata might include, for example, (1) metadata that instructs the capture process about which log to capture information from, which information to capture, the capture options to use, and where to stage the captured information; (2) metadata that instructs a propagation process which information to propagate, how the information is to be transformed prior to propagation, where to propagate the data, etc. (3) metadata that instructs an apply process in the target database system where to receive the propagated information, how to process the propagated information, how to apply the propagated information to keep a table in the target database system in sync with the changes reflected in the propagated information, etc.

Rules Overview

Information sharing system 100 enables users to control which information to share and where to share it using rules. A rule is specified as a condition that is similar to the condition in the WHERE clause of a SQL query, and users can group related rules together into rule sets. According to one embodiment, a rule includes a rule condition, a rule evaluation context, and a rule action context.

The rule condition combines one or more expressions and operators and returns a Boolean value, which is a value of TRUE, FALSE, or NULL (unknown), based on an event.

The rule evaluation context defines external data that can be referenced in rule conditions. The external data can either exist as external variables, as table data, or both.

The rule action context is optional information associated with a rule that is interpreted by the client of the rules engine when the rule is evaluated.

For example, the following rule condition may be used in information sharing system 100 to specify that the schema name that owns a table must be hr and the table name must be departments for the condition to evaluate to TRUE:

dml.get_object_owner( )='hr' AND :dml.get_object_name( )='departments'

Within information sharing system 100, this rule condition may be used in the following ways:

To instruct a capture process to capture DML changes to the hr. departments table To instruct a propagation to propagate DML changes to the hr. departments table To instruct an apply process to apply DML changes to the hr. departments table Information sharing system 100 performs tasks based on rules. These tasks include capturing changes with a capture process, propagating changes with a propagation, and applying changes with an apply process. According to one embodiment, users can define rules for these tasks at three different levels: table rules, schema rules, and global rules.

When users define a table rule, the task is performed when a change is made to the table that the users specify. For example, users can define a rule that instructs a capture process to capture changes to the hr.employees table. Given this rule, if a row is inserted into the hr. employees table, then the capture process captures the insert, formats it into an LCR, and enqueues the LCR into a queue.

When users define a schema rule, the task is performed when a change is made to the database objects in the schema users specify, and any database objects added to the schema in the future. For example, users can define two rules that instruct a propagation to propagate DML and DDL changes to the hr schema from a source queue to a destination queue. Given these rules, suppose the source queue contains LCRs that define the following changes:

The hr. loc city_ix index is altered.

A row is updated in the hr. j obs table.

The propagation propagates these changes from the source queue to the destination queue, because both changes are to database objects in the hr schema.

When users define a global rule, the task is performed when a change is made to any database object in the database. If it is a global DML capture rule, then a capture process captures all DML changes to the database objects in the database. If it is a global DDL propagation or apply rule, then the task is performed for all DDL changes in a queue.

The Rules Engine

As mentioned above, the various components of system 100 may be designed with a default behavior that can be overridden by registering rules with system 100. When a rule is registered, metadata is generated within system 100 to reflect the rule. The various components of system 100 are configured to read the metadata and modify their behavior according to any rules reflected therein which (1) apply to them, and (2) apply to the context in which they are currently operating.

For example, a particular user may register a rule that changes the propagation policy from a default "Exactly once" to a new value "Best effort" when the item being propagated is a particular type of message. The process responsible for propagating that particular type of message is configured to read the metadata and use a "Best effort" propagation technique when processing that particular type of message for that particular user. However, when propagating the same type of message for other users, the propagation process may continue to use the default "Exactly once" technique.

In addition to overriding the default behavior of components, rules may be used to supplement the behavior. For example, a particular capture process may be configured to capture certain types of information and add the information to a staging area. Rules may be registered with system 100 which specify several additional tasks for the capture process to perform before, during, and/or after performing the task addressed by its default behavior. For example, the capture process may, based upon registered rules, be configured to perform numerous additional tasks when adding information to the staging area, such as (1) adding tags to the information before placing it in the staging area, and (2) sending out notifications to various entities after placing the information in the staging area.

The various processes involved in registering and managing the rules used by the components of system 100 are collectively referred to herein as the "rules engine".

Transformations Overview

A rule-based transformation is any modification to an event that results when a rule evaluates to TRUE. For example, users can use a rule-based transformation when users want to change the datatype of a particular column in a table for an event. In this case, the transformation can be a PL/SQL function that takes as input a SYS.AnyData object containing a logical change record (LCR) with a NUMBER datatype for a column and returns a SYS.AnyData object containing an LCR with a VARCHAR2 datatype for the same column.

Figure 9:
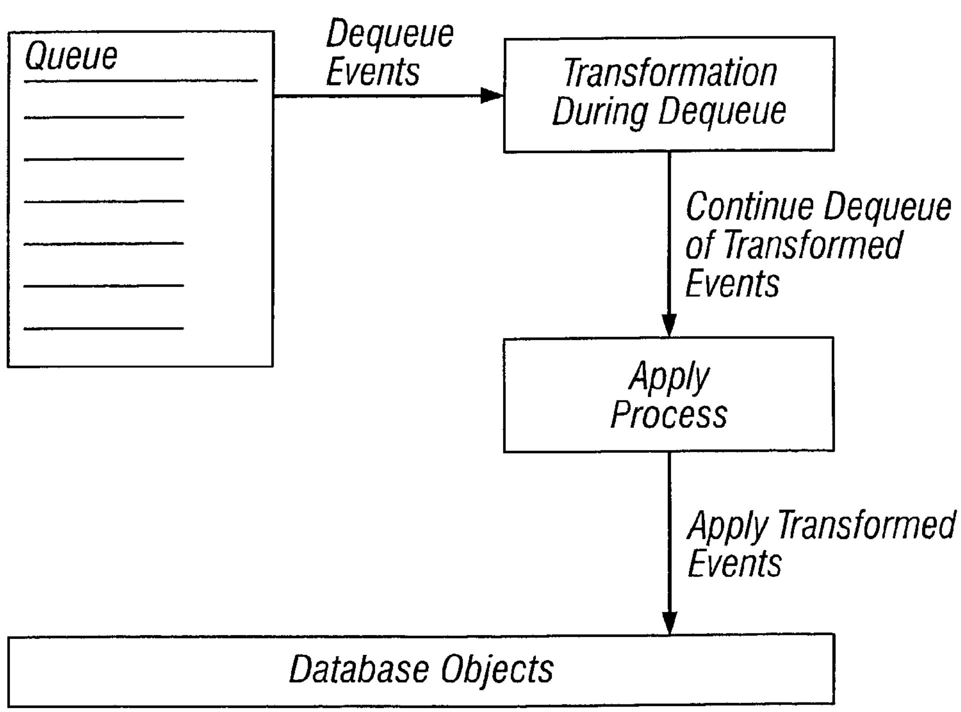
FIG. 9 is a block diagram illustrating a transformation during an apply operation, according to an embodiment of the invention.

According to one embodiment, a transformation can occur at the following times:

- During enqueue of an event, which can be useful for formatting an event in a manner appropriate for all destination databases
- During propagation of an event, which may be useful for subsetting data before it is sent to a remote site
- During dequeue of an event, which can be useful for formatting an event in a manner appropriate for a specific destination database FIG. 9 shows a rule-based transformation during apply.

Heterogeneous Information Sharing Overview

In addition to information sharing between databases produced by the same company, information sharing system 100 supports information sharing between databases from different companies. Typically, the features supported by the database system offered by one company differ from the features supported by database systems offered by other companies. Consequently, the task of sharing information between two different types of database systems can be quite challenging. As shall be described in greater detail hereafter, information sharing system 100 may be employed to significantly facilitate information sharing among such heterogeneous database systems.

For the purpose of describing how information sharing system 100 may be used to share data among heterogeneous databases, it shall be assumed that data is to be shared between an Oracle database server and a non-Oracle database server. However, the techniques described herein are not limited to such a context. Thus, the actual types of databases within the heterogeneous systems in which these techniques are applied may vary from implementation to implementation.

For the purpose of explanation, the database system that originally produces the information that is to be communicated to the other database system is referred to herein as the "source" database. Conversely, the database system that received the shared information is referred to as the "destination" database. If an Oracle database is the source and a non-Oracle database is the destination, then the non-Oracle database destination will typically lack the following components of information sharing system 100: a queue to receive events, and an apply process to dequeue and apply events.

Figure 10:
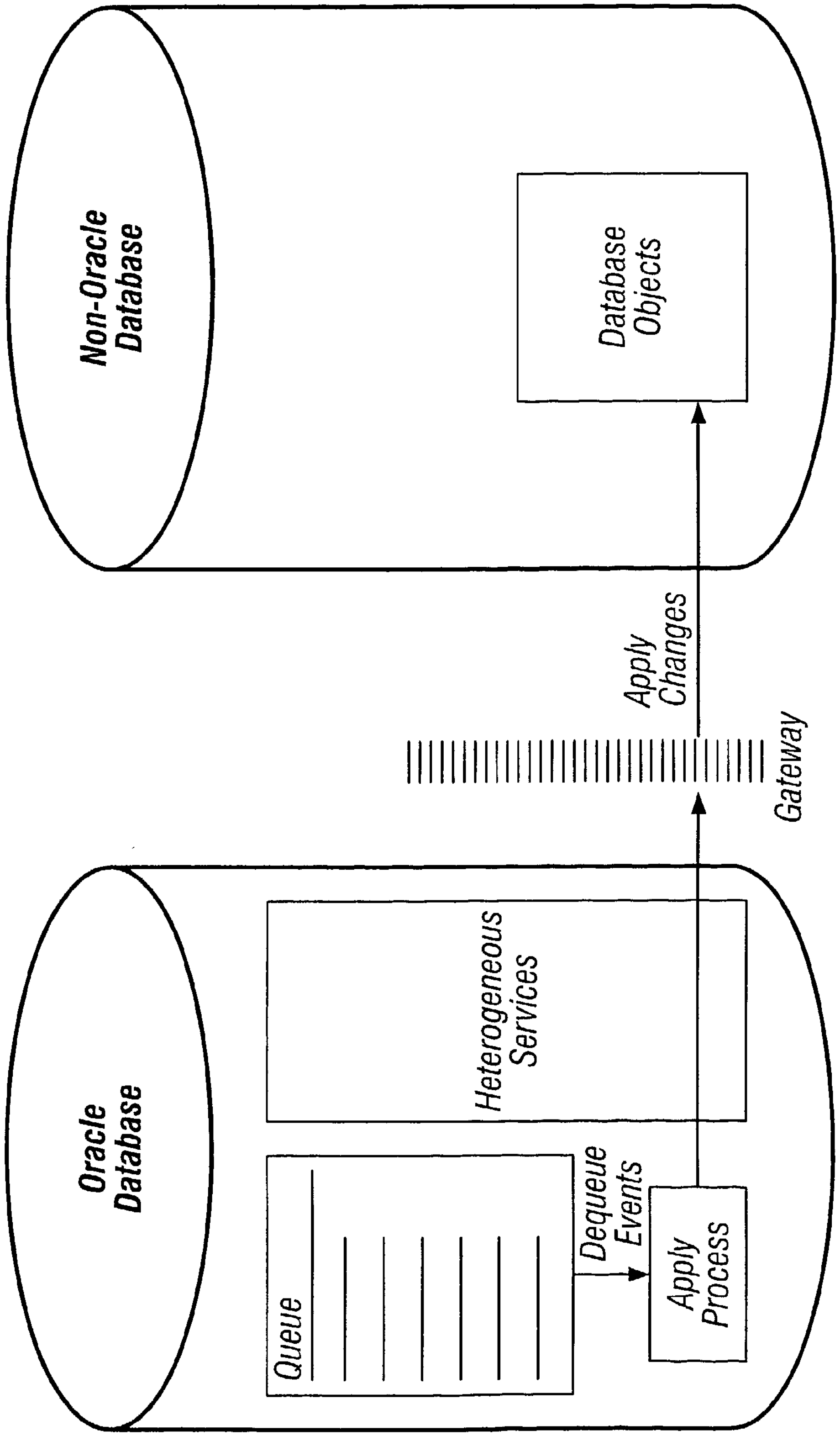
FIG. 10 is a block diagram illustrating the use of an information sharing system to share data from an Oracle database system to a non-Oracle database system.

To share DML changes from an Oracle source database with a non-Oracle destination database, the Oracle database functions as a proxy and carries out some of the steps that would normally be done at the destination database. That is, the events intended for the non-Oracle destination database are dequeued in the Oracle database itself, and an apply process at the Oracle database uses Heterogeneous Services to apply the events to the non-Oracle database across a network connection through a gateway. FIG. 10 shows an Oracle database sharing data with a non-Oracle database.

Figure 11:
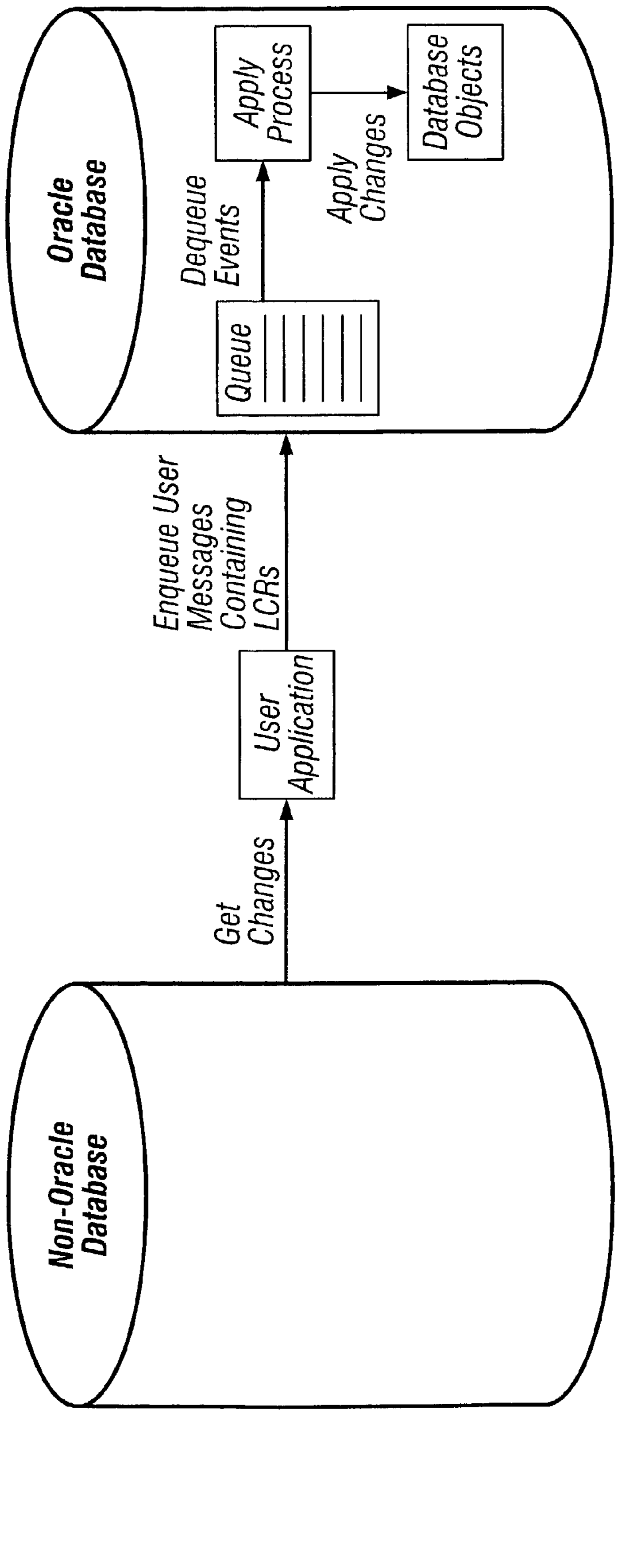
FIG. 11 is a block diagram illustrating the use of an information sharing system to share data from a non-Oracle database system to an Oracle database system.

According to one embodiment, a custom application is used to capture and propagate changes from a non-Oracle database to an Oracle database. This application gets the changes made to the non-Oracle database by reading from transaction logs, using triggers, or some other method. The application assembles and orders the transactions and converts each change into a logical change record (LCR). Then, the application enqueues the LCRs into a queue in an Oracle database by using the PL/SQL interface, where they can be processed by an apply process. FIG. 11 shows a non-Oracle databases sharing data with an Oracle database.

Figure 12:
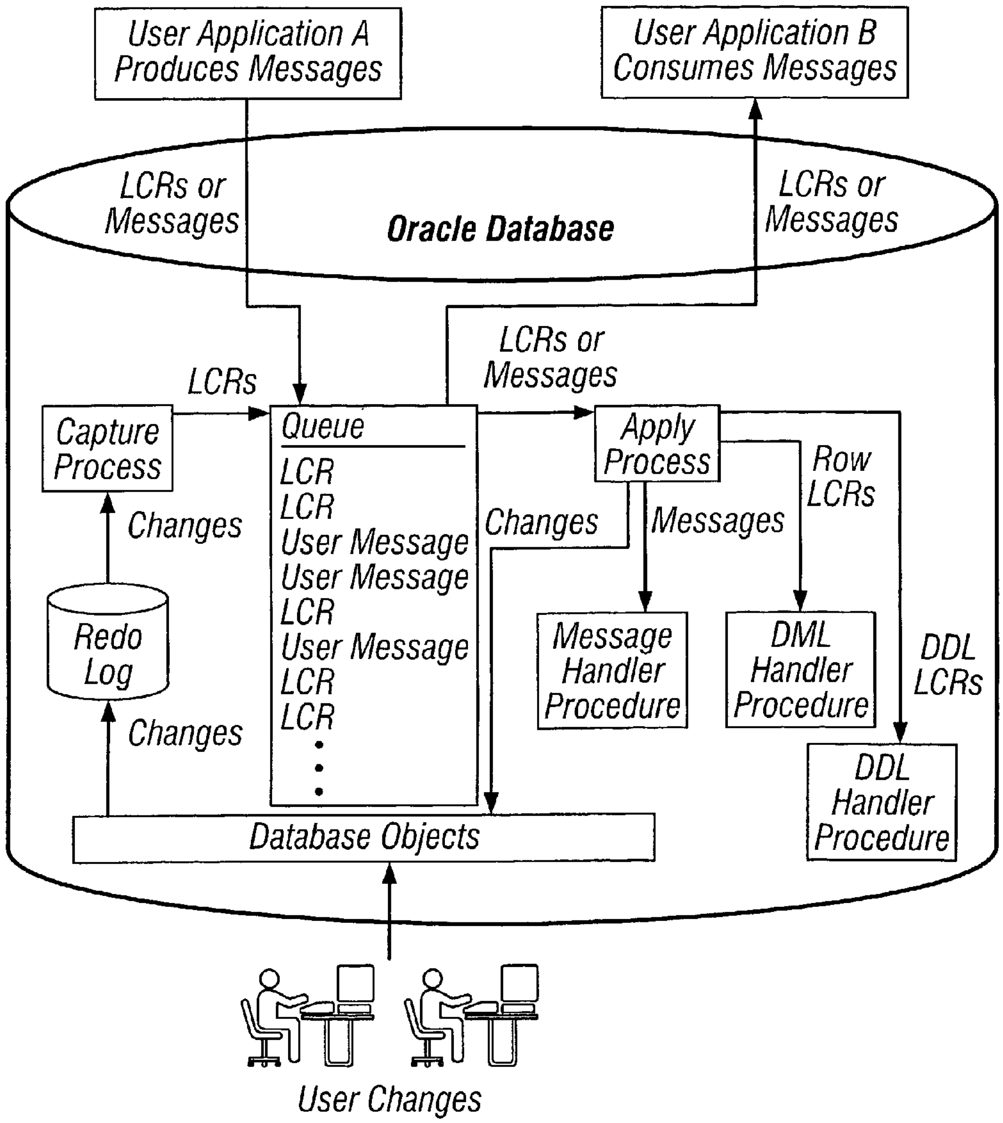
FIG. 12 is a block diagram that illustrates an information sharing system implemented within a single database, according to an embodiment of the invention.
Figure 13A:
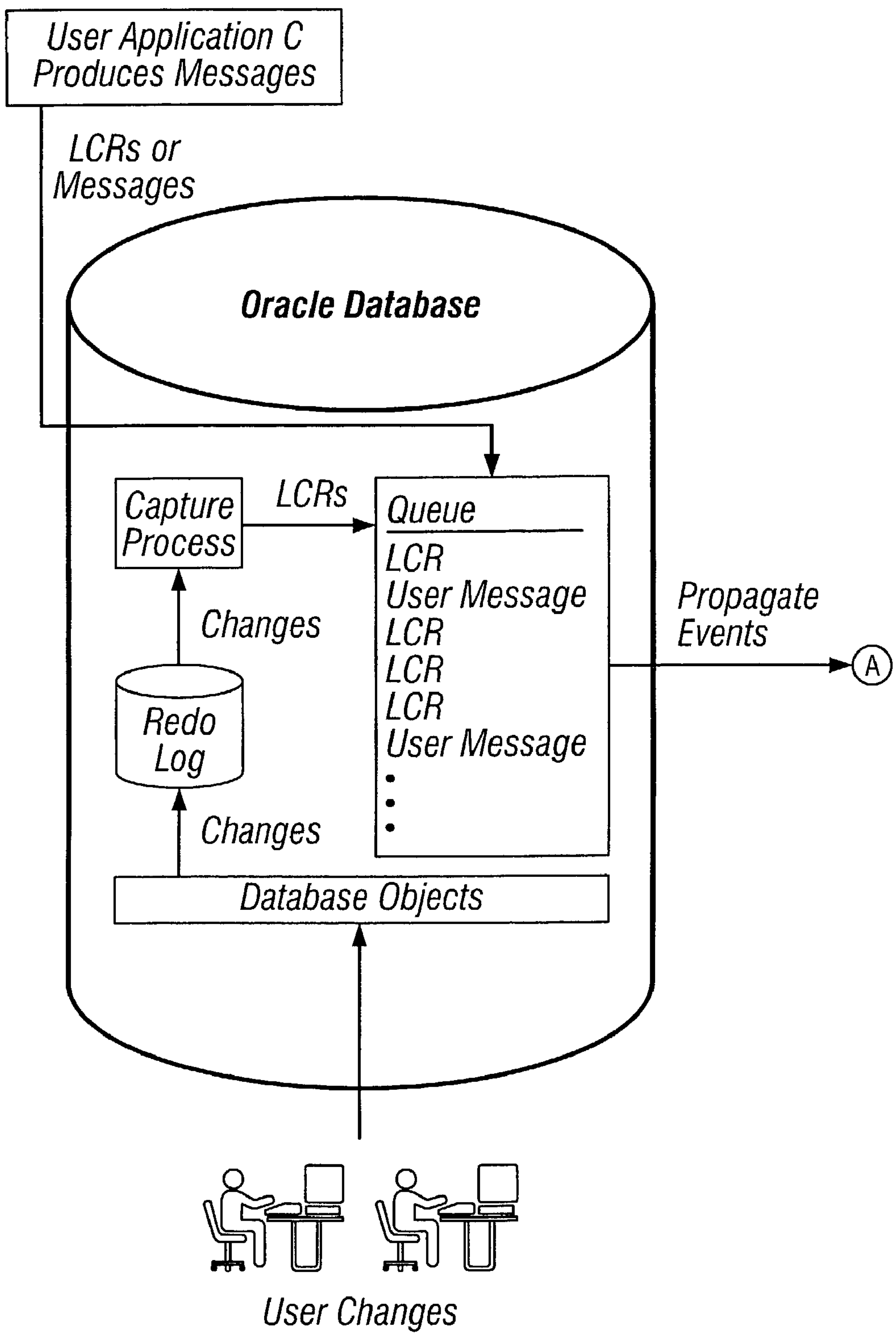
FIGS. 13A and 13B are block diagrams illustrating an information sharing system used to share information between multiple databases, according to an embodiment of the invention.
Figure 13B:
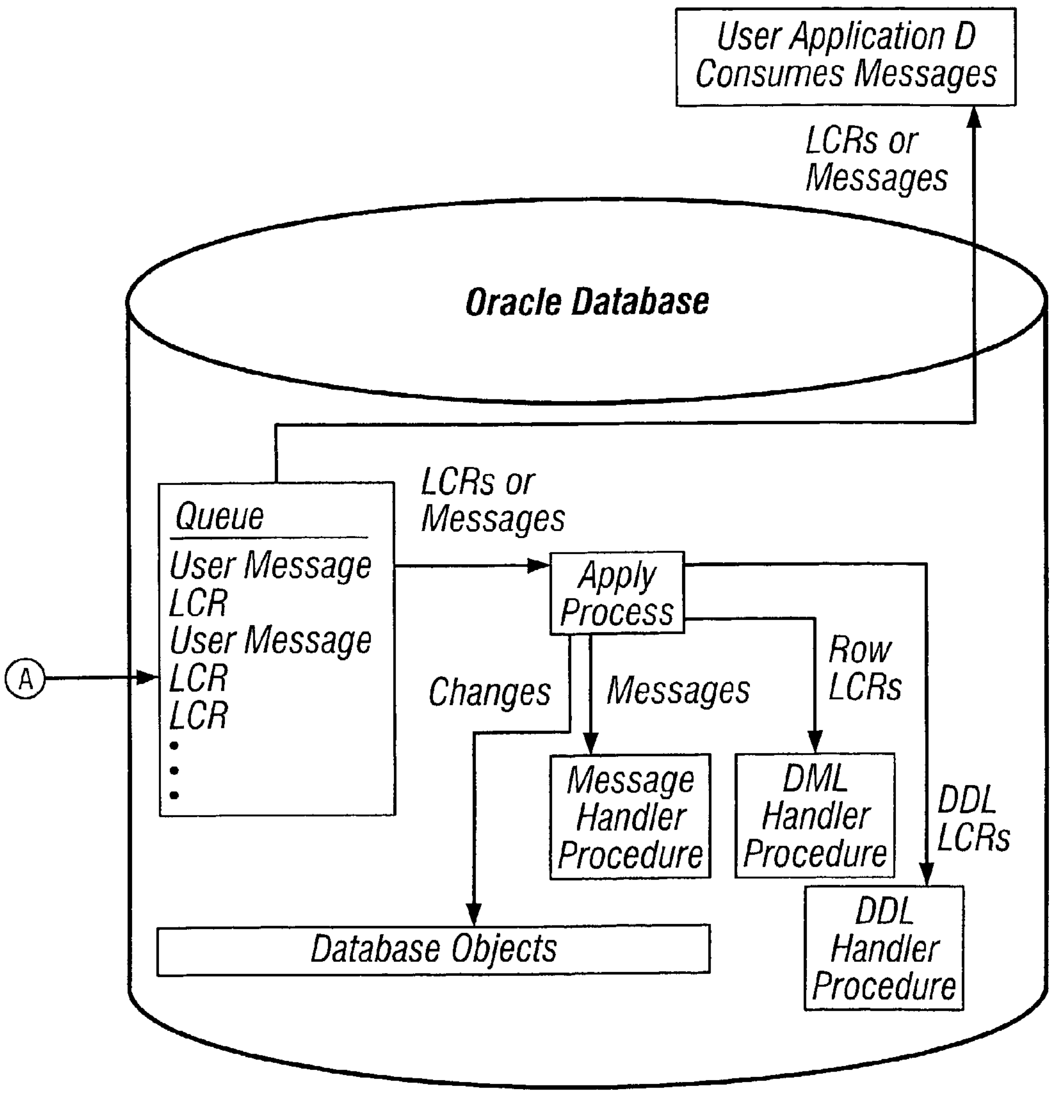

FIG. 12 shows how information sharing system 100 might be configured to share information within a single database, while FIGS. 13A and 13B show how information sharing system 100 might be configured to share information between two different databases.

It should be noted that each of the various components involved in the information sharing operation shown in FIGS. 13A and 13B may operate according to rule sets stored in a rules engine. For example, the capture process used to capture changes made at the source database may operate according to rules registered by a user. The rules may dictate, among other things, which changes to capture, how to transform the changes, and how to generate and tag the LCRs that represent those changes. Similarly, the propagation process, the apply process, and the various handler procedures may all be rules-driven.

According to one embodiment, these various components are designed with a default behavior that they perform in the absence of any registered rule set.

Replication Example

As mentioned above, information from the redo logs of a database server (hereinafter the "source server") may be selectively added to a staging area by a capture process. A consuming process may then selectively provide this information from the staging area to a process external to the source server. The change information may be, for example, provided to a process in a different database server (hereinafter the "target" database server). The process in the target database server may then use the change information from the source database server to maintain information that resides in the target database in sync with corresponding information in the source database server. For example, the process may update a table T1 in the target database server based on changes that were made to a table T2 in the source database server, so that T1 may serve as a replica of T2.

An Oracle-Based Example of the Redo Log and Capture Process

Every Oracle database has a set of two or more redo log files. The redo log files for a database are collectively known as the database's redo log. The primary function of the redo log is to record all changes made to the database.

Redo logs are used to guarantee recoverability in the event of human error or media failure. According to one embodiment, a capture process of information sharing system 100 is implemented as an optional Oracle background process that reads the database redo log to capture DML and DDL changes made to database objects. When a capture process is configured to capture changes from a redo log, the database where the changes were generated is called the source database.

Logical Change Records (LCRS)

A capture process reformats changes captured from the redo log into LCRs. An LCR is an object that describes a database change. According to one embodiment, a capture process captures multiple types of LCRs, including row LCRs and DDL LCRs.

After capturing an LCR, a capture process enqueues an event containing the LCR into a queue. A capture process is always associated with a single SYS.AnyData queue, and it enqueues events into this queue only. Users can create multiple queues and associate a different capture process with each queue. FIG. 3 shows a capture process capturing LCRs.

A row LCR describes a change to the data in a single row or a change to a single LOB column in a row. The change results from a data manipulation language (DML) statement or a piecewise update to a LOB. For example, a DML statement may insert or merge multiple rows into a table, may update multiple rows in a table, or may delete multiple rows from a table. So, a single DML statement can produce multiple row LCRs. That is, a capture process creates an LCR for each row that is changed by the DML statement. Further, the DML statement itself may be part of a transaction that includes many DML statements.

A captured row LCR may also contain transaction control statements. These row LCRs contain directives such as COMMIT and ROLLBACK. These row LCRs are internal and are used by an apply process to maintain transaction consistency between a source database and a destination database.

According to one embodiment, each row LCR contains the following information:

- The name of the source database where the row change occurred
- The type of DML statement that produced the change, either INSERT, UPDATE, DELETE, LOB ERASE, LOB WRITE, or LOB TRIM
- The schema name that contains the table with the changed row
- The name of the table that contains the changed row
- A raw tag that can be used to track the LCR
- The identifier of the transaction in which the DML statement was run
- The system change number (SCN) when the change was written to the redo log
- The old values related to the change. If the type of the DML statement is UPDATE or DELETE, then these old values include some or all of the columns in the changed row before the DML statement. If the type of the DML statement INSERT, then there are no old values.
- The new values related to the change. If the type of the DML statement is UPDATE or INSERT statement, then these new values include some or all of the columns in the changed row after the DML statement. If the type of the DML statement DELETE, then there are no new values.

A DDL LCR describes a data definition language (DDL) change. A DDL statement changes the structure of the database. For example, a DDL statement may create, alter, or drop a database object.

According to one embodiment, each DDL LCR contains the following information:

- The name of the source database where the DDL change occurred

The type of DDL statement that produced the change, for example ALTER TABLE or CREATE INDEX The schema name of the user who owns the database object on which the DDL statement was run The name of the database object on which the DDL statement was run The type of database object on which the DDL statement was run, for example TABLE or PACKAGE The text of the DDL statement The logon user, which is the user whose session executed the DDL statement The schema that is used if no schema is specified for an object in the DDL text The base table owner. If the DDL statement is dependent on a table, then the base table owner is the owner of the table on which it is dependent.

The base table name. If the DDL statement is dependent on a table, then the base table name is the name of the table on which it is dependent.

A raw tag that can be used to track the LCR

The identifier of the transaction in which the DDL statement was run

The SCN when the change was written to the redo log

Capture Rules

According to one embodiment, a capture process within information sharing system 100 (e.g. capture process 116) captures changes based on rules that users define. Each rule specifies the database objects for which the capture process captures changes and the types of changes to capture. In one embodiment, users can specify capture rules at the following levels:

A table rule captures either DML or DDL changes to a particular table.

A schema rule captures either DML or DDL changes to the database objects in a particular schema.

A global rule captures either all DML or all DDL changes in the database.

Capture Process Rule Evaluation

A running capture process completes the following series of actions to capture changes:

1. Finds changes in the redo log.
2. Performs prefiltering of the changes in the redo log. During this step, a capture process evaluates rules in its rule set at the object level and schema level to place changes found in the redo log into two categories: changes that should be converted into LCRs and changes that should not be converted into LCRs.

Prefiltering is a safe optimization done with incomplete information. This step identifies relevant changes to be processed subsequently, such that:

A change is converted into an LCR if one or more rules may evaluate to TRUE after conversion.

A change is not converted into an LCR if the capture process can ensure that no rules would evaluate to TRUE after conversion.

3. Converts changes that may cause one or more rules to evaluate to TRUE into LCRs based on prefiltering.
4. Performs LCR filtering. During this step, a capture process evaluates rules regarding information in each LCR to separate the LCRs into two categories: LCRs that should be enqueued and LCRs that should be discarded.
5. Discards the LCRs that should not be enqueued based on the rules.
6. Enqueues the remaining captured LCRs into the queue associated with the capture process.

For example, suppose the following rule is defined for a capture process: Capture changes to the hr. employees table where the department-id is 50. No other rules are defined for the capture process, and the parallelism parameter for the capture process is set to 1.

Given this rule, suppose an UPDATE statement on the hr. employees table changes 50 rows in the table. The capture process performs the following series of actions for each row change:

1. Finds the next change resulting from the UPDATE statement in the redo log.
2. Determines that the change resulted from an UPDATE statement to the hr. employees table and must be captured. If the change was made to a different table, then the capture process ignores the change.
3. Captures the change and converts it into an LCR.
4. Filters the LCR to determine whether it involves a row where the department id is 50.
5. Either enqueues the LCR into the queue associated with the capture process if it involves a row where the department-id is 50, or discards the LCR if it involves a row where the department-id is not 50 or is missing.

Event Staging and Propagation Overview

Information sharing system 100 uses queues of type SYS.AnyData to stage events. There are two types of events that can be staged in a queue: logical change records (LCRs) and user messages. LCRs are objects that contain information about a change to a database object, while user messages are custom messages created by users or applications. Both types of events are of type SYS.AnyData and can be used for information sharing within a single database or between databases.

Staged events can be consumed or propagated, or both. These events can be consumed by an apply process or by a user application that explicitly dequeues them. Even after an event is consumed, it may remain in the queue if users have also configured information sharing system 100 to propagate the event to one or more other queues or if message retention is specified. These other queues may reside in the same database or in different databases. In either case, the queue from which the events are propagated is called the source queue, and the queue that receives the events is called the destination queue. There can be a one-to-many, many-to-one, or many-to-many relationship between source and destination queues. FIG. 4 shows propagation from a source queue to a destination queue.

According to one embodiment, the ordering of information items is maintained during the propagation of the data items. Maintaining the order is particularly useful when the order of the items has functional ramifications. For example, if the items being propagated are changes made to a database system, it is important to maintain the order so that propagated changes are made in the target system after the propagated changes on which they depend.

Users can create, alter, and drop a propagation, and users can define propagation rules that control which events are propagated. The user who owns the source queue is the user who propagates events. This user must have the necessary privileges to propagate events. These privileges include the following:

- Execute privilege on the rule set used by the propagation
- Execute privilege on all transformation functions used in the rule set
- Enqueue privilege on the destination queue if the destination queue is in the same database

Captured and User-Enqueued Events

According to one embodiment, events can be enqueued in two ways:

- A capture process enqueues captured changes in the form of events containing LCRs. An event containing an LCR that was originally captured and enqueued by a capture process is called a captured event.
- A user application enqueues user messages of type SYS .AnyData. These user messages can contain LCRs or any other type of message. Any user message that was explicitly enqueued by a user or an application is called a user-enqueued event. Events that were enqueued by a user procedure called from an apply process are also user-enqueued events.

Thus, each captured event contains an LCR, but a user-enqueued event may or may not contain an LCR. Propagating a captured event or a user-enqueued event enqueues the event into the destination queue.

According to one embodiment, events can be dequeued in two ways:

- An apply process dequeues either captured or user-enqueued events. If the event contains an LCR, then the apply process can either apply it directly or call a user-specified procedure for processing. If the event does not contain an LCR, then the apply process can invoke a user-specified procedure called a message handler to process it.
- A user application explicitly dequeues user-enqueued events and processes them. Captured events cannot be dequeued by a user application; they must be dequeued by an apply process. However, if a user procedure called by an apply process explicitly enqueues an event, then the event is a user-enqueued event and can be explicitly dequeued, even if the event was originally a captured event.

The dequeued events may have originated at the same database where they are dequeued, or they may have originated at a different database.

Event Propagation Between Queues

Users can use information sharing system 100 to configure event propagation between two queues, which may reside in different databases. Information sharing system 100 uses job queues to propagate events.

According to one embodiment, a propagation is between a source queue and a destination queue. Although propagation is between two queues, a single queue may participate in many propagations. That is, a single source queue may propagate events to multiple destination queues, and a single destination queue may receive events from multiple source queues. According to one embodiment, only one propagation is allowed between a particular source queue and a particular destination queue. Also, a single queue may be a destination queue for some propagations and a source queue for other propagations.

A propagation may propagate all of the events in a source queue to the destination queue, or a propagation may propagate only a subset of the events. Also, a single propagation can propagate both captured and user-enqueued events. Users can use rules to control which events in the source queue are propagated to the destination queue.

Depending on how users set up the information sharing system 100 environment, changes could be sent back to the site where they originated. Users need to ensure that the environment is configured to avoid cycling the change in an endless loop. Users can use tags to avoid such a change cycling loop.

Propagation Rules

A propagation propagates events based on rules that users define. For events, each rule specifies the database objects for which the propagation propagates changes and the types of changes to propagate. Users can specify propagation rules for events at the following levels:

- A table rule propagates either DML or DDL changes to a particular table.
- A schema rule propagates either DML or DDL changes to the database objects in a particular schema.
- A global rule propagates either all DML or all DDL changes in the source queue.

For non-LCR events and for LCR events with special needs, users can create their own rules to control propagation.

A queue subscriber that specifies a condition causes the system to generate a rule. The rule sets for all subscribers to a queue are combined into a single system-generated rule set to make subscription more efficient.

Apply Process Overview

According to one embodiment, an apply process is a background process that dequeues logical change records (LCRs) and user messages from a specific queue and either applies each one directly or passes it as a parameter to a user-defined procedure. The LCRs dequeued by an apply process contain data manipulation language (DML) changes or data definition language (DDL) changes that an apply process can apply to database objects in a destination database. A user-defined message dequeued by an apply process is of type SYS.AnyData and can contain any user message, including a user-created LCR.

Events applied by an apply process are applied by an apply user. The apply user is the user who applies all DML statements and DDL statements and who runs user-defined apply handlers.

Apply Rules

An apply process applies changes based on rules that users define. Each rule specifies the database objects to which an apply process applies changes and the types of changes to apply. Users can specify apply rules at the following levels:

- A table rule applies either DML or DDL changes to a particular table. Subset rules are table rules that include a subset of the changes to a particular table.
- A schema rule applies either DML or DDL changes to the database objects in a particular schema.
- A global rule applies either all DML or all DDL changes in the queue associated with an apply process.

For non-LCR events and for LCR events with special needs, users can create their own rules to control apply process behavior.

Event Processing with an Apply Process

An apply process is a flexible mechanism for processing the events in a queue. Users have options to consider when users configure one or more apply processes for your environment. This section discusses the types of events that an apply process can apply and the ways that, it can apply them.

According to one embodiment, a single apply process can apply either captured events or user-enqueued events, but not both. If a queue at a destination database contains both captured and user-enqueued events, then the destination database must have at least two apply processes to process the events.

According to one embodiment, when users create an apply process, users use an apply captured parameter to specify whether the apply process applies captured or user-enqueued events.

The database where an event originated is important to an apply process for captured events but not for user-enqueued events. For a captured event, the source database is the database where the change was generated in the redo log. According to one embodiment, for a user-enqueued event, an apply process ignores information about the database where the event originated, even if the event is a user-enqueued LCR. A single apply process can apply user-enqueued events that originated at different databases.

Event Processing Options

Options for event processing depend on the kind of event received by an apply process. FIG. 8 shows the event processing options for an apply process.

Captured LCRs from multiple databases may be sent to a single destination queue. If a single queue contains captured LCRs from multiple databases, then one or more apply processes may be used to retrieve these LCRs. When multiple apply processes are used, each of these apply processes may be configured to receive captured LCRs from exactly one source database using rules.

If there are multiple capture processes running on a source database, and LCRs from more than one of these capture processes are applied at a destination database, then one or more apply processes may be used to apply the changes.

Users can configure an apply process to process a captured or user-enqueued event that contains an LCR in the following ways: directly apply the event or pass the event as a parameter to a user procedure for processing. The following sections explain these options.

Apply the LCR Event Directly: If users use this option, then an apply process applies the event without running a user procedure. The apply process either successfully applies the change in the LCR to a database object or, if a conflict or an apply error is encountered, tries to resolve the error with a conflict handler or a user-specified procedure called an error handler.

If a conflict handler can resolve the conflict, then it either applies the LCR or it discards the change in the LCR. If the error handler can resolve the error, then it should apply the LCR, if appropriate. An error handler may resolve an error by modifying the LCR before applying it. If the error handler cannot resolve the error, then the apply process places the transaction, and all LCRs associated with the transaction, into an exception queue.

Call a User Procedure to Process the LCR Event: If users use this option, then an apply process passes the event as a parameter to a user procedure for processing. The user procedure can then process the event in a customized way.

A user procedure that processes row LCRs resulting from DML statements is called a DML handler, while a user procedure that processes DDL LCRs resulting from DDL statements is called a DDL handler. An apply process can have many DML handlers and DDL handlers.

For each table associated with an apply process, users can set a separate DML handler to process each of the following types of operations in row LCRs:

Insert Update Delete Lob Update

For example, the hr. employees table may have one DML handler to process INSERT operations and a different DML handler to process UPDATE operations.

A user procedure can be used for any customized processing of LCRs. For example, if users want each insert into a particular table at the source database to result in inserts into multiple tables at the destination database, then users can create a user procedure that processes INSERT operations on the table to accomplish this. Or, if users want to log DDL changes before applying them, then users can create a user procedure that processes DDL operations to accomplish this.

Non-LCR User Message Processing

A user-enqueued event that does not contain an LCR is processed by the message handler specified for an apply process, if the user-enqueued event satisfies at least one rule in the rule set for the apply process. A message handler is a user-defined procedure that can process non-LCR user messages in a customized way for your environment.

The message handler offers advantages in any environment that has applications that need to update one or more remote databases or perform some other remote action. These applications can enqueue user messages into a queue at the local database, and information sharing system 100 can propagate each user message to the appropriate queues at destination databases. If there are multiple destinations, then information sharing system 100 provides the infrastructure for automatic propagation and processing of these messages at these destinations. If there is only one destination, then information sharing system 100 still provides a layer between the application at the source database and the application at the destination database, so that, if the application at the remote database becomes unavailable, then the application at the source database can continue to function normally.

For example, a message handler may format a user message into an electronic mail message. In this case, the user message may contain the attributes users would expect in an electronic mail message, such as from, to, subject, text-of-message, and so on. A message handler could convert these user messages into electronic mail messages and send them out through an electronic mail gateway.

Apply Process Components

According to an embodiment of the invention, an apply process includes a reader server, a coordinator process, and one or more apply servers.

The reader server dequeues events. The reader server is a parallel execution server that computes dependencies between LCRs and assembles events into transactions. The reader server then returns the assembled transactions to the coordinator, which assigns them to idle apply servers.

The coordinator process gets transactions from the reader and passes them to apply servers. The apply servers apply LCRs to database objects as DML or DDL statements or that pass the LCRs to their appropriate handlers. For non-LCR messages, the apply servers pass the events to the message handler. Each apply server is a parallel execution server. If an apply server encounters an error, it then tries to resolve the error with a user-specified error handler. If an apply server cannot resolve an error, then it rolls back the transaction and places the entire transaction, including all of its events, in an exception queue.

When an apply server commits a completed transaction, this transaction has been applied. When an apply server places a transaction in an exception queue and commits, this transaction also has been applied.

If a transaction being handled by an apply server has a dependency with another transaction that is not known to have been applied, then the apply server contacts the coordinator and waits for instructions. The coordinator monitors all of the apply servers to ensure that transactions are applied and committed in the correct order.

For example, consider these two transactions:

1. A row is inserted into a table.
2. The same row is updated to change certain column values.

In this case, transaction 2 is dependent on transaction 1, because the row cannot be updated until after it is inserted into the table. Suppose these transactions are captured from the redo log at a source database, propagated to a destination database, and applied at the destination database. Apply server A handles the insert transaction, and apply server B handles the update transaction.

If apply server B is ready to apply the update transaction before apply server A has applied the insert transaction, then apply server B waits for instructions from the coordinator. After apply server A has applied the insert transaction, the coordinator process instructs apply server B to apply the update transaction.

The Components of a Rule

According to one embodiment, a rule is a database object that enables a client to perform an action when an event occurs and a condition is satisfied. Rules are evaluated by a rules engine which, according to one embodiment, is built into a database server that manages information sharing system 100. Both user-created applications and information sharing system 100, can be clients of the rules engine. According to one embodiment, a rule consists of the following components:

Rule Condition

Rule Evaluation Context (optional)

Rule Action Context (optional)

Each rule is specified as a condition that is similar to the condition in the WHERE clause of a SQL query. Users can group related rules together into rule sets. A single rule can be in one rule set, multiple rule sets, or no rule sets.

A rule condition combines one or more expressions and operators and returns a Boolean value, which is a value of TRUE, FALSE, or NULL (unknown). An expression is a combination of one or more values and operators that evaluate to a value. A value can be data in a table, data in variables, or data returned by a SQL function or a PL/SQL function. For example, the following condition consists of two expressions (department-id and 30) and an operator (–):

department id=30

This logical condition evaluates to TRUE for a given row when the department-id column is 3 0. Here, the value is data in the department id column of a table.

A single rule condition may include more than one condition combined with the AND, OR, and NOT conditional operators to form compound conditions. For example, consider the following compound condition:

department id=30 OR job_title='Programmer'

This rule condition contains two conditions joined by the OR conditional operator. If either condition evaluates to TRUE, then the rule condition evaluates to TRUE. If the conditional operator were AND instead of OR, then both conditions would have to evaluate to TRUE for the entire rule condition to evaluate to TRUE.

Variables in Rule Conditions

Rule conditions may contain variables. According to one embodiment, variables in rule conditions are preceded with a colon (:). The following is an example of a variable used in a rule condition:

:x=55

Variables enable users to refer to data that is not stored in a table. A variable may also improve performance by replacing a commonly occurring expression. Performance may improve because, instead of evaluating the same expression multiple times, the variable is evaluated once.

A rule condition may also contain an evaluation of a call to a subprogram. These conditions are evaluated in the same way as other conditions. That is, they evaluate to a value of TRUE, FALSE, or unknown. The following is an example of a condition that contains a call to a simple function named is _Manager that determines whether an employee is a manager:

is_manager(employee id)='Y'

Here, the value of employee_id is determined by data in a table where employee_id is a column.

Users can use user-defined types for variables. Therefore, variables can have attributes. When a variable has attributes, each attribute contains partial data for variable. In rule conditions, users specify attributes using dot notation. For example, the following condition evaluates to TRUE if the value of attribute z in variable y is 9:

:y.z=9

Simple Rule Conditions

A simple rule condition is a condition that has either of the following forms:

simple-rule-expression operator constant constant operator simple-rule-expression The Components of a Rule In a simple rule condition, a simple rule expression is one of the following:

Table column

Variable

Variable attribute

Method result where the method takes no arguments and the method result can be returned by the variable method function, so that the expression is either a numerical or character type For table columns, variables, and variable attributes, all numeric (NUMBER, FLOAT, DOUBLE, INTEGER) and character (CHAR, VARCHAR2) types are supported. Use of other types of expressions results in non-simple rule conditions.

In a simple rule condition, an operator is one of the following:

=, <=, or >=

Use of other operators results in non-simple rule conditions. A constant is a fixed value. A constant can be:

A number, such as 12 or 5. 4 A character, such as x or $

A character string, such as "this is a string" Therefore, the following conditions are simple rule conditions: tabl.col=5

:v1>'aaa'

:v2.a1<10.01

:v3.mo( )=10

Rule Set Evaluation

The rules engine evaluates rule sets based on events. An event is an occurrence that is defined by the client of the rules engine. The client initiates evaluation of an event by calling the DBMS-RULE. EVALUATE procedure. The information specified by the client when it calls the DBMS-RULE. EVALUATE procedure includes the following:

The name of the rule set that contains the rules to use to evaluate the event The evaluation context to use for evaluation. Only rules that use the specified evaluation context are evaluated.

Table values and variable values: The table values contain rowids that refer to the data in table rows, and the variable values contain the data for explicit variables. Values specified for implicit variables override the values that might be obtained using a variable value evaluation function. If a specified variable has attributes, then the client can send a value for the entire variable, or the client can send values for any number of the variable's attributes. However, clients cannot specify attribute values if the value of the entire variable is specified.

An optional event context: An event context is a variable-length array of type SYS. RE$NV_LIST that contains name-value pairs that contain information about the event. This optional information is not directly used or interpreted by the rules engine. Instead, it is passed to client callbacks, such as an evaluation function, a variable value evaluation function (for implicit variables), and a variable method function.

The client can also send other information about the event and about how to evaluate the event using the DBMS-RULE. EVALUATE procedure. For example, the caller may specify if evaluation must stop as soon as the first TRUE rule or the first MAYBE rule (if there are no TRUE rules) is found.

The rules engine uses the rules in the specified rule set to evaluate the event. Then, the rules engine returns the results to the client. The rules engine returns rules using the two OUT parameters in the EVALUATE procedure: true-rules and maybe_rules. That is, the true rules parameter returns rules that evaluate to TRUE, and, optionally, the maybe_rules parameter returns rules that may evaluate to TRUE given more information.

Figure 14:
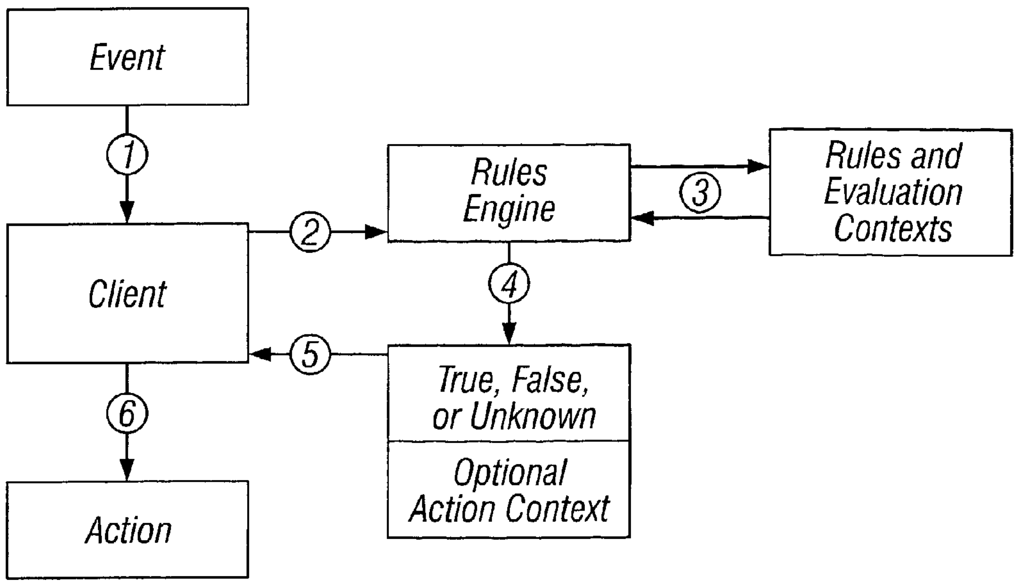
FIG. 14 is a block diagram illustrating stages in a rule set evaluation process, according to an embodiment of the invention.

FIG. 14 shows the rule set evaluation process:

1. A client-defined event occurs.
2. The client sends the event to the rules engine by running the DBMS_RULE.EVALUATE procedure.
3. The rules engine evaluates the event based on rules in the rule set and the relevant evaluation context. The client specifies both the rule set and the evaluation context in the call to the DBMS_RULE.EVALUATE procedure. Only rules that are in the specified rule set and use the specified evaluation context are used for evaluation.
4. The rules engine obtains the results of the evaluation. Each rule evaluates to either TRUE, FALSE, or NULL (unknown).
5. The rules engine returns rules that evaluated to TRUE to the client. Each returned rule is returned with its entire action context, which may contain information or may be NULL.
6. The client performs actions based on the results returned by the rules engine. The rules engine does not perform actions based rule evaluations.

Overview of how Rules are Used in Information Sharing System 100

In information sharing system 100, each of the following mechanisms is a client of a rules engine, when the mechanism is associated with a rule set: a capture process, a propagation, and an apply process.

Figure 15:
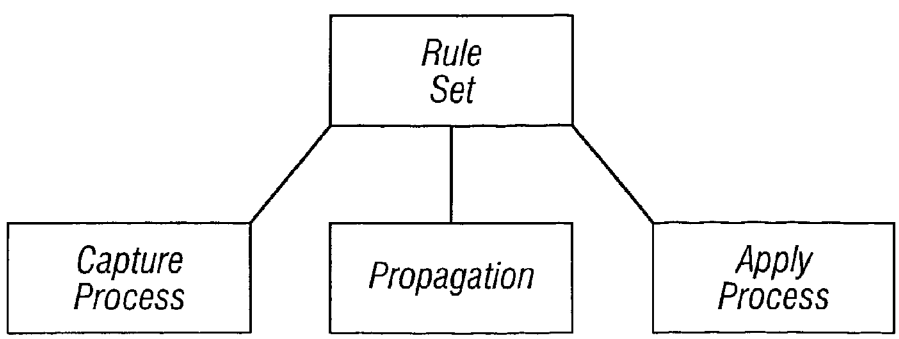
FIG. 15 is a block diagram illustrating that one rule set can be used by multiple clients of a rules engine, according to an embodiment of the invention.

In one embodiment, each of these mechanisms can be associated with at most one rule set. However, a single rule set can be used by multiple capture processes, propagations, and apply processes within the same database. FIG. 15 illustrates how multiple clients of a rules engine can use one rule set.

Specifically, users use rule sets in Information sharing system 100 to do the following:

(1) Specify the changes a capture process captures from the redo log. That is, if a change found in the redo log causes any rule in the rule set associated with a capture process to evaluate to TRUE, then the change is captured by the capture process.

(2) Specify the events a propagation propagates from one queue to another. That is, if an event in a queue causes any rule in the rule set associated with a propagation to evaluate to TRUE, then the event is propagated by the propagation.

(3) Specify the events an apply process retrieves from a queue. That is, if an event in a queue causes any rule in the rule set associated with an apply process to evaluate to TRUE, then the event is retrieved and processed by the apply process.

In the case of a propagation or an apply process, the events evaluated against the rule sets can be captured events or user-enqueued events.

If there are conflicting rules associated with a mechanism, then the mechanism performs the task if either rule evaluates to TRUE. For example, if a rule set associated with a capture process contains one rule that instructs the capture process to capture DML changes to the hr. employees table, but another rule in the rule set instructs the capture process not to capture DML changes to the hr.employees table, then the capture process captures DML changes to the hr. employees table.

System-Created Rules

Information sharing system 100 performs three tasks based on rules: Capturing changes with a capture process, propagating changes with a propagation, and applying changes with an apply process. Both user-created and system-created rules can be used to govern how each of these tasks is performed. Further, for any one of these tasks may be governed by a single rule set that includes both system-created rules and user-created rules.

A system-created rule specifies one of the following levels of granularity for a task: table, schema, or global. This section describes each of these levels. Users can specify more than one level for a particular task. For example, users can instruct a single apply process to perform table-level apply for specific tables in the oe schema and schema-level apply for the entire hr schema.

Table 6-1 shows what each level of rule means for each Information sharing system 100 task.

Types of Tasks and Rule Levels

| Task | Table Rule | Schema Rule | Global Rule |
|---|---|---|---|
| Capture | Capture the changes in the redo log for the specified table, convert them into logical change records (LCRs), and enqueue them. | Capture the changes in the redo log for the database objects in the specified schema, convert them into LCRs, and enqueue them. | Capture the changes to all the database objects in the database, convert them into LCRs, and enqueue them. |
| Propagate | Propagate the LCRs relating to the specified table in the source queue to the destination queue. | Propagate the LCRs related to the database objects in the specified schema in the source queue to the destination queue. | Propagate all of the changes in the source queue to the destination queue. |
| Apply | Apply all or a subset of the LCRs in the queue relating to the specified table. | Apply the LCRs in the queue relating to the database objects in the specified schema. | Apply all of the LCRs in the queue. |

Rule-Based Transformations and a Capture Process

If a capture process uses a rule set, then both of the following conditions must be met in order for a transformation to be performed during capture:

A rule evaluates to TRUE for a particular change found in the redo log.

An action context containing a name-value pair with a particular, system-recognized name A TRANSFORM FUNCTION is returned to the capture process when the rule is evaluated.

Figure 16:
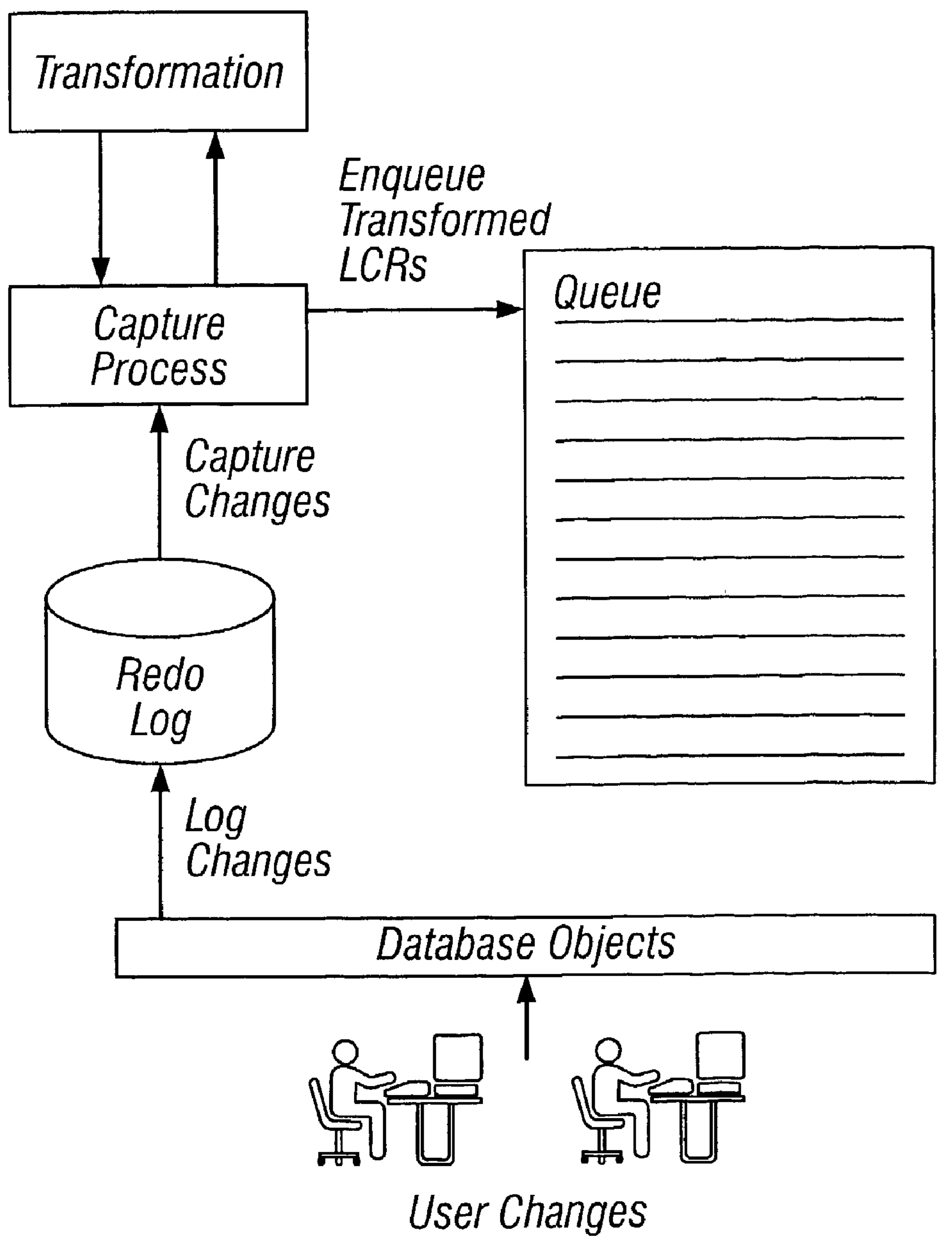
FIG. 16 is a block diagram illustrating transformation during capture, according to an embodiment of the invention.

Given these conditions, the capture process completes the following steps:

1. Formats the change in the redo log into an LCR
2. Converts the LCR into a SYS.AnyData object
3. Runs the PL/SQL function in the name-value pair to transform the SYS.AnyData object
4. Enqueues the transformed SYS.AnyData object into the queue associated with the capture process FIG. 16 shows a transformation during capture. For example, if an event is transformed during capture, then the transformed event is enqueued into the source queue. Therefore, if such a captured event is propagated from the dbs1.net database to the dbs2.net and the dbs3.net databases, then the queues at dbs2 net and dbs3.net will contain the transformed event after propagation.

The advantages of performing transformations during capture are the following:

Security can be improved if the transformation removes or changes private information, because this private information does not appear in the source queue and is not propagated to any destination queue.

Space consumption may be reduced, depending on the type of transformation performed. For example, a transformation that reduces the amount of data results in less data to enqueue, propagate, and apply.

Transformation overhead is reduced when there are multiple destinations for a transformed event, because the transformation is performed only once at the source, not at multiple destinations.

The possible disadvantages of performing transformations during capture are the following:

All sites receive the transformed event.

The transformation overhead occurs in the source database.

Rule-Based Transformation Errors During Capture

If an error occurs when the transformation function is run during capture, then the change is not captured, the error is returned to the capture process, and the capture process is disabled. Before the capture process can be enabled, users must either change or remove the rule-based transformation to avoid the error.

Rule-Based Transformations and Propagation

If a propagation uses a rule set, then both of the following conditions must be met in order for a transformation to be performed during propagation:

A rule evaluates to TRUE for an event in the source queue for the propagation. This event can be a captured or a user-enqueued event.

An action context containing a name-value pair with a particular, system-recognized name A TRANSFORM-FUNCTION is returned to the propagation when the rule is evaluated.

Figure 17:
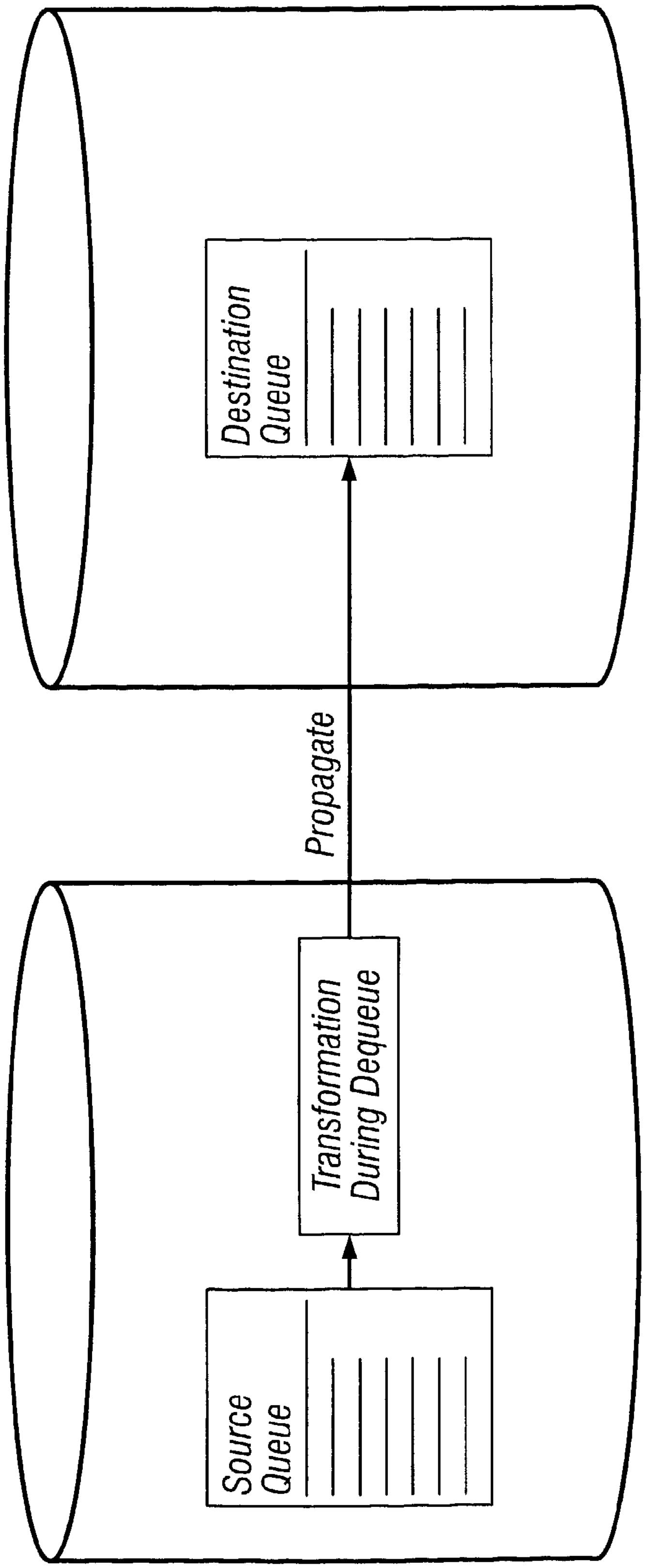
FIG. 17 is a block diagram illustrating transformation during propagation, according to an embodiment of the invention.

Given these conditions, the propagation completes the following steps:

1. Starts dequeuing the event from the source queue
2. Runs the PL/SQL function in the name-value pair to transform the event
3. Completes dequeuing the transformed event
4. Propagates the transformed event to the destination queue FIG. 17 shows a transformation during propagation. In several of the examples given hereafter, the information being transformed is in the form of an LCR. However, as explained above, LCRs are only one type of information that can be shared using system 100. Thus, the various techniques described herein, including rule-based transformations, apply equally regardless of the form of the information that is being shared.

Referring again to FIG. 17, suppose users use a rule-based transformation for a propagation from the dbs1.net database to the dbs2.net database, but users do not use a rule-based transformation for a propagation from the dbs1.net database to the dbs3 net database. In this case, an event in the queue at dbs1.net can be transformed before it is propagated to dbs2.net, but the same event can remain in its original form when it is propagated to dbs3.net. In this case, after propagation, the queue at dbs2.net contains the transformed event, and the queue at dbs3.net contains the original event.

The advantages of performing transformations during propagation are the following:

Security can be improved if the transformation removes or changes private information before events are propagated.

Some destination queues can receive a transformed event, while other destination queues can receive the original event.

Different destinations can receive different variations of the same event. The possible disadvantages of performing transformations during propagation are the following:

Once an event is transformed, any database to which it is propagated after the first propagation receives the transformed event. For example, if dbs2.net propagates the event to dbs4.net, then dbs4.net receives the transformed event.

When the first propagation in a directed network performs the transformation, the transformation overhead occurs on the source database.

The same transformation may be done multiple times when multiple destination databases need the same transformation.

If an error occurs when the transformation function is run during propagation, then the event that caused the error is not dequeued, the event is not propagated, and the error is returned to the propagation. Before the event can be propagated, users must change or remove the rule-based transformation to avoid the error.

Rule-Based Transformations and an Apply Process

If an apply process uses a rule set, then both of the following conditions must be met in order for a transformation to be performed during apply:

A rule evaluates to TRUE for an event in the queue associated with the apply process. This event can be a captured or a user-enqueued event.

An action context containing a name-value pair with a particular, system-recognized name A TRANSFORM_FUNCTION is returned to the apply process when the rule is evaluated.

Given these conditions, the apply process completes the following steps:

1. Starts to dequeue the event from the queue
2. Runs the PL/SQL function in the name-value pair to transform the event during dequeue
3. Completes dequeuing the transformed event
4. Applies the transformed event For example, suppose an event is propagated from the dbs1.net database to the dbs2.net database in its original form. When the apply process dequeues the event from a queue at dbs2.net, the event is transformed.

The possible advantages of performing transformations during apply are the following:

Any database to which the event is propagated after the first propagation can receive the event in its original form. For example, if dbs2.net propagates the event to dbs4.net, then dbs4.net can receive the original event.

The transformation overhead does not occur on the source database when the source and destination database are different.

The possible disadvantages of performing transformations during apply are the following:

Security may be a concern if the events contain private information, because all databases to which the events are propagated receive the original events.

The same transformation may be done multiple times when multiple destination databases need the same transformation.

Rule-Based Transformation Errors During Apply Process Dequeue

If an error occurs when the transformation function is run during apply process dequeue, then the event that caused the error is not dequeued, the transaction containing the event is not applied, the error is returned to the apply process, and the apply process is disabled. Before the apply process can be enabled, users must change or remove the rule-based transformation to avoid the error.

Integration with Gateways

According to one embodiment, an apply process may be configured to "apply" a set of LCRs to a database by (1) reading the LCRs to identify the changes reflected in the LCRs, (2) constructing a database command (e.g. a SQL command) that will cause the desired changes, and (3) executing the database command against the database.

According to one embodiment, the apply process may be configured to construct a remote SQL statement for a database other than the database that the originally made the change reflected in the LCR. When executed within a remote database, the SQL statement will cause the desired changes to be made at the remote database.

Once such a remote SQL statement is constructed, the SQL statement may be sent to the remote database through a gateway. The gateway may be configured, for example, to transform the query as necessary when the remote database is a different type of database than the source database. For example, a set of LCRs may be created in response to changes made in an Oracle database. Based on the LCRs, an apply process may construct a remote SQL query, and send the SQL query to a gateway. The gateway may then transform the SQL as necessary prior to forwarding the query to a non-Oracle data store. The non-Oracle data store may then execute the query to effect changes, asynchronously and remotely, in response to the changes, made to the Oracle database, upon which the LCRs were originally based.

Integration with Flashback

Various database languages, such as SQL (Structured Query Language), support special-purpose constructs referred to herein as "cursors". Prior to retrieving the results of a specific query statement, the DBMS may perform a significant amount of preliminary work for the statement, such as parsing, semantic analysis, and query plan generation. A cursor stores the results of much of this preliminary work. Consequently, when a query statement arrives, the DBMS first attempts to match the statement to statements for which cursors have already been created. If a match is found, the cursor is shared by the query statements, and the overhead work is avoided.

A "flashback cursor" is a particular type of cursor that is used to access past data. A flashback cursor is created in response to receipt of a "flashback query". Unlike conventional queries, flashback queries specify a flashback time, and return data as it existed at the specified flashback time. One technique for handling flashback queries is described in patent application Ser. No. 09/676,305, filed Sep. 29, 2000, entitled SYSTEM AND METHOD FOR PROVIDING FINE-GRAINED TEMPORAL DATABASE ACCESS, by JONATHAN D. KLEIN, et al, the contents of which are incorporated herein by this reference.

According to one embodiment, flashback queries and cursors can be used in conjunction with information sharing system 100 to make decisions about how to handle a change in a manner that is both (1) asynchronous to the change, and (2) takes into account the state of the system at the time of the change.

For example, assume that a user makes a change to a source database at time T10. The change is reflected in the redo log at the source database. Eventually, a capture process reads the log and generates an LCR that corresponds to the change. The LCR is then stored in a staging area.

According to one embodiment, the time at which the change was made permanent (committed) at the source database is stored in the LCR. Eventually, an apply process reads the LCR and passes the LCR to an update handler. By the time the update handler receives the LCR, the state of the system may have significantly changed relative to the state of the system at time T10. The update handler may read the change time T10 from the LCR and execute a flashback query to see the state in which the database system existed at the time the change was originally made (at time T10). The update handler may then determine what actions to take in response to the change based on the condition of the database system at T10.

Flashback queries are generally able to specify the same types of operations as standard queries. Thus, the flashback queries used by the update handler to see the previous state of the system may involve performing complex operations using values that existed at that previous time. For example, the flashback query could perform complex joins and comparisons, all of which would be performed on the data values that existed at the previous point in time, in order to determine what actions to take in response to an LCR that identifies a change made at that previous point in time.

Tags and Cycle Avoidance

As mentioned above, the various components of information sharing system 100 may be configured such that a particular event main initiate a complex chain of activities. Because each activity in a chain (e.g. the propagation of the event from one staging area to another) may itself initiate another chain of activities, it is possible for cycles to form. For example, assume that the components to information sharing system 100 are configured to propagate changes made to a first database to a second database, and to propagate changes made to the second database to the first database. In this scenario, the event associated with a change in the first database would be propagated to and applied at the second database. However, the application of the event at the second database would constitute a change to the second database. The event for that change at the second database would (without a mechanism for cycle avoidance) be propagated back to and applied at the first database. The application of the event at the second database would constitute a "change" to the first database, which would cause the entire process to repeat itself. According to one embodiment, the various components of information sharing system 100 set tags and inspect tags in a manner that avoids perpetuating such cycles.

Introduction to Tags

According to one embodiment, every redo entry in the redo log has a tag associated with it. The datatype of the tag is RAW. By default, when a user or application generates redo entries, the value of the tag is NULL for each redo entry, and a NULL tag consumes no space in the redo entry.

Mechanisms are provided to allow users to configure to components of information sharing system 100 to customize how the components (1) set tag values, (2) inspect tag values, and (3) interpret and use the tag values, at various stages in an information sharing operation. For example, a tag can be used to determine whether an LCR contains a change that originated in the local database or at a different database, so that users can avoid change cycling (sending an LCR back to the database where it originated). Tags may be used for other LCR tracking purposes as well. Users can also use tags to specify the set of destination databases for each LCR.

According to one embodiment, a variety of mechanisms are provided to allow users to control the value of the tags generated in the redo log. These mechanisms include, but are not limited to procedures referred to hereafter as SET_TAG, CREATE_APPLY, and ALTER_APPLY.

The SET_TAG procedure is used to specify the value of the redo tags generated in the current session. When a database change is made in the session, the tag becomes part of the redo entry that records the change. Different sessions can have the same tag setting or different tag settings.

The CREATE_APPLY and ALTER_APPLY procedures are used to control the value of the redo tags generated when an apply process runs. All sessions coordinated by the apply process coordinator use this tag setting. By default, redo entries generated by an apply process have a tag value that is the hexadecimal equivalent of '00' (double zero).

These tags become part of the LCRs captured by a capture process retrieving changes from the redo log. Based on the rules in the rule set for the capture process, the tag value in the redo entry for a change may determine whether or not the change is captured.

Similarly, once a tag is part of an LCR, the value of the tag may determine whether a propagation propagates the LCR and whether an apply process applies the LCR. The behavior of a transformation, DML handler, or error handler can also depend on the value of the tag. In addition, users can set the tag value for an existing LCR using the SET TAG member procedure for the LCR. For example, users may set a tag in an LCR during a transformation.

According to one embodiment, users create rules, by default each rule contains a condition that evaluates to TRUE only if the tag is NULL. In DML rules, the condition is the following:

dml.is null tag( )='Y'

In DDL rules, the condition is the following:

ddl.is null_tagO='Y'

Consider a rule set with a single rule and assume the rule contains such a condition. In this case, capture processes, propagations, and apply processes behave in the following way:

- A capture process captures a change only if the tag in the redo log for the change is NULL and the rest of the rule conditions evaluate to TRUE for the change.
- A propagation propagates an event containing an LCR only if the tag in the LCR is NULL and the rest of the rule conditions evaluate to TRUE for the LCR.
- An apply process applies an event containing an LCR only if the tag in the LCR is NULL and the rest of the rule conditions evaluate to TRUE for the LCR.

Specifically, the following procedures are provided to create rules that contain one of these conditions by default:

ADD_GLOBAL_PROPAGATION_RULES
ADD_GLOBAL_RULES
ADD-SCHEMA_PROPAGATION_RULES
ADD_SCHEMA_RULES
ADD_SUBSET_RULES
ADD_TABLE_PROPAGATION_RULES
ADD_TABLE_RULES

If users do not want the created rules to contain such a condition, then they may set the include_tagged_lcr parameter to true when users run these procedures. This setting results in no conditions relating to tags in the rules. Therefore, rule evaluation of the LCR does not depend on the value of the tag.

For example, consider a table-level rule that evaluates to TRUE for all DML changes to the hr.locations table that originated at the dbs1. net source database. Assume the ADD_TABLE_RULES procedure is run to generate this rule:

```
BEGIN
  DBMS__STREAMS__ADM.ADD__TABLE__RULES(
      Table__name          =>  'hr.locations',
      streams__type        =>  'capture',
      streams__name        =>  'capture',
      queue__name          =>  'streams__queue',
      include__tagged__lcr =>  false, -- Note parameter setting
      source__database     =>  'dbsl.net',
      include__dml         =>  true,
      include__ddl         =>  false);
END;
```

Notice that the include_tagged_lcr parameter is set to false, which is the default. The ADD-TABLE-RULES procedure generates a rule with a rule condition similar to the following:

(((:dml.get_object_owner( )='HR' and :dml.get_object_name( )='LOCATIONS')) and :dml.is_nul_tag( )='Y' and :dml.get_source_database_name( )='DBS1.NET')

If a capture process uses a rule set that contains this rule, then the rule evaluates to FALSE if the tag for a change in a redo entry is a non-NULL value, such as '0' or '1'. So, if a redo entry contains a row change to the hr.locations table, then the change is captured only if the tag for the redo entry is NULL.

However, suppose the include_tagged_lcr parameter is set to true when ADD_TABLE_RULES is run:

```
BEGIN
  DBMS__STREAMS__ADM.ADD__TABLE__RULES(
      table__name          =>  'hr.locations',
      streams__type        =>  'capture',
      streams__name        =>  'capture',
      queue__name          =>  streams__queue
      include__tagged__lcr =>  true, -- Note parameter setting
      source__database     =>  'dbs1.net',
      include__dml         =>  true,
      include__ddl         =>  false);
END;
```

In this case, the ADD_TABLE_RULES procedure generates a rule with a rule condition similar to the following:

(((:dml.get_object_owner( )='HR' and :dml.get_object_name( )='LOCATIONS')) and :dml.get_source_database_name( )='DBS1.NET')

Notice that there is no condition relating to the tag. If a capture process uses a rule set that contains this rule, then the rule evaluates to TRUE if the tag in a redo entry for a DML change to the hr. locations table is a non-NULL value, such as '0 ' or '1'. The rule also evaluates to TRUE if the tag is NULL. So, if a redo entry contains a DML change to the hr. locations table, then the change is captured regardless of the value for the tag.

If users are using global rules to capture and apply DDL changes for an entire database, then online backup statements will be captured, propagated, and applied by default. Typically, database administrators do not want to replicate online backup statements. Instead, they only want them to run at the database where they are executed originally. To avoid replicating online backup statements, users can use one of the following strategies:

Include one or more calls to the SET TAG procedure in users' online backup procedures, and set the session tag, to a value that will cause the online backup statements to be ignored by a capture process.

Use a DDL handler for an apply process to avoid applying the online backup statements.

Tags and an Apply Process

An apply process generates entries in the redo log of a destination database when it applies DML or DDL changes. For example, if the apply process applies a change that updates a row in a table, then that change is recorded in the redo log at the destination database. Users can control the tags in these redo entries by setting the apply_tag parameter in the CREATE_APPLY or ALTER_APPLY procedure in the DBMS_APPLY_ADM package. For example, an apply process may generate redo tags that are equivalent to the hexadecimal value of '0' (zero) or '1'.

The default tag value generated in the redo log by an apply process is '00' (double zero). This value is the default tag value for an apply process if users use a procedure to create an apply process. There is nothing special about this value beyond the fact that it is a non-NULL value. The fact that it is a non-NULL value is important because rules created by the certain procedures by default contain a condition that evaluates to TRUE only if the tag is NULL in a redo entry or LCR. Users can alter the tag value for an existing apply process using the ALTER_APPLY procedure.

If a DML handler, DDL handler, or message handler calls the SET_TAG procedure, then any subsequent redo entries generated by the handler will include the tag specified in the SET_TAG call, even if the tag for the apply process is different. When the handler exits, any subsequent redo entries generated by the apply process have the tag specified for the apply process.

Avoid Change Cycling with Tags

In an environment that includes more than one database sharing data bidirectionally, users can use tags to avoid change cycling. Change cycling means sending a change back to the database where it originated. Typically, change cycling should be avoided because it can result in each change going through endless loops back to the database where it originated. Such loops can result in unintended data in the database and tax the networking and computer resources of an environment.

Using tags and appropriate rules for capture processes, propagations, and apply processes, users can avoid such change cycles. The following sections describe various environments and how tags and rules can be used to avoid change cycling in these environments:

Each Database Is a Source and Destination Database for Shared Data

Primary Database Sharing Data with Several Secondary Databases

Primary Database Sharing Data with Several Extended Secondary Databases

Each Database is a Source and Destination Database for Shared Data

This scenario involves an environment in which each database is a source database for every other database, and each database is a destination database of every other database. Each database communicates directly with every other database.

Figure 18A:
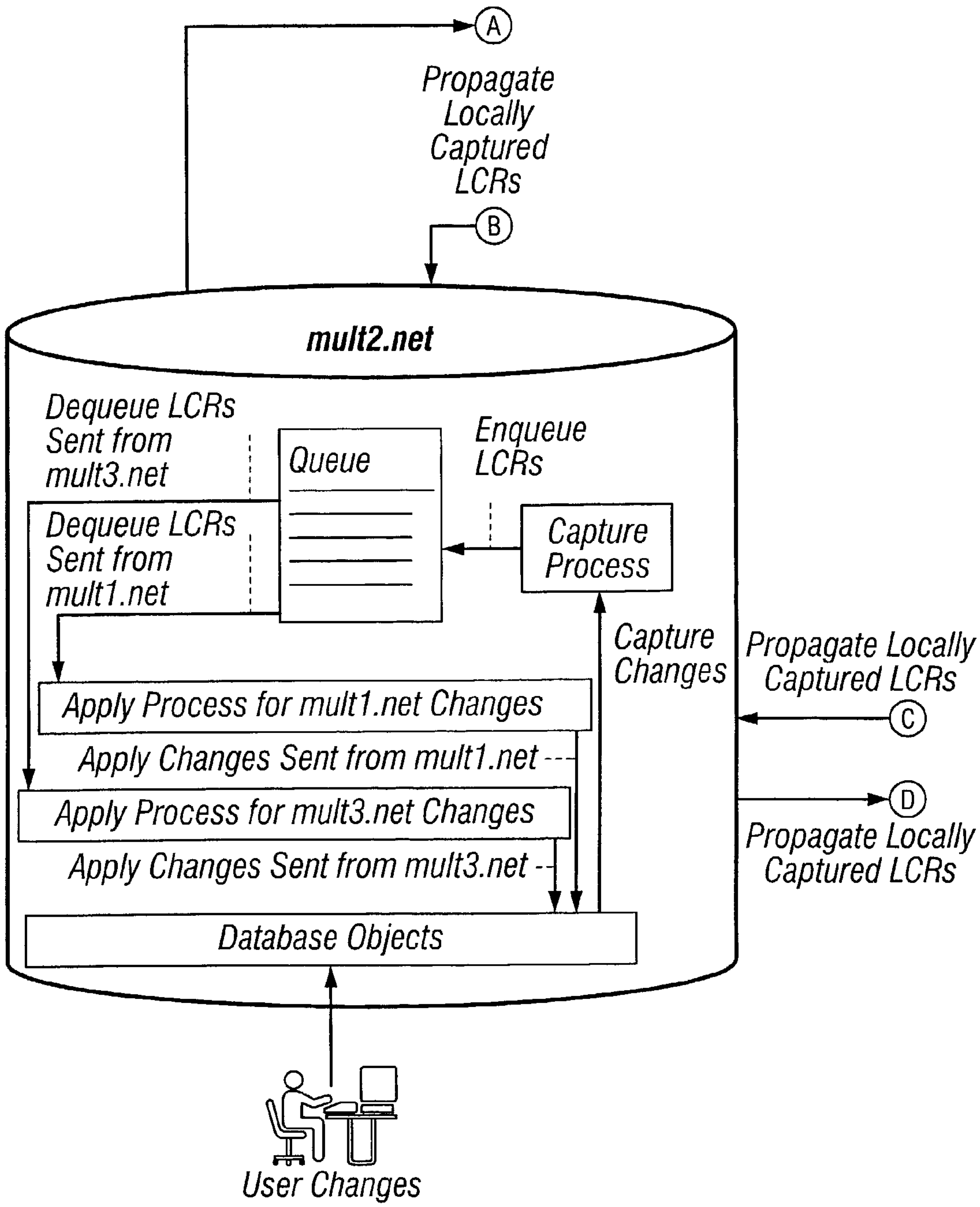
FIGS. 18A, 18B and 18C are block diagrams illustrating a multiple-node system in which each database is both a source and a destination database.
Figure 18B:
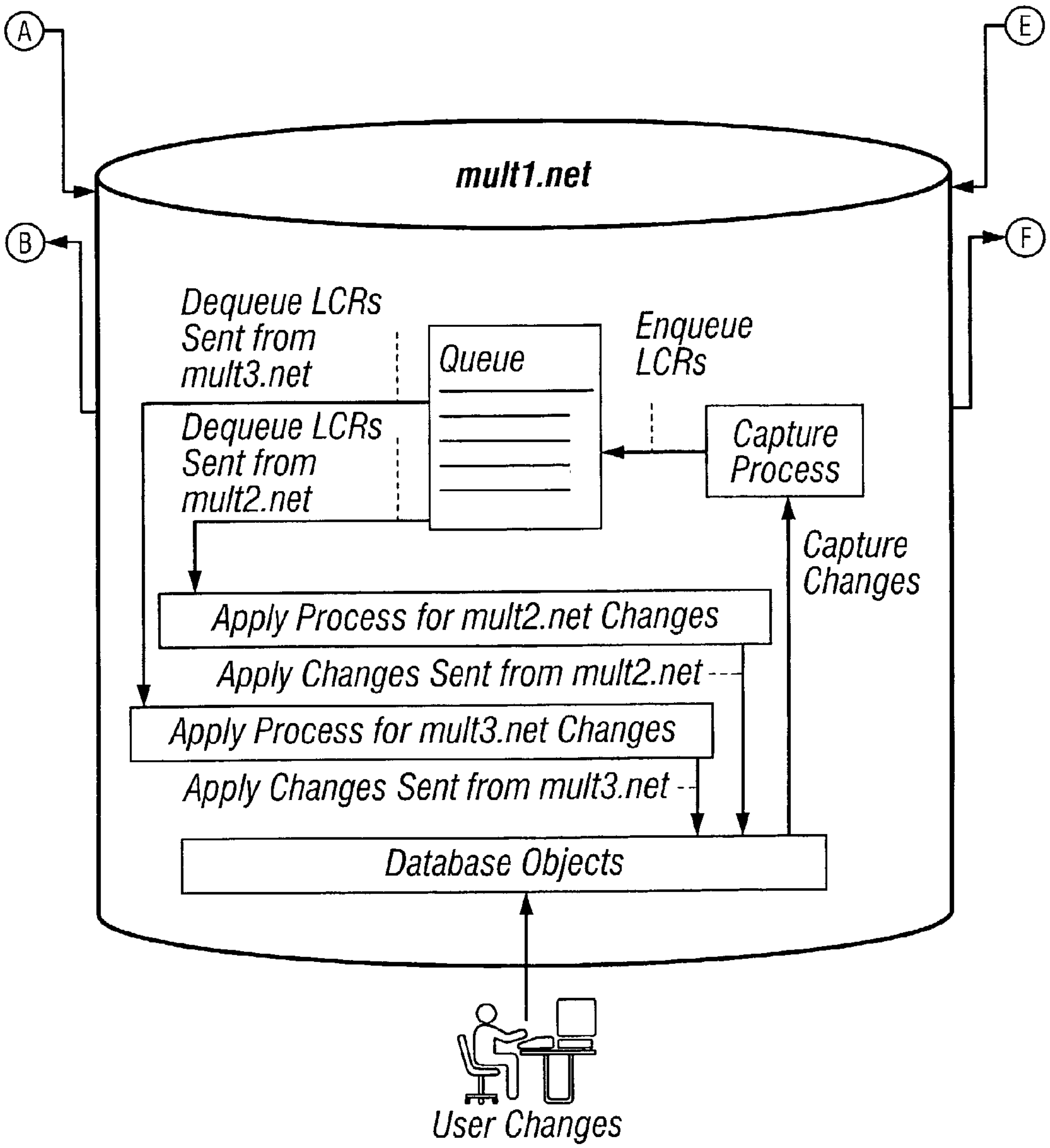
Figure 18C:
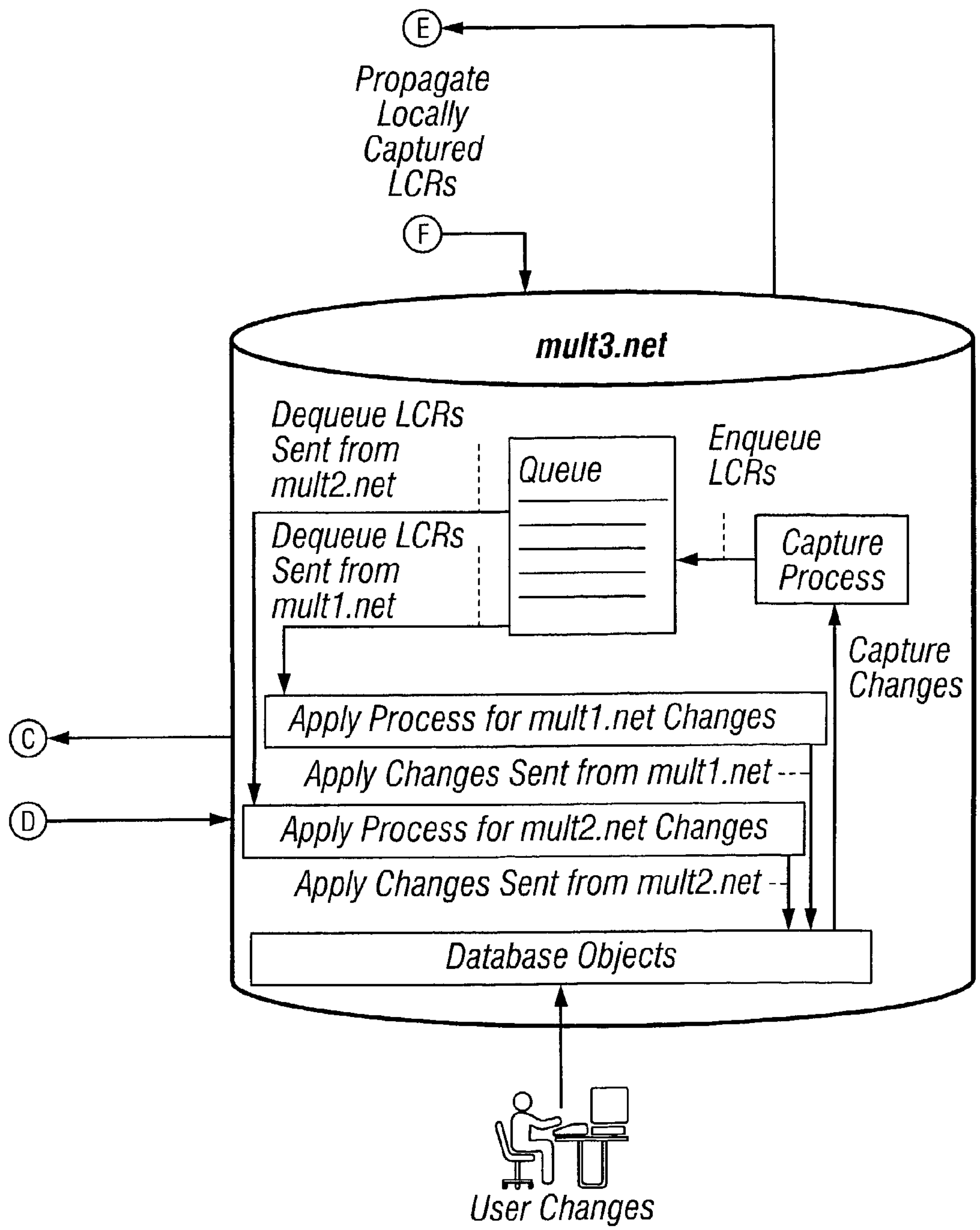

For example, consider an environment that replicates the database objects and data in the hr schema between three Oracle databases: mult1.net, mult2.net, and mult3.net. DML and DDL changes made to tables in the hr schema are captured at all three databases in the environment and propagated to each of the other databases in the environment, where changes are applied. FIGS. 18A–18C illustrate an example environment in which each database is a source database.

Users can avoid change cycles by configuring such an environment in the following way: Configure one apply process at each database to generate non-NULL redo tags for changes from each source database. If users use a procedure to create an apply process, then the apply process generates non-NULL tags with a value of '00' in the redo log by default. In this case, no further action is required for the apply process to generate non-NULL tags.

If users use the CREATE_APPLY procedure, then do not set the apply tag parameter. Again, the apply process generates non-NULL tags with a value of '00' in the redo log by default, and no further action is required.

Configure the capture process at each database to capture changes only if the tag in the redo entry for the change is NULL. Users do this by ensuring that each DML rule in the rule set used by the capture process has the following condition:

dml.is is_null_tag 'Y'

Each DDL rule should have the following condition:

ddl.is_null_tag( )='Y'

These rule conditions indicate that the capture process captures a change only if the tag for the change is NULL.

Figure 19:
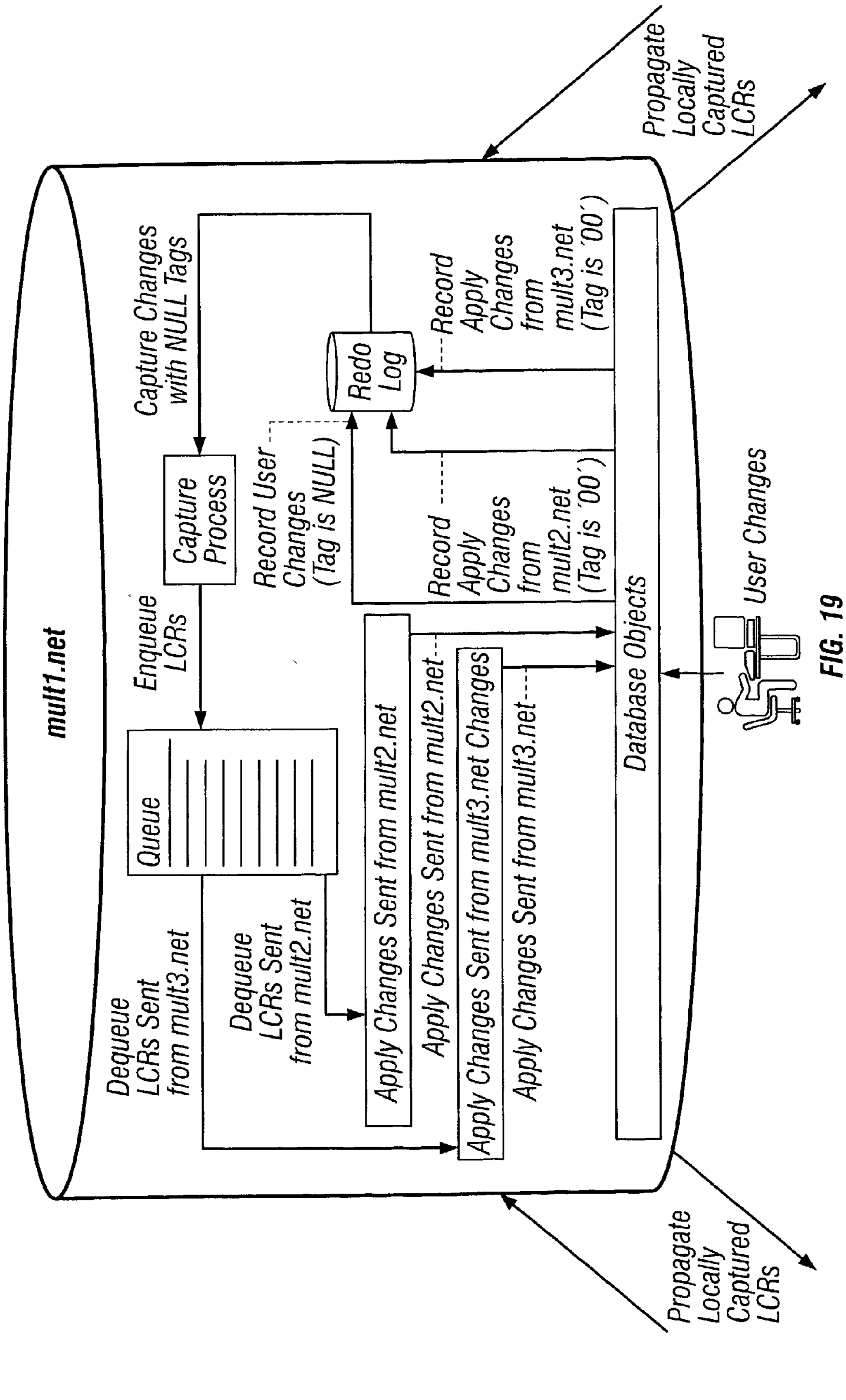
FIG. 19 is a block diagram illustrating the use of tags when each database is a source and destination database.

This configuration prevents change cycling because all of the changes applied by the apply processes are never recaptured (they were captured originally at the source databases). Each database sends all of its changes to the hr schema to every other database. So, in this environment, no changes are lost, and all databases are synchronized. FIG. 19 illustrates how tags can be used in a database in a multiple source environment.

Primary Database Sharing Data with Several Secondary Databases

This scenario involves a Information sharing system 100 environment in which one database is the primary database, and this primary database shares data with several secondary databases. The secondary databases share data only with the primary database. The secondary databases do not share data directly with each other, but, instead, share data indirectly with each other through the primary database. This type of environment is sometimes called a "hub and spoke" environment, with the primary database being the hub and the secondary databases being the spokes.

In such an environment, changes are captured, propagated, and applied in the following way:

The primary database captures local changes to the shared data and propagates these changes to all secondary databases, where these changes are applied at each secondary database locally.

Each secondary database captures local changes to the shared data and propagates these changes to the primary database only, where these changes are applied at the primary database locally.

The primary database applies changes from each secondary database locally. Then, these changes are captured at the primary database and propagated to all secondary databases, except for the one at which the change originated. Each secondary database applies the changes from the other secondary databases locally, after they have gone through the primary database. This configuration is an example of apply forwarding.

An alternate scenario may use queue forwarding. If this environment used queue forwarding, then changes from secondary databases that are applied at the primary database are not captured at the primary database. Instead, these changes are forwarded from the queue at the primary database to all secondary databases, except for the one at which the change originated.

Figure 20:
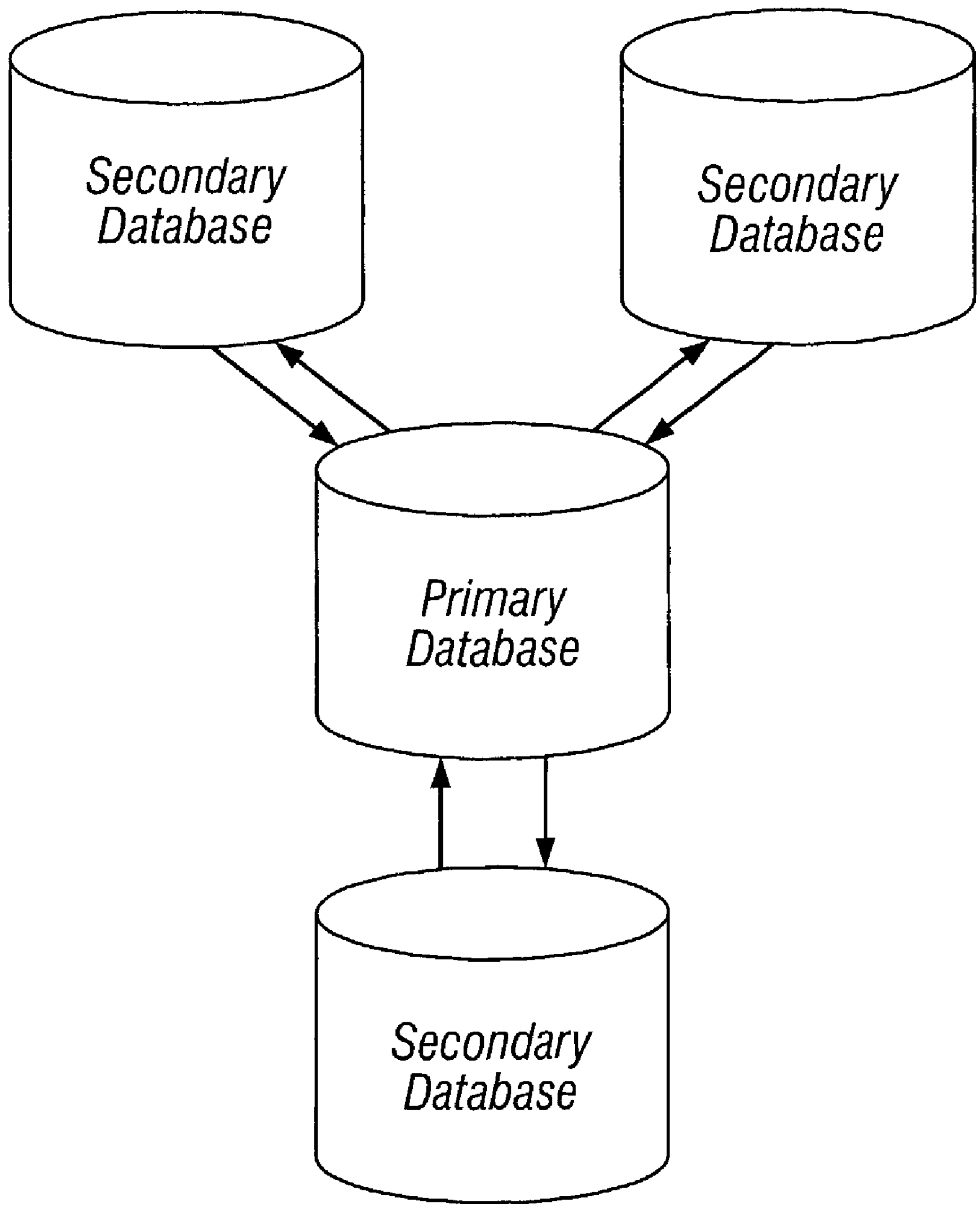
FIG. 20 is a block diagram illustrating a primary database sharing data with several secondary databases.
Figure 21:
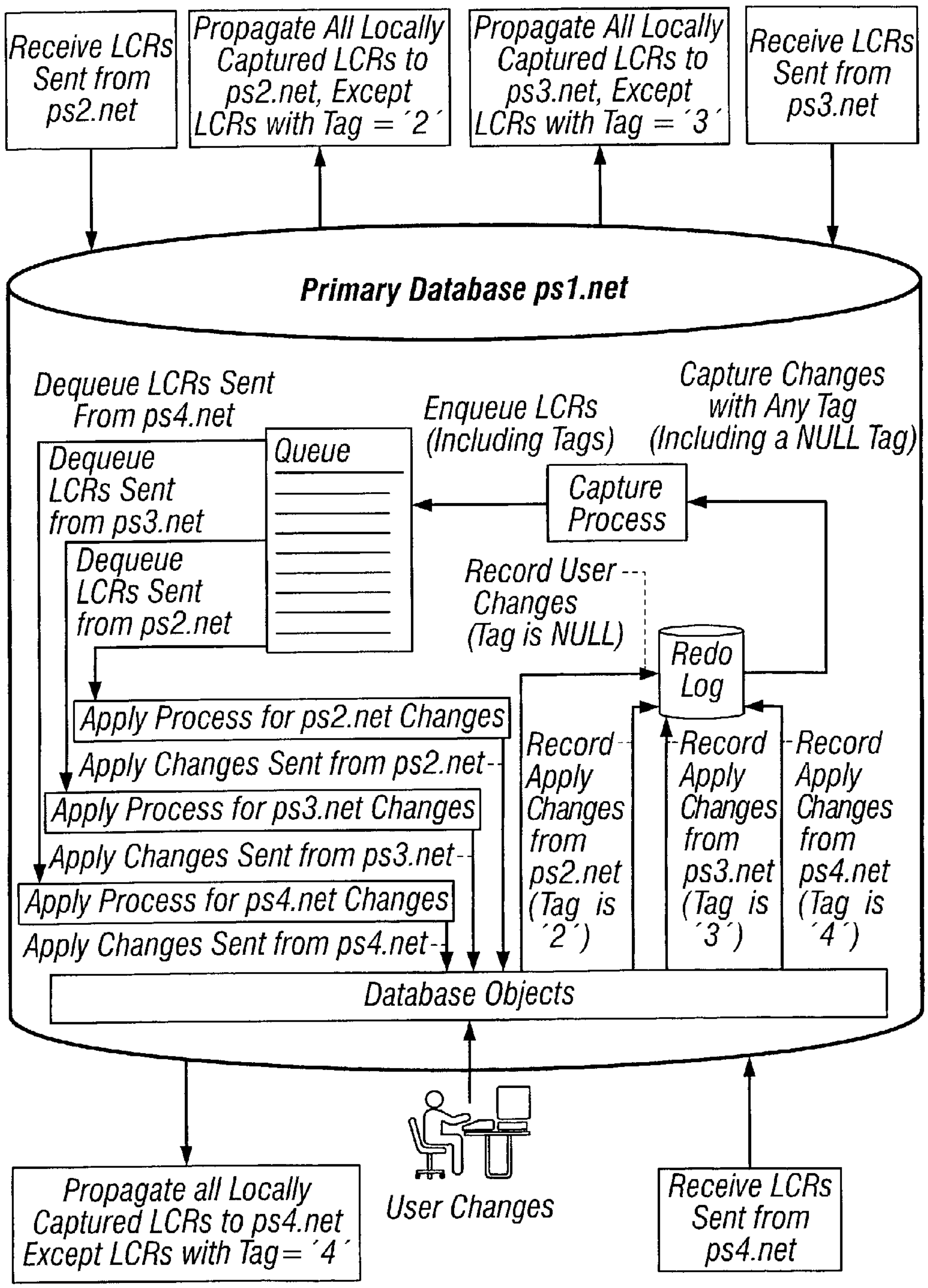
FIG. 21 is a block diagram illustrating tags used at the primary database.
Figure 22:
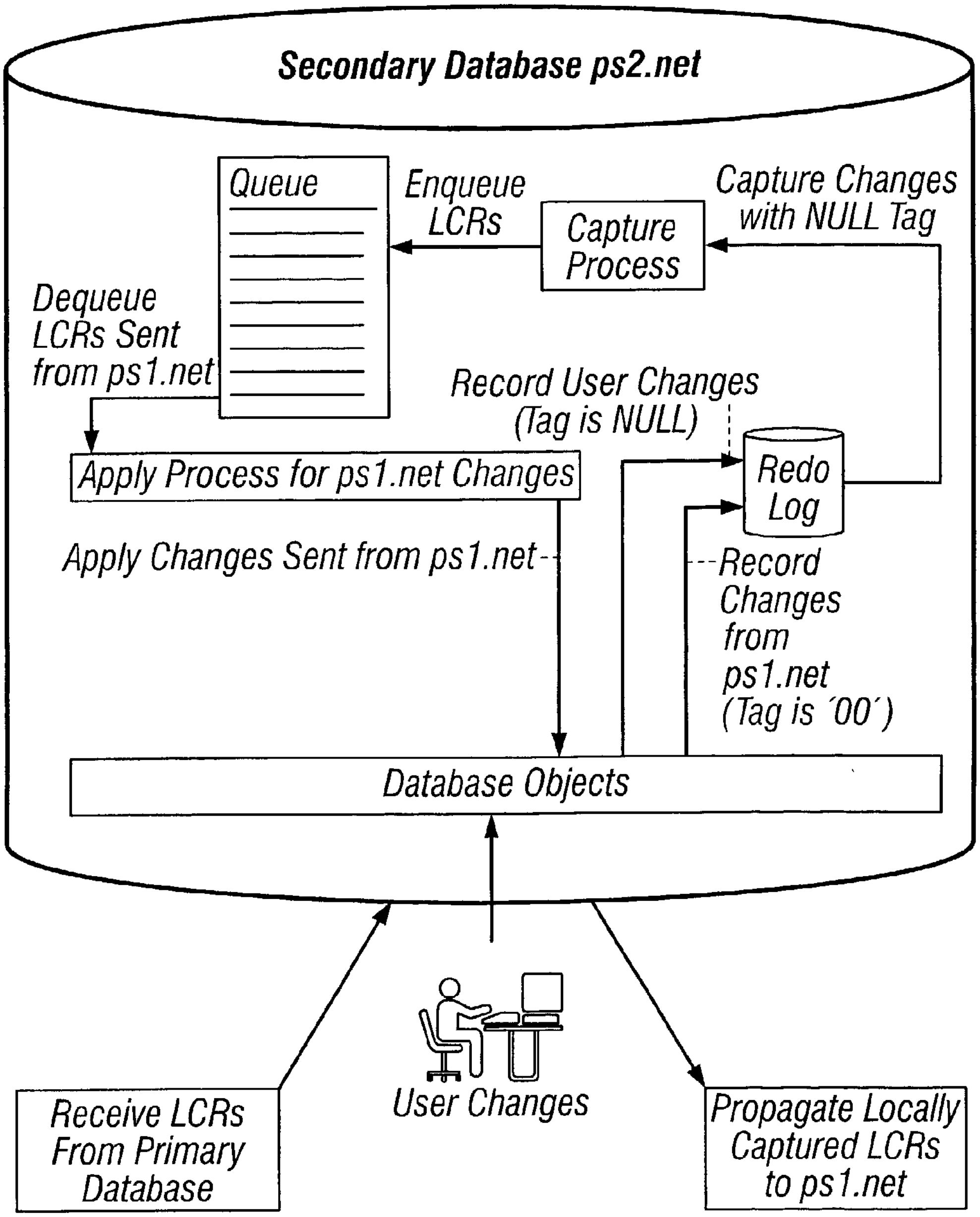
FIG. 22 is a block diagram illustrating tags used at a secondary database.

For example, consider an environment that replicates the database objects and data in the hr schema between one primary database named ps1.net and three secondary databases named ps2.net, ps3.net, and ps4.net. DML and DDL changes made to tables in the hr schema are captured at the primary database and at the three secondary databases in the environment. Then, these changes are propagated and applied as described previously. The environment uses apply forwarding, not queue forwarding, to share data between the secondary databases through the primary database. FIG. 20 illustrates an example environment which has one primary database and multiple secondary databases.

Users can avoid change cycles by configuring the environment in the following way: Configure each apply process at the primary database ps1.net to generate non-NULL redo tags that indicate the site from which it is receiving changes. In this environment, the primary database has at least one apply process for each secondary database from which it receives changes. For example, if an apply process at the primary database receives changes from the ps2.net secondary site, then this apply process may generate a raw value that is equivalent to the hexadecimal value '2' for all changes it applies. Users do this by setting the apply tag parameter in the CREATE_APPLY or ALTER_APPLY procedure in the DBMS_APPLY_ADM package to the non-NULL value.

For example, run the following procedure to create an apply process that generates redo entries with tags that are equivalent to the hexadecimal value '2'

```
BEGIN
   DBMS_APPLY_ADM.CREATE_APPLY(
      queue_name            =>  'strmadmin.streams_queue',
      apply_name            =>  'apply_ps2',
      rule_set_name         =>  'strmadmin.apply_rules-ps2',
      apply tag             =>  HEXTORAW('2'),
      apply_captured => true);
END;
```

Configure the apply process at each secondary database to generate non-NULL redo tags. The exact value of the tags is irrelevant as long as it is non-NULL. In this environment, each secondary database has one apply process that applies changes from the primary database.

If users use a procedure in the DBMS INFORMATION SHARING SYSTEM 100 ADM package to create an apply process, then the apply process generates non-NULL tags with a value of '00' in the redo log by default. In this case, no further action is required for the apply process to generate non-NULL tags.

For example, assuming no apply processes exist at the secondary databases, run the ADD_SCHEMA_RULES procedure at each secondary database to create an apply process that generates non-NULL redo entries with tags that are equivalent to the hexadecimal value '00'.

```
BEGIN
    DBMS_STREAMS_ADM.ADD_SCHEMA_RULES (
        schema_name     =>  'hr',
        streams_type    =>  'apply',
        streams_name    =>  'apply',
        queue_name      =>  'strmadmin.streams_queue',
        include_dml     =>  true,
        include_dml     =>  true,
        source database =>  'ps1.net');
END;
```

Configure the capture process at the primary database to capture changes to the shared data regardless of the tags. Users do this by setting the include_tagged_lcr parameter to true when users run one of the procedures that generate capture rules. If users create rules for the capture process at the primary database, then make sure the rules do not contain is null tag conditions, because these conditions involve tags in the redo log.

For example, run the following procedure at the primary database to produce one DML capture process rule and one DDL capture process rule that each have a condition that evaluates to TRUE for changes in the hr schema, regardless of the tag for the change:

```
BEGIN
    DBMS_STREAMS_ADM.ADD_SCHEMA_RULES(
        schema_name         =>  'hr',
        streams_type        =>  'capture',
        streams_name        =>  'capture',
        queue_name          =>  'strmadmin.streams_queue',
        include_tagged_lcr  =>  true, -- Note parameter setting
        include_dml         =>  true,
        include_ddl         =>  true);
END;
```

Configure the capture process at each secondary database to capture changes only if the tag in the redo entry for the change is NULL. Users do this by ensuring that each DML rule in the rule set used by the capture process at the secondary database has the following condition:

:dml.is_null_tag ( )='Y'

DDL rules should have the following condition:

:ddl.is_null_tag ( )='Y'

These rules indicate that the capture process captures a change only if the tag for the change is NULL. If users use the DBMS INFORMATION SHARING SYSTEM 100 ADM package to generate rules, then each rule has one of these conditions by default. If users use the DBMS RULE ADM package to create rules for the capture process at a secondary database, then make sure each rule contains one of these conditions.

Configure one propagation from the queue at the primary database to the queue at each secondary database. Each propagation should use a rule set with rules that instruct the propagation to propagate all LCRs in the queue at the primary database to the queue at the secondary database, except for changes that originated at the secondary database.

For example, if a propagation propagates changes to the secondary database ps2.net, whose tags are equivalent to the hexadecimal value '2', then the rules for the propagation should propagate all LCRs relating to the hr schema to the secondary database, except for LCRs with a tag of '2'. For row LCRs, such rules should include the following condition :dml.get_tag( )!=HEXTORAW('2')

For DDL LCRs, such rules should include the following condition:

:ddl.get_tag( ) !=HEXTORAW('2')

Users can use the CREATE_RULE procedure to create rules with these conditions.

Configure one propagation from the queue at each secondary database to the queue at the primary database. A queue at one of the secondary databases contains only local changes made by user sessions and applications at the secondary database, not changes made by an apply process. Therefore, no further configuration is necessary for these propagations.

This configuration prevents change cycling in the following way:

Changes that originated at a secondary database are never propagated back to that secondary database.

Changes that originated at the primary database are never propagated back to the primary database.

All changes made to the shared data at any database in the environment are propagated to every other database in the environment.

So, in this environment, no changes are lost, and all databases are synchronized.

Primary Database Sharing Data with Several Extended Secondary Databases

In this environment, one primary database shares data with several secondary databases, but the secondary databases have other secondary databases connected to them, which will be called remote secondary databases. This environment is an extension of the environment described in "Primary Database Sharing Data with Several Secondary Databases".

Figure 23:
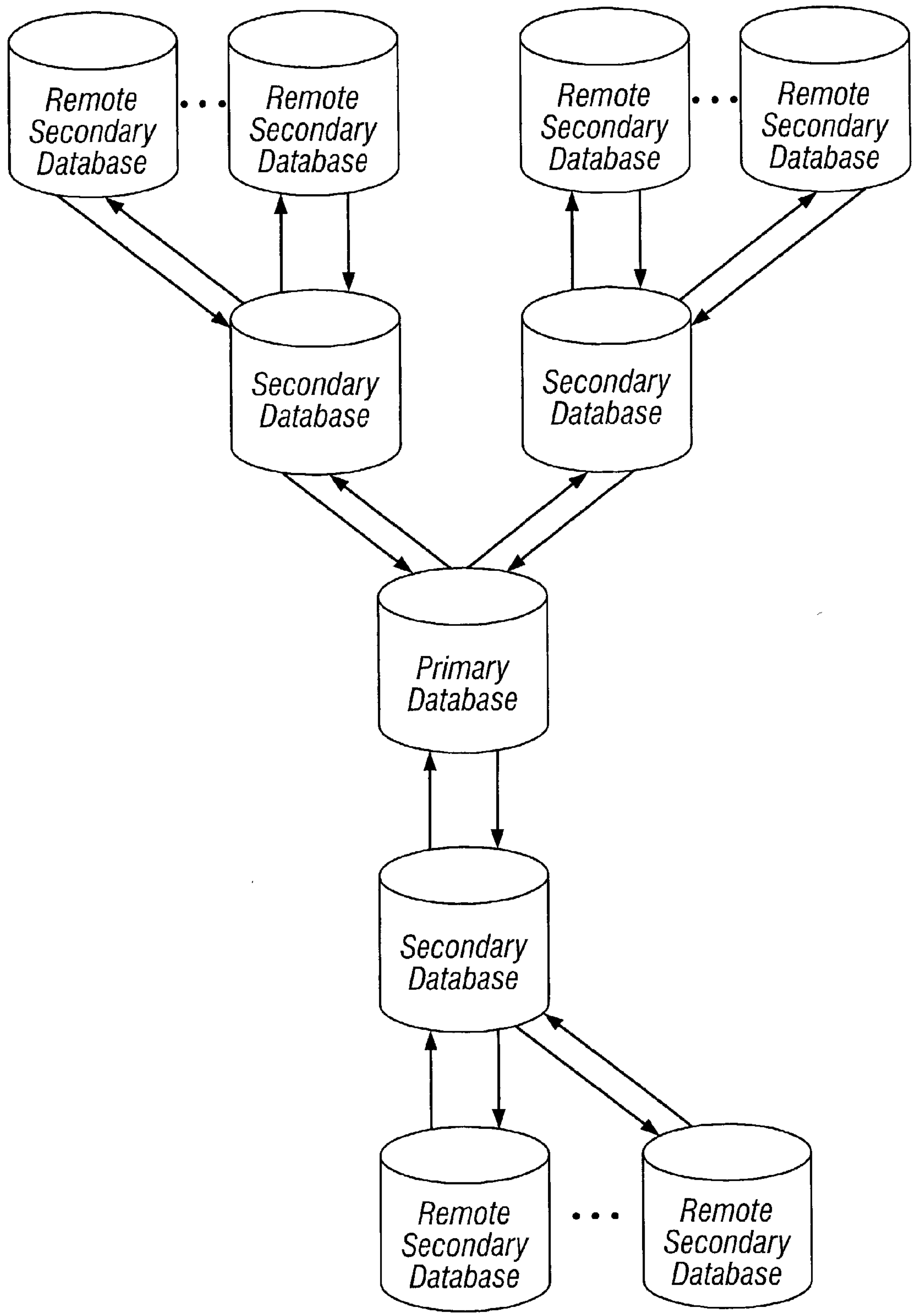
FIG. 23 is a block diagram illustrating a primary database and several extended secondary databases.

A remote secondary database does not share data directly with the primary database, but instead shares data indirectly with the primary database through a secondary database. So, the shared data exists at the primary database, at each secondary database, and at each remote secondary database. Changes made at any of these databases are captured and propagated to all of the other databases. FIG. 23 illustrates an environment with one primary database and multiple extended secondary databases.

In such an environment, users can avoid change cycling in the following way:

Configure the primary database in the same way that it is configured in the example described in "Primary Database Sharing Data with Several Secondary Databases".

Configure each remote secondary database similar to the way that each secondary database is configured in the example described in "Primary Database Sharing Data with Several Secondary Databases". The only difference is that the remote secondary databases share data directly with secondary databases, not the primary database.

At each secondary database, configure one apply process to apply changes from the primary database with a redo tag value that is equivalent to the hexadecimal value '00'. This value is the default tag value for an apply process.

At each secondary database, configure one apply process to apply changes from each of its remote secondary databases with a redo tag value that is unique for the remote secondary database.

Configure the capture process at each secondary database to capture all changes to the shared data in the redo log, regardless of the tag value for the changes.

Configure one propagation from the queue at each secondary database to the queue at the primary database. The propagation should use a rule set with rules that instruct the propagation to propagate all LCRs in the queue at the secondary database to the queue at the primary database, except for changes that originated at the primary database. Users do this by adding a condition to the rules that evaluates to TRUE only if the tag in the LCR does not equal '00'. For example, enter a condition similar to the following for row LCRs:

dml.get_tag( )!=HEXTORAW('00')

Configure one propagation from the queue at each secondary database to the queue at each remote secondary database. Each propagation should use a rule set with rules that instruct the propagation to propagate all LCRs in the queue at the secondary database to the queue at the remote secondary database, except for changes that originated at the remote secondary database. Users do this by adding a condition to the rules that evaluates to TRUE only if the tag in the LCR does not equal the tag value for the remote secondary database. For example, if the tag value of a remote secondary database is equivalent to the hexadecimal value '19', then enter a condition similar to the following for row LCRs:

:dml.get_tag( )!=HEXTORAW ('19')

By configuring the environment in this way, users prevent change cycling, and no changes originating at any database are lost.

In Memory Streaming with Disk Backup and Recovery of Messages Captured from a Database Redo Stream A database is used to store and organize information on a persistent electronic data storage medium, for example, a floppy disk, a hard disk or tape, in a consistent and recoverable manner. A database also generates a stream of redo and undo information for every change it makes to the storage medium. The redo/undo stream is used primarily for recovering the database to a consistent point after a crash.

However, as explained above, the redo and undo information may be used for other purposes. For example, the redo logs may be used to create a replica of a database (or selected objects within the database) and to maintain the replica consistent with the original copy. One reason for creating a replica could be for purposes of backup in case the original is destroyed. Another reason for creating a replica is to allow the data to be accessed faster by creating replicas "closer" to the users who will be querying or modifying it.

To create a replica, an initial copy is made of the original and from that point onwards any changes made to the original are transported and applied to the replica. The changes could be transported directly or via intermediate sites. The transportation is typically done by electronically transferring data over a data network or in some cases by physically carrying the storage medium over. Similarly, any changes made to the replica are transported and applied to the original. If discrepancies appear due to simultaneous modification of a data item on different sites, the discrepancy needs to be resolved by conflict resolution functions built into the database or provided by the database administrator.

Creating and updating a replica based on changes made to an original database object is merely one example of how changes may be "applied". However, the application of a change may involve any type of action, or may initiate a long chain of actions. For example, the application of a change may involve generation of a message to subscribers who are interested in the database object that was changed.

A database system is merely one example of a system in which changes are made and logged. The techniques described herein are not limited to any particular type of change-generating system. However, for the purpose of explanation, examples will be given in which the both the system that initially generates the changes, and the system at which the changes are applied, are databases.

For the purpose of explanation, the system on which a change is initially made is referred to as the source site, and the system on which the change is applied is referred to as the destination site. However, it should be noted that a change may be applied by the same system within which the change was initially made. Under these circumstances, the source site and the destination site are the same site.

Typically, changes made to a database object are stored on persistent storage medium before the changes are applied at the destination site. The storage could be done on the source site, an intermediate site, the destination site, or all of the above. Unfortunately, storing the changes persistently prior to applying the changes tends to hinder the performance of the apply operation. The reduced performance is due to the fact that, ever since computers have been invented, persistent storage mediums have been typically 10–100 times slower than transient storage mediums in storing and retrieving data.

To avoid the delay imposed by durably storing the changes prior to applying them, the techniques described hereafter allow for the changes to be stored in a transient storage medium, such as RAM memory, between the time at which they are generated at the source site and the time at which they are applied at the destination site.

According to one embodiment, in which the source and destination sites are database systems, changes are captured by reading the redo/undo stream of the source database system and storing the changes in transient storage. The change data is then transported to the transient storage on another database system where it is either applied, transported forward to yet another database system, or both.

The contents of the transient storage are organized in a first-in first-out (FIFO) manner. For the purpose of explanation, the portion of memory used to store the change data in this manner shall be referred to hereafter as a "FIFO buffer". Modern computers are equipped with multiple processing units (or CPUs). For the purpose of explanation, the CPUs assigned to the tasks of capturing changes, propagating changes, and applying changes shall be referred to as the capture engine, the propagation engine and the apply engine, respectively.

Figure 24:
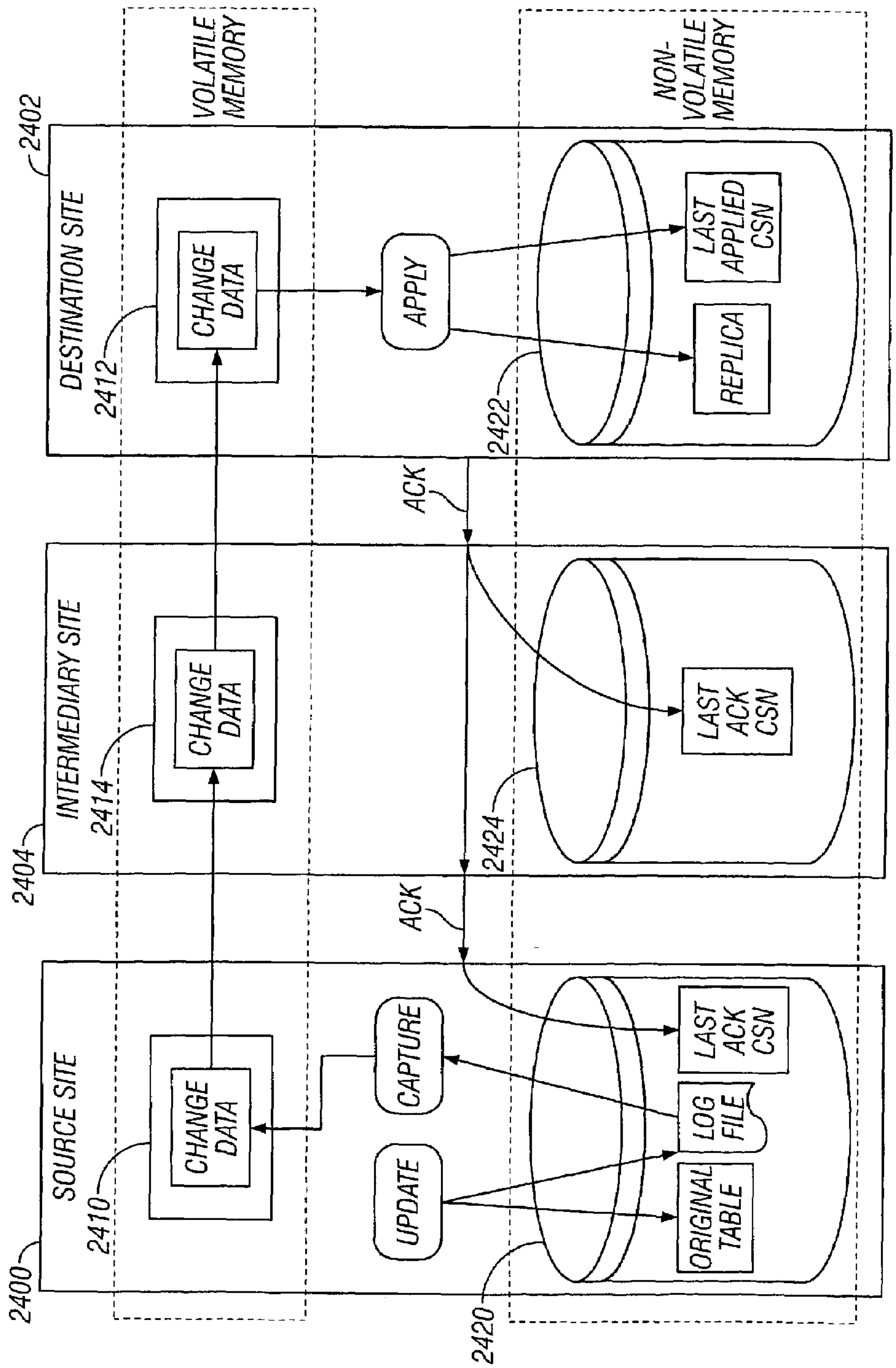
FIG. 24 is a block diagram illustrating the in-memory streaming of change information from a source site to a destination site through one intermediary site, according to an embodiment of the invention.

Referring to FIG. 24, it is a block diagram illustrating the in-memory streaming of change information from a source site 2400 to a destination site 2402 through one intermediary site 2404. As mentioned above, there may be zero or several intermediary sites. Thus, an embodiment in which there is one intermediary site 2404 is merely illustrated for the purpose of explanation.

As illustrated in FIG. 24, an update to an original table at the source site 2400 causes data that reflects the change to be inserted into a log file. A capture engine reads the log file and generates change data that is streamed to the volatile memory 2410 of the source site. From the volatile memory 2410 of the source site, a propagation engine (not shown) propagates the change data to the volatile memory 2414 of the intermediary site 2404. From the volatile memory 2414 of the intermediary site 2404, a propagation engine (not shown) propagates the change data to the volatile memory 2412 of the destination site 2402. The change data is then read from the volatile memory 2412 at the destination site 2402 by an apply engine, and applied at the destination site 2402. In the scenario illustrated in FIG. 24, the change data is applied by modifying a replica, located at the destination site 2402, based on the update that was made to the original table located at the source site.

Frequently, the sequence in which changes are applied should be based on the sequence in which the changes were initially made. According to one embodiment, the following measures are taken by the various components illustrated in FIG. 24 to ensure that the order of the changes is not lost:

Each change in the redo stream is assigned a unique and increasing number, referred to herein as the change sequence number (or CSN).

The capture engine adds changes into the FIFO buffer in the CSN order.

The propagation engine maintains the CSN order while transporting changes.

The apply engine uses this sequence to determine the order in which to apply changes.

Because the change data is not stored to persistent memory between the time that the change data is generated, and the time at which the change data is consumed by the apply process, the performance of the illustrated replication operation is significantly improved. However, the failure to store the change data to persistent memory during the replication operation has certain recovery ramifications, which shall be addressed hereafter.

Using the CSN to Achieve "Exactly Once" Behavior

Unfortunately, information that is stored in transient memory may be permanently erased from that memory when a failure occurs. Such information loss may have a disastrous effect in systems that require changes to be applied exactly once at the destination site. Specifically, if no precautions are taken, neither the capture engine nor the apply engine would know which changes were sent-but-not-yet-applied before the failure. Thus, there is great danger that the capture engine will resend and the apply engine will reapply changes that had already been applied. Conversely, there is a danger that the capture engine will not resend and the apply engine will never apply changes that had been sent but not yet applied before the failure.

According to one embodiment, in addition to ensuring a correct apply order, the CSN is used to ensure that changes are applied exactly once after a failure. According to one embodiment, exactly once behavior is achieved by causing the apply engine to persistently record the original CSN of the most recently applied change. This value, illustrated in FIG. 24 as the LAST-APPLIED CSN, is continuously updated by the apply engine as new changes are applied. Because the LAST-APPLIED CSN is stored on nonvolatile memory, it will be available after a failure, even when the failure involves the site at which the LAST-APPLIED CSN is stored. As shall be described in greater detail hereafter, the ability to discover the LAST-APPLIED CSN after a failure ensures that the apply engine does not re-apply previously applied changes.

According to one embodiment, in addition to storing the LAST-APPLIED CSN, the apply engine periodically informs the propagation engine of the current LAST-APPLIED CSN. Messages used to communicate this information are referred to herein as acknowledgements, or "ACKs". Referring to FIG. 24, an ACK is sent from the destination site 2402 to the intermediary site 2404, and from the intermediary site 2404 to the source site 2400.

While the source site 2400 is informed about the LAST-APPLIED CSN in this manner, by the time the source site 2400 receives an ACK, the LAST-APPLIED CSN value identified in the ACK will typically be outdated. In other words, the apply engine will already have applied changes beyond the change associated with the LAST-APPLIED CSN value indicated in the ACK message by the time the ACK message is received by the source site 2400.

Although outdated, the LAST-APPLIED CSN value received at the source site 2400 is still valuable in that the source site 2400 knows that all changes up to that CSN value are guaranteed to have been applied by the apply engine. Therefore, according to one embodiment, at infrequent intervals, the source site 2400 persistently stores the CSN value that it has most recently received in an ACK message. The most recent CSN stored in this manner is referred to herein as the LAST ACK CSN, because it is the last CSN to be (1) received at the site in an ACK message, and (2) persistently stored at that site. To avoid the overhead associated with frequent disk accesses, the frequency with which the LAST ACK CSN is stored to persistent storage may be significantly lower than the frequency at which ACK messages are received. Thus, the LAST ACK CSN that is persistently stored may not actually be the CSN received in the most recent ACK message.

In the event of a failure, the source site 2400 need only resend changes with CSN values greater than the LAST ACK CSN value stored at the source site. Specifically, if the capturing database crashes, the contents of the FIFO buffer 2410 are lost. In this case, the capture engine re-enqueues changes into the FIFO buffer 2410 starting from the LAST ACK CSN recorded at the source site 2400. Thus, the capture engine will resend (1) all changes that were previously sent but not-yet-applied, and potentially (2) some changes that were previously sent and applied. However, the number of changes that fall in the second category will typically be very small, since it will only include those changes that were applied and whose CSN ins greater than the LAST ACK CSN stored at the source site.

According to one embodiment, one or more of the intermediary sites between a source site and the destination site are configured to store a LAST ACK CSN in a manner similar to the source site. Specifically, in addition to forwarding upstream any ACK messages that they receive, at infrequent intervals the propagation engines involved in forwarding the ACKs persistently record the CSNs contained in the ACKs. For example, in FIG. 24, intermediary site 2404 is shown to persistently store a LAST ACK CSN.

In an embodiment where the LAST ACK CSN is stored at an intermediary site, the LAST ACK CSN is used to limit the work that has to be done in response to the failure of the intermediary site. Specifically, if the intermediary site 2404 crashes, then the intermediary site 2404 reads the LAST ACK CSN stored at the intermediary site 2404, and requests the immediately adjacent upstream site (in this case, the source site 2400) to resend only those changes that represent times after the LAST ACK CSN.

As mentioned above, it may happen that a site may end up repropagating changes which have already been applied. According to one embodiment, it is the responsibility of downstream sites to ignore the changes associated with such duplicate CSNs by remembering the highest CSN that they have propagated and/or applied. For example, assume that source site 2400 crashes after source site 2400 (1) records a LAST ACK CSN of 30, and (2) propagates to intermediary site 2404 a change with CSN 50. Assume further that the change with CSN 50 is eventually propagated to and applied at destination site 2402.

In this scenario, when the source site 2400 is restarted, the source site 2400 will begin resending changes starting after CSN 30. Thus, intermediary site 2404 will receive changes associated with CSN 31 to CSN 50 after those changes have already been propagated and applied. However, since intermediary site 2404 keeps track of the CSN of the last change that it has propagated, intermediary site 2404 knows not to repropagate the changes associated with CSN 31 to CSN 50.

As another example, assume that intermediary site 2404 crashes after intermediary site 2404 (1) records a LAST ACK CSN of 30, and (2) propagates to destination site 2402 a change with CSN 50. Assume further that the change with CSN 50 is applied at destination site 2402.

In this scenario, when the intermediary site 2404 is restarted, the intermediary site 2400 will request the source site 2400 to resend changes starting after CSN 30. Intermediary site 2414 will receive and resend to destination site 2402 changes associated with CSN 31 to 50 after those changes have already been applied. However, since destination site 2402 keeps track of the LAST APPLIED CSN, destination site 2402 knows not to reapply the changes associated with CSN 31 to CSN 50.

According to one embodiment, if the destination database is not able to apply the changes as fast as they are coming in and memory is running short, then the destination database can dedicate a separate group of CPUs to spill the changes to persistent storage and free up the memory for these changes. These CPUs are referred to herein as the "spill engine". Changes are spilled in increasing order of CSN and a spilled CSN is ACKed to the propagation engine as if it has been applied. Under these circumstances, the apply engine looks at changes in the persistent queue first (if the persistent queue is not empty) and then applies changes from the FIFO buffer once the persistent queue is empty.

Process Failure Recovery

Under some failure scenarios, not all information in volatile memory is lost. For example, in the system shown in FIG. 24, the capture engine may fail without losing all data stored in the volatile memory of source site 2400. To quickly recover from such failures, a LAST PROCESSED CSN may be maintained in volatile memory. The LAST PROCESSED CSN stored by an engine indicates the CSN of the change most recently processed by that engine. For example, the capture process on source site 2400 may store a LAST PROCESSED CSN that indicates the CSN of the change that the apply engine most recently placed in FIFO buffer 2410. Similarly, a propagation engine on intermediary site 2404 may store a LAST PROCESSED CSN that indicates the CSN of the change most recently propagated to destination site 2402.

In the event that an engine fails without losing the corresponding LAST PROCESSED CSN, the LAST PROCESSED CSN (which will generally be more current than the LAST ACK CSN) may be used to determine where the engine should begin working when restarted. For example, when restarted, the capture engine of source site 2400 may inspect the LAST PROCESSED CSN to determine which changes have already been enqueued in FIFO buffer 2410.

"Exactly Once" Behavior and Transactions

In some environments, the changes that are captured, propagated and applied may belong to transactions. A transaction is a set of operations that are "made permanent" as a single atomic operation. In environments where changes belong to transactions, the changes for various transactions may be interleaved with each other relative to the CSN order. For example, the changes for a first transaction TX1 may be assigned the CSNs of 10, 11, 15 and 17, while the changes for a second transaction TX2 may be assigned the CSNs of 12, 13, 14, 16, 18 and 20.

In most systems, the entire transaction will be assigned a CSN that indicates when the transaction is considered to have been completed. The "time of completion" number assigned to a transaction, referred to herein as the "commit CSN", is typically the CSN associated with the last change made in the transaction. For example, the commit CSN of the transaction TX1 is 17, while the commit CSN of transaction TX2 is 20.

According to one embodiment, the LAST APPLIED CSN that is persistently stored by the apply engine is the commit CSN of the last transaction committed by the apply engine, and not simply the CSN of the last change applied by the apply engine. Thus, in this context, the LAST APPLIED CSN may be referred to as the LAST COMMITTED CSN. By persistently maintaining only the LAST COMMITTED CSN, rather than the CSN of the latest change, the frequency at which the persistently stored information has to be updated is significantly reduced.

Thus, when the apply engine completes execution of TX1, the apply engine would update the LAST COMMITTED CSN to reflect the CSN of 17. However, the apply engine would not update the LAST COMMITTED CSN to 18 after applying the change of TX2 associated with CSN 18. Rather, the LAST COMMITTED CSN would only be changed from 17 once TX2 is completely applied, at which time the LAST COMMITTED CSN will be changed to 20.

In an embodiment that durably maintains a LAST COMMITTED CSN in this manner, the LAST COMMITTED CSN reflects the commit time of the last transaction that has been completely applied by the apply engine. In addition to the LAST COMMITTED CSN, the apply engine may maintain in volatile memory, for each transaction that has not yet been completely applied, a HIGHEST-SO-FAR CSN. The HIGHEST-SO-FAR CSN for a transaction is the CSN of the latest change that the apply engine has applied for that transaction. Thus, while the apply engine would not update the LAST COMMITTED CSN to 18 after applying the change of TX2 associated with CSN 18, the apply engine would update the HIGHEST-SO-FAR CSN for TX2 to 18 after applying the change of TX2 associated with CSN 18.

Based on the LAST APPLIED CSN and HIGHEST-SO-FAR CSNs, the apply engine can readily identify and discard any duplicates of already-applied changes. Specifically, the apply engine discards already-applied changes by discarding: (1) those changes that belong to transactions that have commit CSNs less than or equal to the LAST COMMITTED CSN, and (2) those changes that have CSNs that are less than or equal to the HIGHEST-SO-FAR CSN of the transaction to which the changes belong.

For example, assume that LAST COMMITTED CSN is 17. If the apply engine receives a change associated with TX1 and CSN 15, then the apply engine will discard the change because the commit CSN of TX1 is not greater than the LAST COMMITTED CSN (i.e. 17). On the other hand, if the commit CSN of TX2 is 20, and the apply engine receives the change associated with TX2 and CSN 12, then the apply engine will compare 12 to the HIGHEST-SO-FAR CSN of TX2. If HIGHEST-SO-FAR CSN of TX2 is equal to or greater than 12, then the apply engine will discard the change associated with CSN 12. On the other hand, if the HIGHEST-SO-FAR CSN of TX2 is less than 12, then the apply engine will apply the change.

Oldest CSN

According to one embodiment, when the changes that are being applied are part of transactions, the ACK message sent upstream by the apply engine includes an OLDEST CSN value, rather than a LAST APPLIED CSN. The OLDEST CSN is the oldest change CSN of all uncommitted transactions. According to one embodiment, the OLDEST CSN value is persistently stored by the apply engine, and periodically communicated upstream using ACK messages.

The oldest change CSN for a transaction will typically be the CSN associated with the first change made by the transaction. To maintain the OLDEST CSN up-to-date, the apply engine "raises" the OLDEST CSN when the transaction associated with the current OLDEST CSN is fully applied. For example, consider the follow three transactions:

TX1 with changes at CSN 12, 13, 17, 20

TX2 with changes at CSN 11, 14, 15, 18, 19 and 23

TX3 with changes at CSN 16, 21, 22, 24 and 25.

If TX1, TX2 and TX3 are the only uncommitted transactions for which the apply received changes, then the OLDEST CSN will be 11 (the oldest change CSN from any of the uncommitted transactions). Assume that the apply engine first finishes applying TX1. At that point, the LAST COMMITTED CSN would be changed to 20, but the OLDEST CSN does not change, because TX1 was not the transaction associated with the OLDEST CSN.

If the apply engine then finishes applying TX2, then the OLDEST CSN would be updated to 16, since the only uncommitted transaction would be TX3, and the oldest change CSN of TX3 is 16. At this point, the LAST COMMITTED CSN would also be changed to 23.

By maintaining the OLDEST CSN in this manner, all changes associated with change CSNs below the OLDEST CSN are guaranteed to have been applied. Thus, in the case of a failure, it is safe for the apply engine to read the persistently stored OLDEST CSN, and to request the upstream components to resend the change information starting at the OLDEST CSN.

Out-of-Order Application of Transactions

In the description given above, it was assumed that transactions are applied in the sequence of their commit CSN. Thus, if a change is for a transaction with a CSN higher than the LAST COMMITTED CSN, it could be assumed that the change has not yet been applied. However, according to one embodiment, the apply engine is able to apply changes in parallel, and in a sequence that guarantees consistency without guarantying that all transactions will be applied in the sequence of their commit CSN.

For example, assume that transactions TX1, TX2 and TX3 have commit CSNs of 17, 20 and 25, respectively. According to one embodiment, if TX3 does not depend on TX2, then the apply engine may commit TX1 and TX3 prior to committing TX2. When TX3 commits, the LAST COMMITTED CSN would be updated to 25. However, TX2 has not yet been committed. Therefore, if a crash occurs, then the changes associated with TX2 will be discarded after the crash, even though those changes were not committed before the crash.

On the other hand, assume that there is no crash after TX3 is applied. Rather, assume that the apply engine goes on to apply TX2, and then a crash occurs. After TX2 is applied, the LAST COMMITTED CSN would be updated to 20, since 20 is the committed CSN of the last transaction (TX2) to be applied. Based on a LAST COMMITTED CSN of 20 and the fact that TX3 has a commit CSN of 25, the apply engine would reapply TX3 after the crash, even though TX3 had already been fully applied before the crash.

Thus, in environments where the transactions may be applied out of commit CSN order, the LAST COMMITTED CSN may not provide sufficient information for the apply engine to determine whether a change should be applied or discarded. Thus, according to one embodiment where transactions may be applied out of sequence, a LOW WATERMARK CSN and an OLDEST CSN are maintained. The meaning and use of each of these values shall be described in greater detail hereafter.

Low Watermark CSN

According to one embodiment, the LOW WATERMARK CSN is the CSN such that all transactions that have a commit CSN lower than or equal to the LOW WATERMARK CSN are guaranteed to have been applied. In systems where transactions are always applied in CSN commit order, the LOW WATERMARK CSN is the same as the LAST COMMITTED CSN. However, in systems where transactions are not always applied in CSN commit order, it is possible for the LOW WATERMARK CSN to be less than the commit CSN of the most recently applied transaction.

To maintain the LOW WATERMARK CSN up-to-date, the apply engine "raises" the LOW WATERMARK CSN when (1) the apply engine finishes applying a transaction that has a commit CSN that is above the current LOW WATERMARK CSN, and (2) no unapplied transaction has a commit CSN lower than the commit CSN of the transaction that has just been applied.

For example, assume that transactions TX1, TX2 and TX3 have commit CSNs of 17, 20 and 25, respectively. Assume that (1) TX1 has been applied, (2) the current LOW WATERMARK CSN is 17, and (3) the apply engine applies TX3 before TX2. When TX3 is fully applied, the LOW WATERMARK CSN is not updated because an unapplied transaction (TX2) has a lower commit CSN than the commit CSN of TX3. After TX2 is applied, the LOW WATERMARK CSN is updated to 25, since all transactions with commit times at or below 25 have been applied.

Above-Mark Applied Transactions

The already-applied transactions with commit CSNs above the LOW WATERMARK are referred to herein as the ABOVE-MARK APPLIED transactions. In the example given above, when TX3 was fully applied before TX2, TX3 became an ABOVE-MARK APPLIED transaction. According to one embodiment, in addition to the LOW WATERMARK CSN, the apply engine persistently stores information about the ABOVE-MARK APPLIED transactions. According to one implementation, the information about the ABOVE-MARK APPLIED transactions is maintained in a hash table in volatile memory, and the hash table is backed up on persistent storage.

Using the Low Watermark, Oldest CSN, and Above-Mark Information to Determine Whether to Discard Changes In an embodiment that maintains on persistent storage a LOW WATERMARK CSN, information about ABOVE-MARK APPLIED transactions, and an OLDEST CSN, the apply engine discards already-applied changes by discarding: (1) those changes that are associated with CSNs that are lower than the OLDEST CSN, (2) those changes that belong to transactions that have commit CSNs less than the LOW WATERMARK CSN, (3) those changes that have CSNs that are less than or equal to the HIGHEST-SO-FAR CSN of the transaction to which the changes belong, and (4) those changes that belong to ABOVE-MARK APPLIED transactions.

For example, assume that the LOW WATERMARK CSN is 18, and TX3 (with a commit time of 25) is an ABOVE-MARK APPLIED transaction. Under these conditions, the apply engine discards any change that is associated with a transaction with a commit CSN lower than 18. Similarly, even though many changes associated with TX3 may be associated with CSNs above the LOW WATERMARK CSN of 18, all changes associated with TX3 will all be discarded because TX3 is an ABOVE-MARK APPLIED transaction. On the other hand, if the apply engine receives a change associated with an uncommitted transaction TX2, and the change has a CSN of 12, then the apply engine will compare 12 to the HIGHEST-SO-FAR CSN of TX2. If HIGHEST-SO-FAR CSN of TX2 is equal to or greater than 12, then the apply engine will discard the change associated with CSN 12. On the other hand, if the HIGHEST-SO-FAR CSN of TX2 is less than 12, then the apply engine will apply the change.

As the apply engine continues to apply transactions, the LOW WATERMARK value will rise. As the LOW WATERMARK CSN rises, it may pass the commit CSNs of transactions that had previously been ABOVE-MARK APPLIED transactions. According to one embodiment, the hash table used to track the ABOVE-MARK APPLIED transactions is periodically pruned to remove all information for previous ABOVE-MARK APPLIED transactions that have commit CSNs that the LOW WATERMARK CSN has subsequently risen above.

In embodiments that maintain an OLDEST CSN, the ACK messages convey the OLDEST CSN to the upstream entity. For example, referring again to FIG. 24, the ACK message that is periodically sent from the destination site 2402 to the intermediary site 2404 contains the current OLDEST CSN. The intermediary site 2404 periodically saves this information and forwards it in an ACK message to the source site 2400. The source site 2400 also periodically stores this information to persistent storage.

Flowchart for Apply Engine

Figure 25:
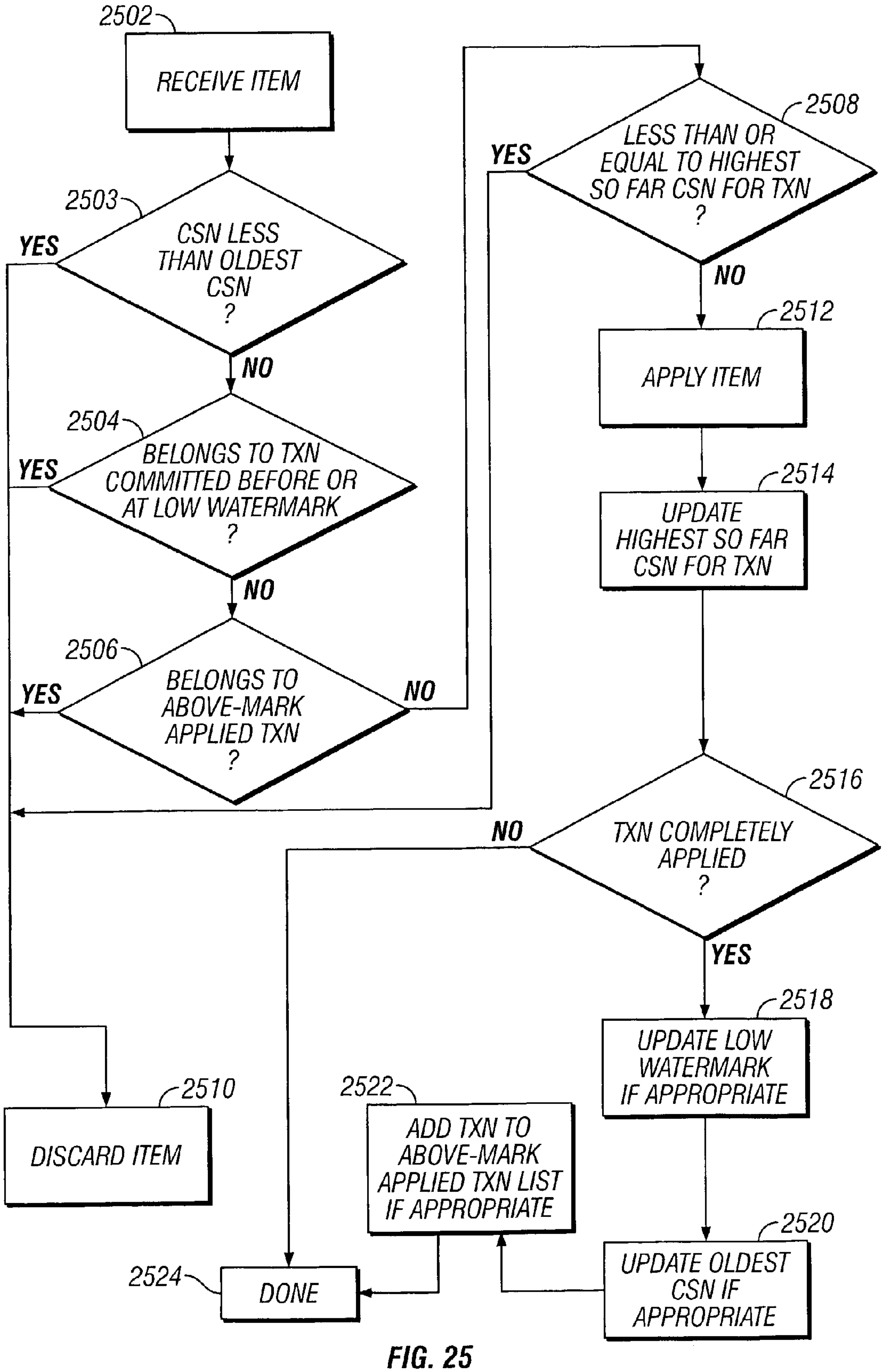
FIG. 25 is a flowchart illustrating steps performed by an apply engine, according to an embodiment of the invention, that uses a persistently stored LOW WATERMARK, persistently stored data that identifies ABOVE-MARK APPLIED transactions, and non-persistently stored HIGHEST SO FAR CSNs, to achieve exactly-once behavior.

Referring to FIG. 25, it is a flowchart illustrating steps performed by an apply engine, according to an embodiment of the invention, that uses a persistently stored LOW WATERMARK, a persistently stored OLDEST CSN, persistently stored data that identifies ABOVE-MARK APPLIED transactions, and non-persistently stored HIGHEST SO FAR CSNs, to achieve exactly-once behavior.

At step 2502, the apply engine receives an item. The item has a CSN, and belongs to a transaction. At step 2503, the apply engine determines whether the item has a CSN that is less than the OLDEST CSN. If the item has a CSN that is less than the OLDEST CSN, then the item is discarded at step 2510. On the other hand, if the item has a CSN that is equal to or greater than the OLDEST CSN, then control proceeds to step 2504.

At step 2504, the apply engine determines whether the item belongs to a transaction that has a commit time that is less than or equal to the current LOW WATERMARK. If the item belongs to a transaction that has a commit time that is below the current LOW WATERMARK, then the item is discarded at step 2510. On the other hand, if the CSN belongs to a transaction that has a commit time that is greater than the current LOW WATERMARK, then control proceeds to step 2506.

At step 2506, the apply engine determines whether the item belongs to an ABOVE-MARK APPLIED transaction. If the item belongs to an ABOVE-MARK APPLIED transaction, then at step 2510 the item is discarded. If the item does not belong to an ABOVE-MARK APPLIED transaction, then control proceeds to step 2508.

At step 2508, the apply engine determines whether the CSN of the item is less than or equal to the HIGHEST-SO-FAR CSN for the transaction to which the item belongs. If the CSN of the item is less than or equal to the HIGHEST-SO-FAR CSN for the transaction to which the item belongs, then the item is discarded at step 2510. If the CSN of the item is greater than the HIGHEST-SO-FAR CSN for the transaction to which the item belongs, then the item is applied at step 2512.

After the item is applied, at step 2514 the apply engine updates the HIGHEST-SO-FAR CSN for the transaction. At step 2516, the apply engine determines whether the transaction to which the item belongs has been completely applied. If the transaction to which the item belongs has been completely applied, then control proceeds to step 2518. If the transaction to which the item belongs has not been completely applied, then the processing of the item is done (step 2524).

At step 2518, the apply engine determines whether the LOW WATERMARK needs to be updated. If there are no unapplied transactions with commit CSNs below the commit CSN of the transaction that has just been applied, then the LOW WATERMARK is updated. Control passes to step 2520.

At step 2520, the OLDEST CSN is updated, if appropriate. Specifically, if the transaction that has just been applied contained the oldest not-yet-applied change, then the OLDEST CSN is updated to reflect the oldest change CSN of the remaining unapplied transactions.

At step 2522, the ABOVE-MARK APPLIED transaction information is updated if appropriate. Specifically, if the transaction that was just applied was above the current LOW WATERMARK, and in step 2518 the LOW WATERMARK was not raised to or above the commit time of the transaction, then the transaction is an ABOVE-MARK APPLIED transaction, and the ABOVE-MARK APPLIED transaction information is updated to include the transaction. After the ABOVE-MARK APPLIED transaction information is updated, the processing of the item is done (step 2524).

While the foregoing example is given in the context of an apply engine that makes changes at a destination site based on change information received from another site, the techniques described herein are not limited to any particular context. For example, the "items" received by an apply engine may be any form of information that needs to be handled exactly once. Further, the actual steps performed by the apply engine to "apply" the items will vary from implementation to implementation. For example, the "items" may be orders for individual items, the "transactions" may correspond to purchase orders that include a set of item orders, and the "application" of the items may involve generating bills for the purchase orders.

Replicating DDL Using Information Sharing System 100

As discussed above, there are many situations in which it is advantageous to maintain several copies of a database object. Many of the examples given above describe how information sharing system 100 may be used to ensure that the data contained in each replica remains consistent with the data that is contained in all other replicas of the same database object. Specifically, information sharing system 100 may be use to propagate and apply, to the sites at which each of the other replicas resides, changes made to any one of the replicas.

In addition to maintaining the consistency of the data contained within replicas of an object, information sharing system 100 may be used to maintain the consistency of the structure of the replicas themselves. Specifically, Data Definition Language (DDL) statements are database commands that define, alter the structure of, and drop database objects, such as tables. When a DDL statement is executed against one replica of an object, the structure of that replica will be altered, and will no longer be consistent with the structure of the other replicas of the same object. According to one embodiment, information sharing system 100 is used to propagate and apply DDL statements to other replicas in a manner that allows the structure of the other replicas to be maintained consistent with the altered replica.

Further, information sharing system 100 may be used to automate the initial creation of replicas. For example, assume that a user issues a DDL statement to create a table T1 in database A. According to one embodiment of the invention, a record of this DDL statement is generated and stored in the redo log of database A. A capture process that is configured to mine the redo log of database A may capture the DDL statement from the redo log and generate an event based on the DDL statement. The event may then be stored in a staging area, and eventually propagated to one or more other databases. At each of those other databases, an apply engine may be configured to "apply" the event by issuing a corresponding DDL statement within those databases. The execution of those DDL statements will cause the creation of replicas of table T1 to be created in each of the databases.

It should be noted that replicating DDL in this manner does not require any quiescing among the information sharing systems, and that there are no restrictions on the activity that can be done on the information sharing systems. Specifically, replicating DDL in this manner does not require suspension of user activity on the objects/systems irrespective of the complexity or nature of the DDL.

Generating Information about DDL Operations

In a system that does not generate redo information for a DDL operation, there may still be redo information that is generated as a result of the DDL operation. For example, assume that a DDL operation caused the creation of a table within a database. The creation of the table may involve the DML operations of inserting one or more rows of data into existing system tables that are used to store metadata about the various tables of the database. In response to the changes made to the data within those system tables, DML redo information may be generated. However, trying to reconstruct the specific DDL operation that caused the changes to the contents of the system tables, based solely on the redo information generated in response to the updates to those system tables, would be extremely difficult, if not impossible. Thus, generating specific information about those DDL operations provides a significant benefit in situations where asynchronous replication of the DDL operations is desired.

According to one embodiment, the redo information that is generated for DDL operations includes dependency information (i.e. the objects that are dependent/affected by the DDL). In general, such dependency information cannot be reconstructed from the DML redo generated as a result of the DDL operation.

In the example given above, the database in which the DDL operation was initially performed (the "source" database) is configured to generate redo information for the DDL operation. Because redo was generated for the DDL operation, the DDL operation is able to be accurately captured by a capture process that mines the redo log of the source database. Because the DDL operation is accurately captured, it can be accurately applied at the desired target databases. According to one embodiment, the redo information generated for the DDL operation includes, among other things, a string that reflects the DDL statement that was executed by the source database.

Storing specific information about the DDL operations within a redo log is merely one example of how DDL operations may be recorded within the source database. The replication techniques described herein are not limited to any particular DDL operation recordation technique. As long as a precise description of the DDL operation can be reconstructed, information sharing system 100 may be used to asynchronously propagate and apply the DDL change to other database systems.

Multi-Directional DDL Replication

Information sharing system 100 may be used to perform DDL replication between any of the systems that use information sharing system 100 to share information. Consequently, bi-directional and mult1-directional DDL replication is possible. For example, information sharing system 100 may be configured to replicate DDL between five database systems such that a DDL statement executed at any one of the five database systems will result in a corresponding DDL statement being executed at the other four database systems.

In such a five-way replication scenario, a table created at a first database system may have a column added to it at a second database system, and have another column dropped from it at a third database system. As each of these changes is made, corresponding changes are made at each of the other four database systems. Specifically, the creation of the table at the first database system may cause the creation of replicas of the table at each of the other four database systems. The subsequent addition of a column at the second database system will cause a corresponding column to be added to the replicas of the table each of the other four database systems. The subsequent dropping of a column at the third database system will cause the corresponding column to be dropped at the replicas of the table at each of the other four database systems. While all of these DDL operations are being replicated among the various databases, activity (including DDL and DML operations) can continue to occur on the databases, and even on the tables that are the targets of the DDL operations, without any restriction.

In the five-way replication scenario given above, all DDL changes are propagated to and executed at each of the database systems in exactly the same way that the changes were executed within the database system in which they originated. However, this need not be the case. As explained in detail above, the operation of each of the components involved in the replication process, including the capture engine, the propagation engine, and the apply engine, may be customized by registering rules with the rules engine. Those rules may specify, at fine levels of granularity, how each of the components is to operate. For example, the rules may specify a selection criteria, where only those DDL changes that satisfy the selection criteria are captured, propagated and/or applied. Further, those rules may specify transformations to be performed on the DDL change information, where the transformation may be applied during the capture, propagation and/or application of the DDL changes.

DDL Replication of Objects Other than Tables

In the examples given above, the replicated DDL operations are operations involving a table. However, information sharing system 100 may be used to replicate any form of DDL operation. For example, information sharing system 100 may be used to create a new user in one or more database systems in response to a user being added to a particular database system. Similarly, information sharing system 100 may be used to create new permissions in one or more database systems in response to a user being added to a particular database system.

Other types of database objects that are created and/or altered by DLL commands include, but are not limited to views, triggers, procedures, indexes, sequences, synonyms, rollback segments, outlines, database links, materialized views, materialized view logs, etc. The techniques described herein may be used to replicate the DDL used to create or alter any of these types of objects. As mentioned above, there is no restriction on database activity while DDL is being replicated for any of these other types of database objects.

Applying Replicated DDL Changes

Consider a scenario in which (1) a first set of DML changes are made to an object, then (2) a DDL operation is performed on the object, and then (3) a second set of DML changes are made to the object. If both the DML changes and the DDL changes to the object are being replicated, then it is important that the destination apply the first set of DML changes before the DDL change to the replica, and the second set of DML changes after the DDL change to the replica.

According to one embodiment, a mechanism is provided for tracking the dependencies between the DML changes and the DDL changes. For example, in the scenario presented above, the DDL operation depends on the first set of DML changes, and the second set of DML changes depends on the DDL operation. By tracking this dependency information, and conveying the dependency information to the destination site where the DML and DDL changes are replicated, the destination site can ensure that the changes are performed in the proper sequence.

Significantly, the DDL performed on one database object may have an effect on another database object. Under these circumstances, the second object is said to have a dependency on the first object. DML operations performed on the second object may be affected by DDL operations performed on the first object. Therefore, the dependency tracking mechanism uses information about the dependencies between objects to determine the dependency between DDL and DML operations. The destination site uses this information to ensure that the DDL and DML operations are applied at the destination site in the correct sequence, as dictated by the dependency relationships. In addition, this dependency information may be used to determine which other actions may be performed concurrently with a DDL operation. For example, a database server may be configured to execute operations, such as replicated DDL and DML operations, in parallel, as long as there is no dependency between the operations.

XML Schema for Change Information

In many of the examples given above, information sharing system 100 is used to share information about changes made within one "source" system with one or more "destination" systems. The structure of the records used to convey the change information may vary from implementation to implementation. The techniques described herein to not depend on any particular structure for the records.

According to one embodiment, the various pieces of change information (see the section entitled "LOGICAL CHANGE RECORDS") are stored in a structure that conforms to an XML schema. In one embodiment, the structure of an LCR conforms to the following XML schema:

```
schema xmlns="http://www.w3.org/2001/XMLSchema"
        targetNamespace="http://xmlns.oracle.com/streams/schemas/lcr"
        xmlns:lcr="http://xmlns.oracle.com/streams/schemas/lcr"
        xmlns:xdb="http://xmlns.oracle.com/xdb"
        version="1.0">
<simpleType name = "short_name">
    <restriction base = "string">
        <maxLength value="30"/>
    </restriction>
</simpleType>
<simpleType name = "long_name">
    <restriction base = "string">
        <maxLength value="4000"/>
    </restriction>
</simpleType>
<simpleType name = "db_name">
    <restriction base = "string">
        <maxLength value="128"/>
    </restriction>
</simpleType>
<!-- Default session parameter is used if format is not specified -->
<complexType name="datetime_format">
    <sequence>
        <element name = "value" type = "string"/>
        <element name = "format" type = "string" minOccurs="0"/>
    </sequence>
</complexType>
<complexType name="anydata">
    <choice>
        <element name="varchar2" type = "string" xdb:SQLType=
        "VARCHAR2"/>
        <!-- Represent char as varchar2. xdb:CHAR blank pads upto
        2000 bytes! -->
        <element name="char" type = "string" xdb:SQLType=
        "VARCHAR2"/>
        <element name="nchar" type = "string" xdb:SQLType=
        "NVARCHAR2"/>
        <element name="nvarchar2" type = "string" xdb:SQLType=
        "NVARCHAR2"/>
        <element name="number" type = "double" xdb:SQLType=
        "NUMBER"/>
        <element name="raw" type = "hexBinary" xdb:SQLType=
        "RAW"/>
        <element name="date" type = "lcr:datetime_format"/>
```

-continued

```
        <element name="timestamp" type = "lcr:datetime_format"/>
        <element name="timestamp_tz" type =
        "lcr:datetime_format"/>
        <element name="timestamp_1tz" type =
        "lcr:datetime_format"/>
        <!-- Interval YM should be according to format allowed
        by SQL -->
        <element name="interval_ym" type = "string"/>
        <!-- Interval DS should be according to format allowed
        by SQL -->
        <element name="interval_ds" type = "string"/>
    </choice>
</complexType>
<complexType name="column_value">
    <sequence>
        <element name = "column_name" type = "lcr:long_name"/>
        <element name = "data" type = "lcr:anydata"/>
        <element name = "1ob_information" type = "string"
        minOccurs="0"/>
        <element name = "1ob_offset" type = "nonNegativeInteger"
        minOccurs="0"/>
        <element name = "1ob_operation_size" type =
        "nonNegativeInteger" minOccurs="0"/>
    </sequence>
</complexType>
<element name = "ROW_LCR">
<complexType>
    <sequence>
        <element name = "source_database_name" type =
        "lcr:db_name"/>
        <element name = "command_type" type = "string"/>
        <element name = "object_owner" type = "lcr:short_name"/>
        <element name = "object_name" type = "lcr:short_name"/>
        <element name = "tag" type = "hexBinary" xdb:SQLType=
        "RAW" minOccurs="0"/>
        <element name = "transaction_id" type = "string" minOccurs=
        "0"/>
        <element name = "scn" type = "double" xdb:SQLType=
        "NUMBER" minOccurs="0"/>
        <element name = "old_values" minOccurs = "0">
        <complexType>
            <sequence>
                <element name = "old_value" type=
                    "lcr:column_value" maxOccurs = "unbounded"/>
            </sequence>
        </complexType>
    </element>
    <element name = "new_values" minOccurs = "0">
    <complexType>
        <sequence>
            <element name = "new_value" type="lcr:column_value"
                maxOccurs = "unbounded"/>
        </sequence>
    </complexType>
</element>
</sequence>
</complexType>
</element>
<element name = "DDL_LCR">
<complexType>
    <sequence>
        <element name = "source_database_name" type =
        "lcr:db_name"/>
        <element name = "command_type" type = "string"/>
        <element name = "current_schema" type = "lcr:short_name"/>
        <element name = "ddl_text" type = "string"/>
        <element name = "object_type" type = "string"
        minOccurs = "0"/>
        <element name = "object_owner" type = "lcr:short_name"
        minOccurs = "0"/>
        <element name = "object_name" type = "lcr:short_name"
        minOccurs = "0"/>
        <element name = "logon_user" type = "lcr:short_name"
        minOccurs = "0"/>
        <element name = "base_table_owner" type = "lcr:short_name"
        minOccurs = "0"/>
        <element name = "base_table_name" type = "lcr:short_name"
        minOccurs = "0"/>
```

-continued

```
            <element name = "tag" type = "hexBinary" xdb:SQLType=
            "RAW" minOccurs = "0"/>
            <element name = "transaction_id" type = "string"
            minOccurs = "0"/>
            <element name = "scn" type = "double" xdb:SQLType=
            "NUMBER" minOccurs = "0"/>
        </sequence>
</complexType>
</element>
</schema>
```

This exemplary XML schema contains sections for each of various types of change information. For example, the section immediately following the tag <element name = "DDL_LCR"> specifies the structure of a record associated with a DDL change, according to an embodiment of the invention. Similarly, the section immediately following the tag <element name="ROW_LCR"> specifies the structure of a record associated with a DML change to a row of a table, according to an embodiment of the invention.

Hardware Overview

Figure 26:
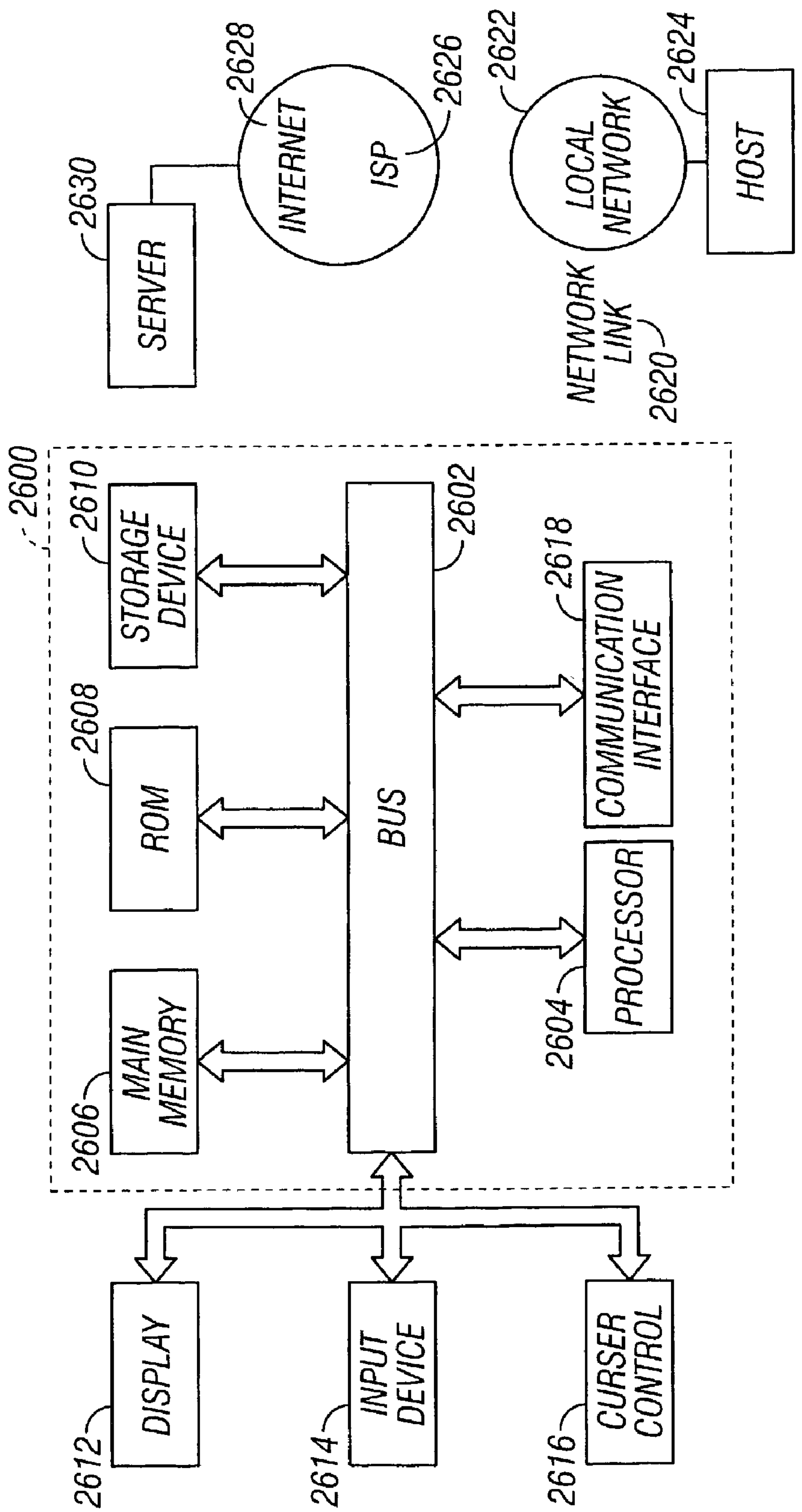
FIG. 26 is a block diagram of a computer system on which embodiments of the invention may be implemented.

FIG. 26 is a block diagram that illustrates a computer system 2600 upon which an embodiment of the invention may be implemented. Computer system 2600 includes a bus 2602 or other communication mechanism for communicating information, and a processor 2604 coupled with bus 2602 for processing information. Computer system 2600 also includes a main memory 2606, such as a random access memory (RAM) or other dynamic storage device, coupled to bus 2602 for storing information and instructions to be executed by processor 2604. Main memory 2606 also may be used for storing temporary variables or other intermediate information during execution of instructions to be executed by processor 2604. Computer system 2600 further includes a read only memory (ROM) 2608 or other static storage device coupled to bus 2602 for storing static information and instructions for processor 2604. A storage device 2610, such as a magnetic disk or optical disk, is provided and coupled to bus 2602 for storing information and instructions.

Computer system 2600 may be coupled via bus 2602 to a display 2612, such as a cathode ray tube (CRT), for displaying information to a computer user. An input device 2614, including alphanumeric and other keys, is coupled to bus 2602 for communicating information and command selections to processor 2604. Another type of user input device is cursor control 2616, such as a mouse, a trackball, or cursor direction keys for communicating direction information and command selections to processor 2604 and for controlling cursor movement on display 2612. This input device typically has two degrees of freedom in two axes, a first axis (e.g., x) and a second axis (e.g., y), that allows the device to specify positions in a plane.

The invention is related to the use of computer system 2600 for implementing the techniques described herein. According to one embodiment of the invention, those techniques are performed by computer system 2600 in response to processor 2604 executing one or more sequences of one or more instructions contained in main memory 2606. Such instructions may be read into main memory 2606 from another computer-readable medium, such as storage device 2610. Execution of the sequences of instructions contained in main memory 2606 causes processor 2604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2604 for execution. Such a medium may take many forms, including but not limited to, non-volatile media, volatile media, and transmission media. Non-volatile media includes, for example, optical or magnetic disks, such as storage device 2610. Volatile media includes dynamic memory, such as main memory 2606. Transmission media includes coaxial cables, copper wire and fiber optics, including the wires that comprise bus 2602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2604 for execution. For example, the instructions may initially be carried on a magnetic disk of a remote computer. The remote computer can load the instructions into its dynamic memory and send the instructions over a telephone line using a modem. A modem local to computer system 2600 can receive the data on the telephone line and use an infra-red transmitter to convert the data to an infrared signal. An infra-red detector can receive the data carried in the infra-red signal and appropriate circuitry can place the data on bus 2602. Bus 2602 carries the data to main memory 2606, from which processor 2604 retrieves and executes the instructions. The instructions received by main memory 2606 may optionally be stored on storage device 2610 either before or after execution by processor 2604.

Computer system 2600 also includes a communication interface 2618 coupled to bus 2602. Communication interface 2618 provides a two-way data communication coupling to a network link 2620 that is connected to a local network 2622. For example, communication interface 2618 may be an integrated services digital network (ISDN) card or a modem to provide a data communication connection to a corresponding type of telephone line. As another example, communication interface 2618 may be a local area network (LAN) card to provide a data communication connection to a compatible LAN. Wireless links may also be implemented. In any such implementation, communication interface 2618 sends and receives electrical, electromagnetic or optical signals that carry digital data information sharing system 100 representing various types of information.

Network link 2620 typically provides data communication through one or more networks to other data devices. For example, network link 2620 may provide a connection through local network 2622 to a host computer 2624 or to data equipment operated by an Internet Service Provider (ISP) 2626. ISP 2626 in turn provides data communication services through the world wide packet data communication network now commonly referred to as the "Internet" 2628. Local network 2622 and Internet 2628 both use electrical, electromagnetic or optical signals that carry digital data information sharing system 100. The signals through the various networks and the signals on network link 2620 and through communication interface 2618, which carry the digital data to and from computer system 2600, are exemplary forms of carrier waves transporting the information.

Computer system 2600 can send messages and receive data, including program code, through the network(s), network link 2620 and communication interface 2618. In the Internet example, a server 2630 might transmit a requested code for an application program through Internet 2628, ISP 2626, local network 2622 and communication interface 2618.

The received code may be executed by processor 2604 as it is received, and/or stored in storage device 2610, or other non-volatile storage for later execution. In this manner, computer system 2600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for responding to DDL operations associated with a database object, the method comprising the steps of:

in response to execution of a DDL statement associated with a database object, generating a record that indicates changes made by said DDL statement; and based on said record, performing an action that is asynchronous relative to execution of said DDL statement.

2. The method of claim 1 wherein:

said record includes dependency information;

the method includes the further steps of using said dependency information to determine which other actions are dependent on said action; and performing said action concurrently with other actions that are not dependent on said action.

3. The method of claim 1 wherein:

the step of performing an action includes causing a corresponding change to be made; and said corresponding change is made relative to a replica of said database object.

4. The method of claim 3 wherein the step of causing a corresponding change is performed without quiescing any database involved in replication of the database object.

5. The method of claim 3 wherein the step of causing a corresponding change is performed without restricting user activity in any database involved in replication of the database object.

6. The method of claim 3 wherein the execution of said DDL statement causes creation of said database object, and said corresponding change causes creation of said replica.

7. The method of claim 3 wherein execution of the DDL statement changes how the database object is structured, and said corresponding change to causes an alteration in a structure of said replica.

8. The method of claim 3 wherein the step of generating a record includes storing information in a redo log.

9. The method of claim 8 wherein the step of causing a corresponding
change to be made includes the steps of:
reading the information from the redo log;
based on the information from the redo log, generating change data that indicates how said database object was altered; and
applying said change data to said replica.

10. The method of claim 9 wherein the step of generating the change data is performed asynchronously relative to execution of said DDL statement.

11. The method of claim 8 wherein:
the redo log includes information that identifies changes made to data within said database object; and
the method further includes the steps of changing data contained in said replica based on information from said redo log.

12. The method of claim 9 further comprising the step of storing the change data in a staging area, prior to applying said change data to said replica.

13. The method of claim 12 further comprising the step of reading said change data from said staging area and propagating said change data to a site at which said replica is located.

14. The method of claim 9 wherein the step of generating change data is performed by a capture engine based on a rule set that has been registered by a user.

15. The method of claim 13 wherein the step of propagating said change data is performed by a propagation engine based on a rule set that has been registered by a user.

16. The method of claim 9 wherein the step of applying said change data is performed by an apply engine based on a rule set that has been registered by a user.

17. The method of claim 3 wherein:
the database object is a user object that establishes a new user of a database system; execution of the DDL statement creates the user object; and
the step of causing a corresponding change to be made includes creating a replica user object in another database system to establish said new user to be a new user of said other database system.

18. The method of claim 3 wherein:
the database object is a set of one or more permissions for a database system;
execution of the DDL statement creates the one or more permissions; and
the step of causing a corresponding change to be made includes creating a replica of said one or more permissions in another database system.

19. The method of claim 3 wherein:
the DDL statement is executed in a first database;
the replica resides in a second database; and
the method further comprises the steps of
in response to execution of a second DDL statement associated with said replica, generating a second record that indicates changes made by said second DDL statement; and
based on said record, causing a second corresponding change to be made, wherein said second corresponding change is made relative to said database object in said first database.

20. The method of claim 3 wherein:
the database object is a type of database object selected from a set that consists of a view, a trigger, a procedure, an index, a sequence, a synonym, a rollback segment, an outline, a database link, a materialized view and a materialized view log;
execution of the DDL statement creates the selected type of database object; and
the step of causing a corresponding change to be made includes creating a replica of said type of database object in another database system.

21. The method of claim 1 wherein:
the DDL statement is executed in a first database system; and
the step of performing an action includes sending a message to a second database system that is different from said first database system.

22. A computer-readable storage medium storing instructions having stored thereon instructions which, when executed by one or more processors, cause the one or more processors to perform the method recited in claim 1.

23. A computer-readable storage medium storing instructions having stored thereon instructions which, when executed by one or more processors, cause the one or more processors to perform the method recited in claim 2.

24. A computer-readable storage medium storing instructions having stored thereon instructions which, when executed by one or more processors, cause the one or more processors to perform the method recited in claim 3.

25. A computer-readable storage medium storing instructions having stored thereon instructions which, when executed by one or more processors, cause the one or more processors to perform the method recited in claim 4.

26. A computer-readable storage medium storing instructions having stored thereon instructions which, when executed by one or more processors, cause the one or more processors to perform the method recited in claim 5.

27. A computer-readable storage medium storing instructions having stored thereon instructions which, when executed by one or more processors, cause the one or more processors to perform the method recited in claim 6.

28. A computer-readable storage medium storing instructions having stored thereon instructions which, when executed by one or more processors, cause the one or more processors to perform the method recited in claim 7.

29. A computer-readable storage medium storing instructions having stored thereon instructions which, when executed by one or more processors, cause the one or more processors to perform the method recited in claim 8.

30. A computer-readable storage medium storing instructions having stored thereon instructions which, when executed by one or more processors, cause the one or more processors to perform the method recited in claim 9.

31. A computer-readable storage medium storing instructions having stored thereon instructions which, when executed by one or more processors, cause the one or more processors to perform the method recited in claim 10.

32. A computer-readable storage medium storing instructions having stored thereon instructions which, when executed by one or more processors, cause the one or more processors to perform the method recited in claim 11.

33. A computer-readable storage medium storing instructions having stored thereon instructions which, when executed by one or more processors, cause the one or more processors to perform the method recited in claim 12.

34. A computer-readable storage medium storing instructions having stored thereon instructions which, when executed by one or more processors, cause the one or more processors to perform the method recited in claim 13.

35. A computer-readable storage medium storing instructions having stored reon instructions which, when executed by one or more processors, cause the one or more processors to perform the method recited in claim 14.

36. A computer-readable storage medium storing instructions having stored thereon instructions which, when executed by one or more processors, cause the one or more processors to perform the method recited in claim 15.

37. A computer-readable storage medium storing instructions having stored thereon instructions which, when executed by one or more processors, cause the one or more processors to perform the method recited in claim 16.

38. A computer-readable storage medium storing instructions having stored thereon instructions which, when executed by one or more processors, cause the one or more processors to perform the method recited in claim 17.

39. A computer-readable storage medium storing instructions having stored thereon instructions which, when executed by one or more processors, cause the one or more processors to perform the method recited in claim 18.

40. A computer-readable storage medium storing instructions having stored thereon instructions which, when executed by one or more processors, cause the one or more processors to perform the method recited in claim 19.

41. A computer-readable storage medium storing instructions having stored thereon instructions which, when executed by one or more processors, cause the one or more processors to perform the method recited in claim 20.

42. A computer-readable storage medium storing instructions having stored thereon instructions which, when executed by one or more processors, cause the one or more processors to perform the method recited in claim 21.

* * * * *